(12) United States Patent
Sato et al.

(10) Patent No.: US 7,936,944 B2
(45) Date of Patent: *May 3, 2011

(54) IMAGE PROCESSING DEVICE AND IMAGE PROCESSING METHOD

(75) Inventors: Satoshi Sato, Osaka (JP); Katsuhiro Kanamori, Nara (JP); Mikiya Nakata, Nara (JP)

(73) Assignee: Panasonic Corporation, Osaka (JP)

( * ) Notice: Subject to any disclaimer, the term of this patent is extended or adjusted under 35 U.S.C. 154(b) by 255 days.

This patent is subject to a terminal disclaimer.

(21) Appl. No.: 12/362,958

(22) Filed: Jan. 30, 2009

(65) Prior Publication Data

US 2009/0141027 A1    Jun. 4, 2009

Related U.S. Application Data

(63) Continuation of application No. PCT/JP2008/002163, filed on Aug. 7, 2008.

(30) Foreign Application Priority Data

Aug. 7, 2007  (JP) ................................. 2007-205983

(51) Int. Cl.
*G06K 9/40* (2006.01)
*G06K 9/34* (2006.01)
*G06T 15/50* (2011.01)

(52) U.S. Cl. ........ 382/274; 382/173; 382/174; 382/154; 345/426

(58) Field of Classification Search .................. 382/100, 382/173, 174, 154, 274; 345/425–426
See application file for complete search history.

(56) References Cited

U.S. PATENT DOCUMENTS

| 7,167,597 | B2 * | 1/2007 | Matsushima ................. 382/274 |
| 7,200,262 | B2 * | 4/2007 | Sawada ......................... 382/154 |
| 2006/0018539 | A1 | 1/2006 | Sato et al. |
| 2006/0239584 | A1 | 10/2006 | Motomura et al. |
| 2007/0092132 | A1 | 4/2007 | Sato et al. |

(Continued)

FOREIGN PATENT DOCUMENTS

JP    5-264245    10/1993

(Continued)

OTHER PUBLICATIONS

International Search Report issued Oct. 14, 2008 in International Application No. PCT/JP2008/002163.

(Continued)

*Primary Examiner* — Samir A Ahmed
*Assistant Examiner* — Mehdi Rashidian
(74) *Attorney, Agent, or Firm* — Wenderoth, Lind & Ponack, L.L.P.

(57) ABSTRACT

The image processing device performs processing on a shadow in an image of an object, and includes: an image information obtaining unit obtaining information about an image of the object, the information including luminance information about luminance of light from the object and polarization information about polarization of the light from the object; a shadow area extracting unit extracting an attached shadow area and a cast shadow area from the image of the object based on the luminance information and the polarization information, the attached shadow area appearing on the surface of the object depending on an angle of incidence light, and the cast shadow area appearing on the surface of a material body other than the object when the light is blocked by the object; and an output unit outputting information identifying the attached shadow area and cast shadow area.

20 Claims, 53 Drawing Sheets

U.S. PATENT DOCUMENTS

| | | |
|---|---|---|
| 2007/0200938 A1 | 8/2007 | Kaku et al. |
| 2007/0222781 A1 | 9/2007 | Kondo et al. |
| 2010/0013965 A1* | 1/2010 | Pugh et al. .................. 348/254 |

FOREIGN PATENT DOCUMENTS

| | | |
|---|---|---|
| JP | 11-211433 | 8/1999 |
| JP | 2002-24818 | 1/2002 |
| JP | 2002-303513 | 10/2002 |
| JP | 2005-49935 | 2/2005 |
| WO | 2006/011261 | 2/2006 |
| WO | 2006-077710 | 7/2006 |
| WO | 2006/095779 | 9/2006 |
| WO | 2007/029446 | 3/2007 |
| WO | 2007/139070 | 12/2007 |
| WO | 2008/099589 | 8/2008 |

OTHER PUBLICATIONS

Japanese Office Action in corresponding Japanese Application No. 2008-551799.

Imari Sato, et al. "*Illumination Distribution from Shadows*", Computer Vision and Imaging Media, The Journal of the Institute of Electronics, Information and Communication vol. 41, No. SIG10 (CVIM1), pp. 31-40, 2000.

Yasunori Ishii, et al. "*Photometric Linearization based on Classification of Photometric Factors*", Computer Vision and Imaging Media, The Journal of the Institute of Electronics, Information and Communication, vol. 44, No. SIG5 (CVIM6), pp. 11-21, 2003.

Takayuki Kawashima et al., "*Development of Polarization Imaging Device and Applications by Using Patterned Polarizer*", The 2006 General Conference of the Institute of Electronics, Information and Communication, No. D-11-52, pp. 52, 2006.

Megumi Saito et al. "*Measurement of Surface Orientations of Transparent Objects Using Polarization in Highlight*", The Journal of the Institute of Electronics, Information and Communication, D-II, vol. J82-DII, No. 9, pp. 1383-1390, 1999.

L.B. Wolff and T.E. Boult, "*Constraining Object Features Using a Polarization Reflectance Model*", IEEE Transactions on Pattern Analysis and Machine Intelligence, vol. 13, No. 7, pp. 635-657, 1991.

Ondrej Drbohlav et al. "*Using Polarization to Determine Intrinsic Surface Properties*", Proc. SPIE vol. 3826, pp. 253-263, 1999.

Gary A. Atkinson et al., "*Recovery of Surface Orientation From Diffuse Polarization*", IEEE Transactions on Image Processing, vol. 15, No. 6, Jun. 2006, pp. 1653-1664.

Daisuke Miyazaki, et al., "*Polarization-based Inverse Rendering from a Single View*", Proceedings of the 9th IEEE International Conference on Computer Vision (ICCV'03).

* cited by examiner (a) Object (ball)

(b) Degree of Polarization $\rho$ (c) Polarization phase $\phi$ (d) Estimated polarization error E (a) Object (ball)

(b) Degree of Polarization $\rho$ (c) Polarization phase $\phi$ (d) Estimated polarization error E (a) Shadow area (b) Cast shadow area (c) Attached shadow area

FIG. 18

| Pixel position | Amplitude A | Degree of polarization ρ | Polarization phase [rad] | Estimated polarization error E | Area division result |
|---|---|---|---|---|---|
| ... | ... | ... | ... | ... | ... |
| (141,117) | 269.5 | 0.0968 | 0.900 | $2.48 \times 10^3$ | Diffuse reflection area |
| ... | ... | ... | ... | ... | ... |
| (151,138) | 14435 | 0.794 | 2.29 | $2.33 \times 10^6$ | Specular reflection area |
| ... | ... | ... | ... | ... | ... |
| (111,144) | 33.1 | 0.0983 | 0.00639 | $4.02 \times 10^2$ | Attached shadow area |
| ... | ... | ... | ... | ... | ... |
| (98,151) | 4.01 | 0.0167 | 1.28 | $7.92 \times 10^2$ | Cast shadow area |
| ... | ... | ... | ... | ... | ... |
| (164,144) | 588.7 | 0.0946 | 1.78 | $4.65 \times 10^3$ | Diffuse reflection area |
| ... | ... | ... | ... | ... | ... |

N = 37 (polarizer is rotated by 5 degrees)

FIG. 19

| Area | Amplitude A | Degree of polarization ρ | Estimated polarization error E |
|---|---|---|---|
| Diffuse reflection area | A ≥ 256 | ρ < 0.7 | — |
| Specular reflection area | | ρ ≥ 0.7 | — |
| Attached shadow area | A < 256 | — | E ≤ $(0.3)^2 \cdot (2A)^2 \cdot N$ |
| Cast shadow area | | — | E > $(0.3)^2 \cdot (2A)^2 \cdot N$ |

A: Amplitude of luminance variation curve by polarizers
N = 37 (the number of samples, polarizers are rotated by 5 degrees)

(a)

(b)

(a) Object (oil painting)

(b) Degree of polarization $\rho$

IMAGE PROCESSING DEVICE AND IMAGE PROCESSING METHOD

CROSS REFERENCE TO RELATED APPLICATION

This is a continuation application of PCT application No. PCT/JP2008/002163 filed Aug. 7, 2008, designating the United States of America.

BACKGROUND OF THE INVENTION (1) Field of the Invention

The present invention relates to devices which perform processing on images of objects, and in particular to devices which perform processing on shadows.

(2) Description of the Related Art

Recently, image processing methods using shadows have been widely performed. For example, Non-patent Reference 1 has proposed an approach for estimating the distribution of light from a light source of real lighting based on the luminance distribution in a cast shadow which is a "shadow" generated by a material body which is an object having a known shape. This approach is derived from the fact that the relationship between the light source, the object, and the shadow can be represented as a geometrical and optical model. When this concept is applied to an environment about which light source information is known, it is possible to estimate the three-dimensional shape of an object based on the shadow.

In addition, in image processing, when the luminance is low in a portion of an image due to inverse light or a shadow, a shadow correction process for correcting only the luminance of the shadow area is performed to provide a beautiful image.

Here, a "shadow" appears when light reaches a solid, and contains an "attached shadow" and a "cast shadow". An "attached shadow" appears on the solid itself depending on the angle of incidence light, and a "cast shadow" appears on a plane or on another solid when light is blocked by the former solid.

Since the Non-patent Reference 1 is a method for estimating a light source distribution based on such shadow area only, it is obvious that no accurate estimation can be performed in the case where the processing is performed based on a judgment that an attached shadow area is a cast shadow area.

In addition, in the case of shadow correction process, an attached shadow area is an element providing a stereoscopic vision of an object. Thus, it is desirable that such correction is made for the cast shadow area only, and no processing is performed on the attached shadow area.

For this, it is very important to classify shadow areas into attached shadow areas and cast shadow areas.

In order to classify shadow areas into attached shadow areas and cast shadow areas, Non-patent Reference 2 generates a linearized image which is an image obtainable in an ideal state where no specular reflection occurs, using an image of an object lighted by light sources in various directions, and classifies the shadow areas based on the linearized image.

Non-patent Reference 1: "Buttai no inei ni motozuku kogen kankyo suitei (Illumination Distribution from Shadows), Computer Vision and Imaging Media, the Journal of The Institute of Electronics, Information and Communication Vol. 41, No. SIG10 (CVIM1), pp. 31-40, 2000, Imari Sato, Yoichi Sato, Katsushi Ikeuchi.

Non-patent Reference 2: "Kogaku gensho no bunrui ni motozuku gazo no senkeika (Photometometric Linearization based on Classification of Photometric Factors)", Computer Vision and Imaging Media, the Journal of The Institute of Electronics, Information and Communication, Vol. 44, No. SIG5 (CVIM6), pp. 11-21, 2003, Yasunori Ishii, Kohtaro Fukui, Yasuhiro Mukaigawa, Takeshi Shakunaga.

SUMMARY OF THE INVENTION

However, Non-patent Reference 2 entails a problem of requiring an image of an object lighted by light sources in various directions and thus requires a large-scale device. In addition, Non-patent Reference 2 enables classification of a shadow which appears when a light source is moved can be classified, but does not enable classification of a shadow which appears when no light source is moved. Therefore, Non-patent Reference 2 neither enables classification of shadows appearing by solar light in outdoor nor classification of shadows appearing by incandescent lamps used as lighting in indoor.

In consideration of this, the present invention has an aim to provide an image processing device and the like which allows extraction of attached shadow areas and cast shadow areas from a snapshot-like image without requiring a large-scale system enabling movement of a light source.

In order to achieve the above aim, the image processing device according to the present invention performs processing on a shadow in an image of an object, and includes: an image information obtaining unit configured to obtain information about the image of the object, the information including luminance information which is information about luminance of light from the object and polarization information which is information about polarization of the light from the object; a shadow area extracting unit configured to extract an attached shadow area and a cast shadow area from the image of the object based on the luminance information and the polarization information obtained by the image information obtaining unit, the attached shadow area appearing on the surface of the object depending on an angle of incidence light, and the cast shadow area appearing on the surface of a material body other than the object when the light is blocked by the object; and an output unit configured to output information identifying the attached shadow area and the cast shadow area extracted by the shadow area extracting unit.

More specifically, a focus in the present invention is placed on the difference between the polarization characteristics of attached shadow areas and the polarization characteristics of cast shadow areas. The present invention extracts attached shadow areas and cast shadow areas by focusing on the degree of polarization which is polarization information and the difference in polarization characteristics which is an estimated polarization error. In addition, since it is difficult to divide a black object having a low reflectance and a shadow, the present invention performs area extraction on low luminance areas including shadow and low reflectance areas. The use of polarization information in this manner makes it possible to easily extract attached shadow areas and cast shadow areas from low luminance areas including shadow areas.

It is to be note that the present invention can be implemented not only as an image processing device, but also as an image processing method, as a program causing a computer to execute the steps included in the method, and as a computer-readable recording medium such as a DVD on which the program is recorded.

According to the present invention, attached shadow areas and cast shadow areas are extracted using the polarization information of an object. In this way, it becomes possible to extract attached shadow areas and cast shadow areas from a snapshot-like image captured in a general environment without requiring a large-scale system enabling movement of a light source.

Therefore, the present invention makes it possible to easily extract attached shadow areas and cast shadow areas, enabling high refinement of an image. Therefore, the present invention is highly practical today when mobile imaging devices such as mobile phones with a camera, digital cameras, digital movie cameras and the like are becoming popular because image resolutions are important for such mobile imaging devices with an optical system and imaging elements miniaturized.

FURTHER INFORMATION ABOUT TECHNICAL BACKGROUND TO THIS APPLICATION

The disclosure of Japanese Patent Application No. 2007-205983 filed on Aug. 7, 2007 including specification, drawings and claims is incorporated herein by reference in its entirety.

The disclosure of PCT application No. PCT/JP2008/002163 filed, Aug. 7, 2008, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 18 is a diagram showing a specific example of area division performed by the area dividing unit in Embodiment 1 of the present invention;

FIG. 19 is a diagram showing a specific example of judgment standards at the time of area division performed by the area dividing unit;

DESCRIPTION OF THE PREFERRED EMBODIMENT(S)

An Embodiment is described below with reference to the drawings. It is to be noted that, in this embodiment, a description is given of an optical area dividing device as an example of an image processing device according to the present invention.

Embodiment 1

First, a description is given of the outline of the optical area dividing device in Embodiment 1 of the present invention.

Figure 1:
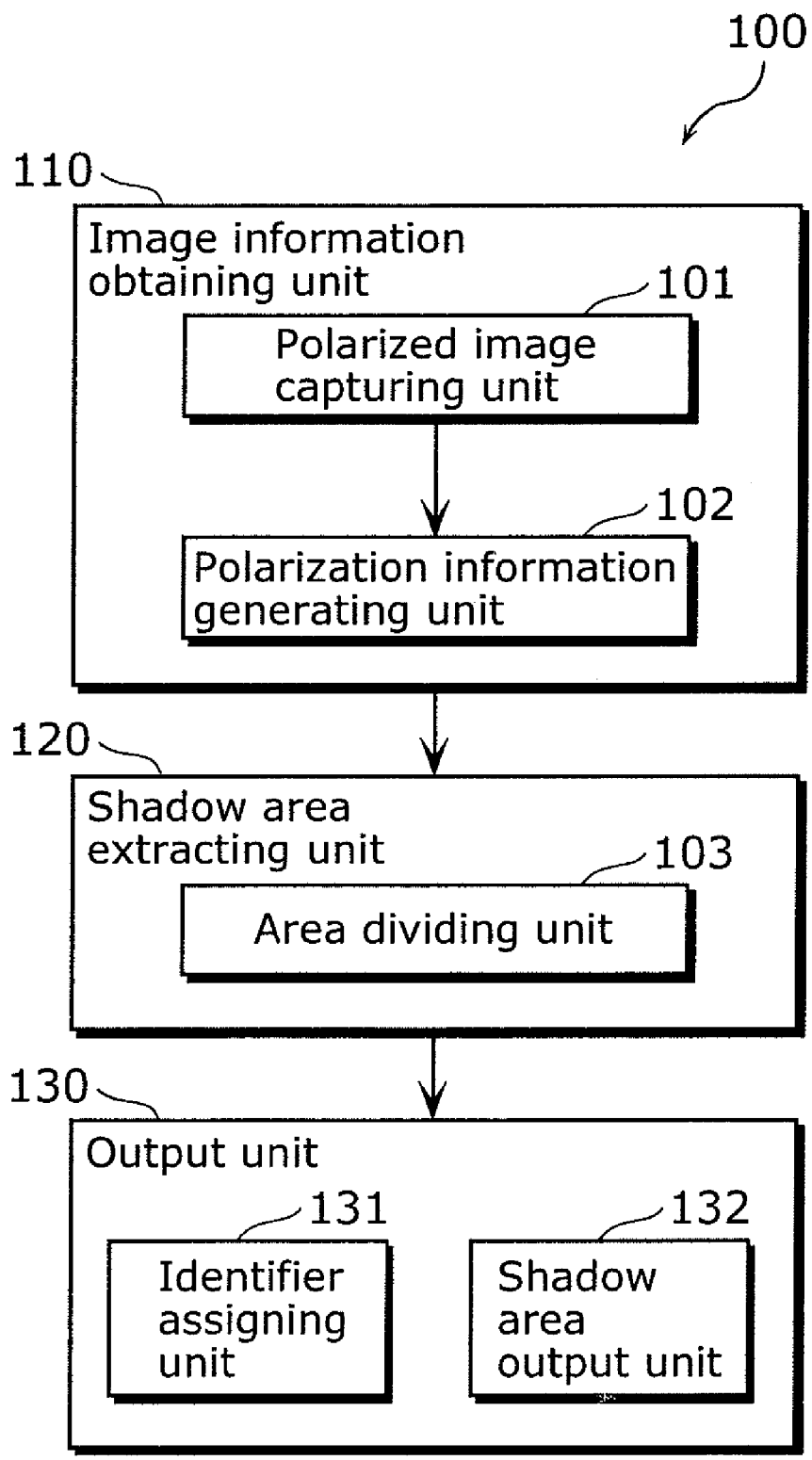
FIG. 1 is a functional block diagram showing the structure of an optical area dividing device in Embodiment 1 of the present invention.

FIG. 1 is a functional block diagram showing the structure of the optical area dividing device 100 in this Embodiment. The optical area dividing device 100 is an example of the image processing device which performs processing on a shadow in the image of the object. Here, the optical area dividing device 100 is a device for performing optical area division on the surface of the object by imaging the object, and includes an image information obtaining unit 110, a shadow area extracting unit 120, and an output unit.

The image information obtaining unit 110 is a processing unit for obtaining information related to an object image including luminance information about luminance of light from the object, and polarization information about polarization of light from the object, and includes a polarized image capturing unit 101 and a polarization information generating unit 102. It is to be noted that this image information obtaining unit 110 obtains luminance information and polarization information for each unit image which makes up the object image.

The polarized image capturing unit 101 in the image information obtaining unit 110 is a processing unit for obtaining a polarized image of an object by receiving light transmitted through polarizers each having a different angle of a polarization principal axis.

The polarization information generating unit 102 in the image information obtaining unit 110 is a processing unit for generating, from the polarized image obtained by the polarized image capturing unit 101, polarization information about polarization of received light for each of image areas which make up the polarized image using the correspondence relation between the angles of polarization principal axes of the polarizers and the luminance of light transmitted through the polarizers.

The shadow area extracting unit 120 is a processing unit for extracting, from the object image, attached shadow areas and cast shadow areas on a per unit image basis, based on luminance information and polarization information obtained by the image information obtaining unit 110. The attached shadow areas are areas in which attached shadows appear on the surface of an object depending on the angle of incidence light, and cast shadow areas are areas in which cast shadows appear on the surface of a material body other than the object when light is blocked by the object. This Embodiment includes an area dividing unit 103 which performs area division as an example of area extraction.

The area dividing unit 103 in the shadow area extracting unit 120 is a processing unit for dividing a polarized image into image areas each of which is made of a group of image areas having common optical characteristics, based on similarity (likeness) between the luminance information of the polarized image and the polarized information generated by the polarization information generating unit 102. At this time, the area dividing unit 103 compares the luminance of each image area and a predetermined threshold value. When the luminance is less than the threshold value, the area dividing unit 103 classifies the image area into a low luminance area (shadow area in this Embodiment) including a shadow area (an attached shadow area and a cast shadow area).

This area dividing unit 103 performs area division on an image (a polarized image here), but it is to be noted that operations performed by the shadow area extracting unit in the present invention are not limited to such area division, and area extraction (that is, a process for identifying a part of an area in an image) may be performed instead. In other words, in order to facilitate understanding of the present invention, this DESCRIPTION describes, as an example of area extraction, area division for classifying all the areas of an image into any of several kinds of areas including attached shadow areas and cast shadow areas. However, the image processing device according to the present invention may perform any area extraction for identifying some of the areas in the image without performing such area division. Thus, "area division (classification into areas) in the DESCRIPTION may be read as "area extraction (extraction of areas). In addition, the definition of "area detection (detection of areas) in the DESCRIPTION is the same as that of "area extraction (extraction of areas).

The output unit 130 is a processing unit which outputs information identifying the attached shadow area and the cast shadow area extracted by the shadow area extracting unit 120, and includes an identifier assigning unit 131 and a shadow area output unit 132.

The identifier assigning unit 131 in the output unit 130 assigns identifiers to the respective unit images included in the attached shadow area and the cast shadow area extracted by the shadow area extracting unit 120, and outputs the assigned identifiers.

The shadow area output unit 132 in the output unit 130 outputs portions (unit images) respectively corresponding to the attached shadow area and the cast shadow area in the image of the object, as information identifying the attached shadow area and the cast shadow area extracted by the shadow area extracting unit 120.

Figure 2:
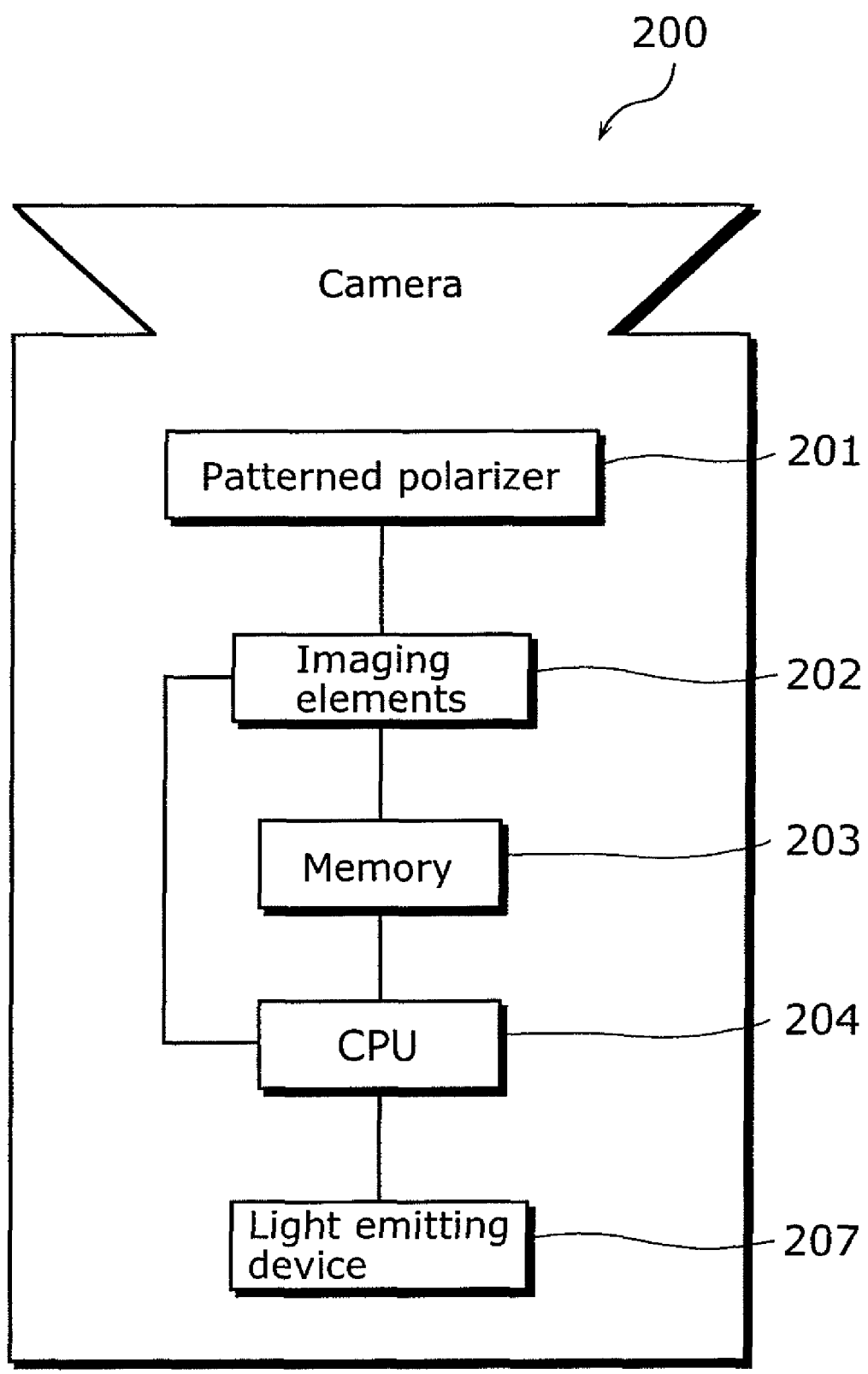
FIG. 2 is a structural diagram of a camera mounting the optical area dividing device in Embodiments 1, 2, and 4 of the present invention.
Figure 3:
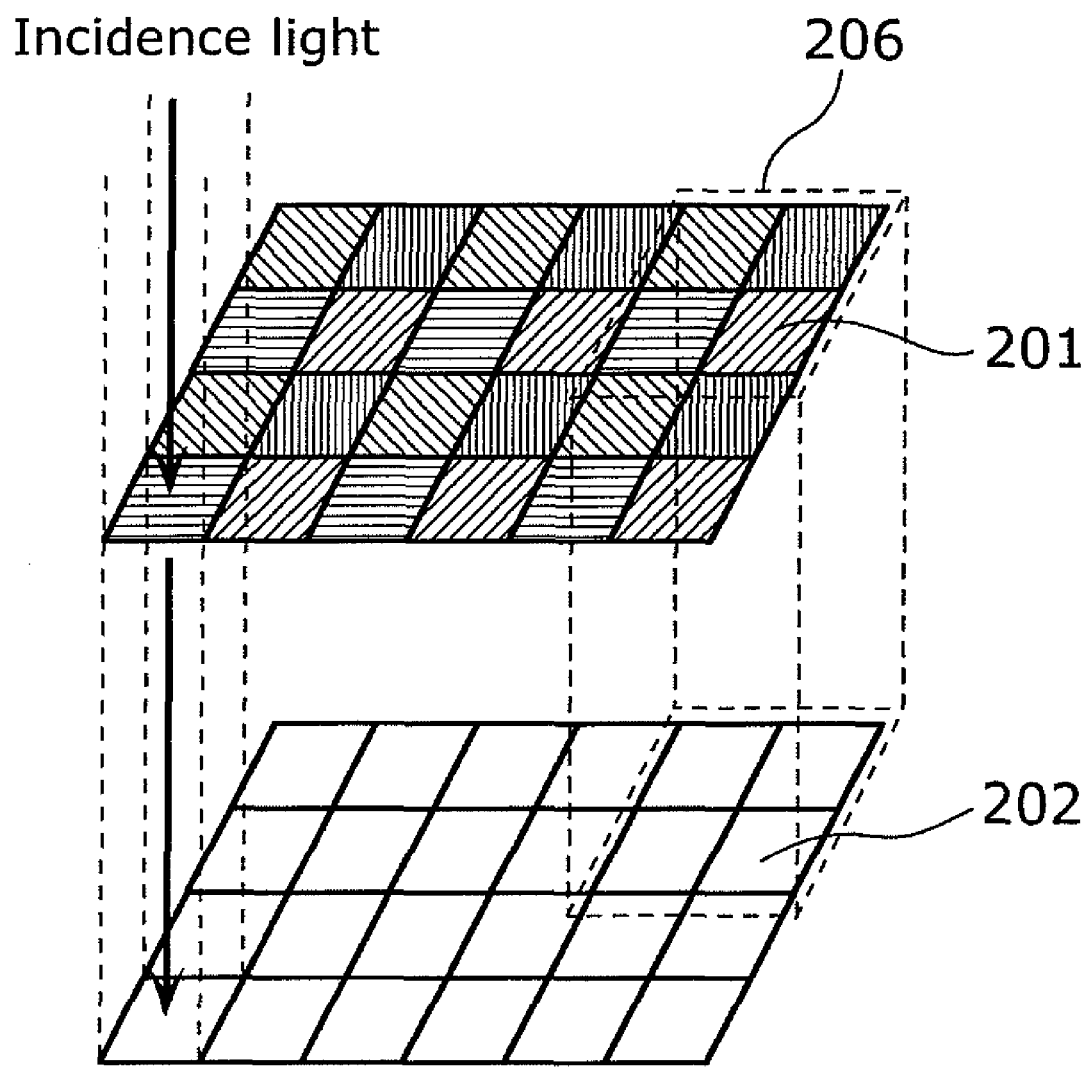
FIG. 3 is a schematic diagram showing the relationship between a patterned polarizer and imaging elements provided in the camera shown in FIG. 2.

FIG. 2 shows an example of the hardware structure of a camera 200 mounting the optical area dividing device 100 in this Embodiment. FIG. 3 is a schematic diagram showing the relationship between the patterned polarizer 201 and the imaging elements 202 shown in FIG. 2. This camera 200 is an imaging device including a function for generating normal vector information optically dividing the areas of an image captured, and includes a patterned polarizer 201, imaging elements 202, a memory 203, a CPU 204, and a light emitting device 207.

The patterned polarizer 201 is a group of polarizers arranged in a matrix. As shown in FIG. 3, each group of polarizers is a set of four kinds of polarizers having polarization principal axis angles $\psi i$ of 0, 45, 90, and 135 degrees respectively.

As shown in FIG. 3, each of the imaging elements 202 is a group of pixels (light-receiving elements) which are arranged in a matrix and receive light transmitted through the respective polarizers which make up the patterned polarizer 201. Desirably, the imaging elements 202 are arranged horizontally with respect to the imaging surface. It is to be noted that an imaging unit 206 is made of four (kinds of) polarizers in the patterned polarizer 201, and four pixels (light receiving elements) corresponding to the imaging elements 202. The image obtained using this imaging unit 206 is a unit ("unit image") to be processed in the processes performed by the polarization information generating unit 102, the area dividing unit 103, and the normal vector information generating unit 104. In other words, the optical area dividing device 100 performs generation of polarization information, area division, and generation of normal vector information for each unit image (also referred to as "pixel" hereinafter) obtained using the imaging unit 206.

The memory 203 includes a RAM as an operation area for the CPU 204 and a ROM in which a program or the like is stored.

The CPU 204 is a processor which executes a program stored in the memory 203, accesses the memory 203, and controls the imaging elements 202 and the light emitting device 207.

The light emitting device 207 is a flash which projects light on the object.

It is to be noted that the polarized image capturing unit 101 shown in FIG. 1 is implemented as the patterned polarizer 201 and the imaging elements 202 shown in FIG. 2. The polarization information generating unit 102, and the area dividing unit 103 shown in FIG. 1 are implemented by means that the CPU 204 shown in FIG. 2 executes the program stored in the memory 203. In addition, the memory 203 is used as an operation area for storing the polarized image obtained by the polarized image capturing unit 101, the polarization information generated by the polarization information generating unit 102, the normal vector information generated by the normal vector information generating unit 104, various parameters generated temporarily, and the like.

Figure 4:
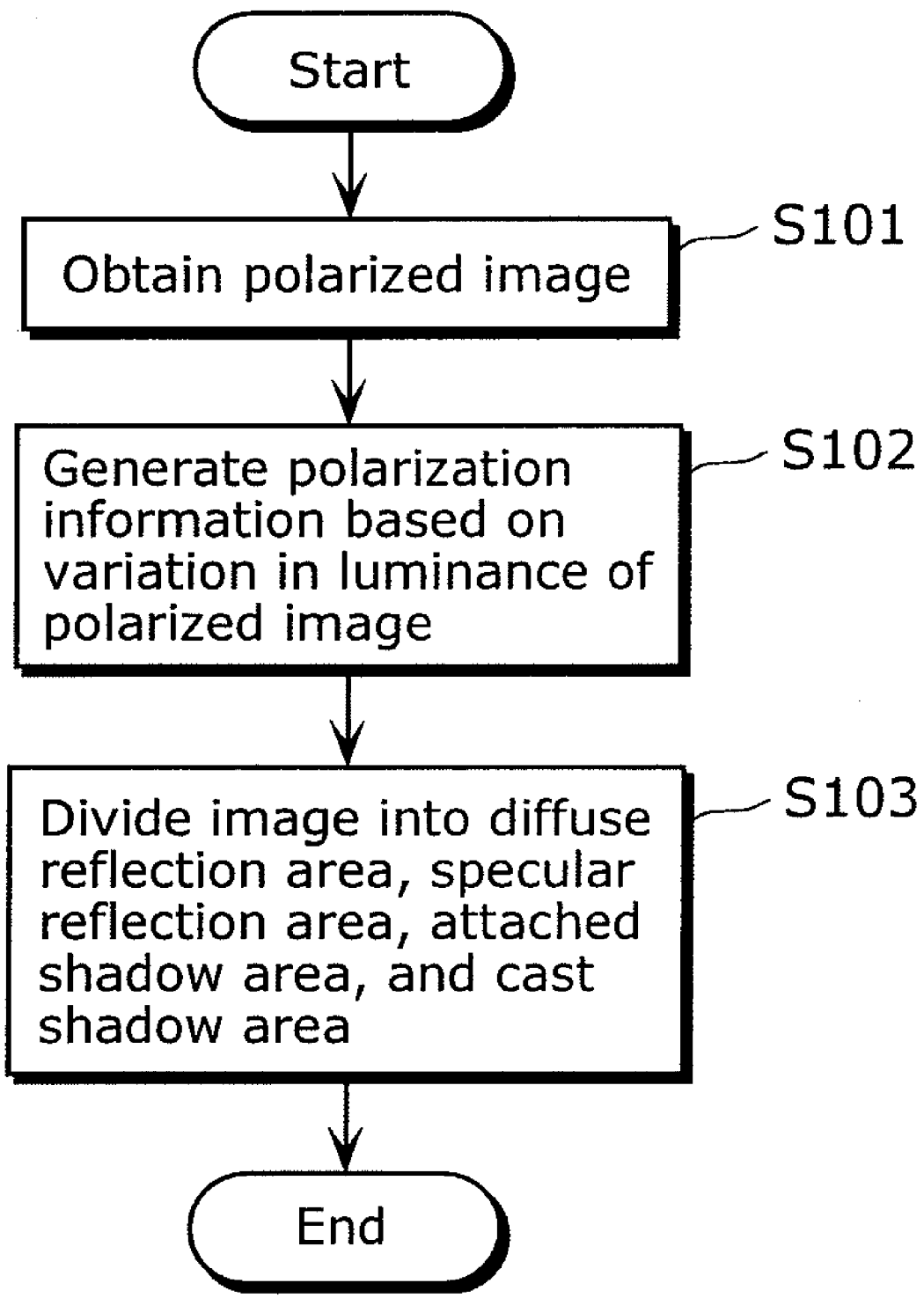
FIG. 4 is a flowchart of processes performed by the optical area dividing device in Embodiment 1 of the present invention.

FIG. 4 is a flowchart of processes performed by the optical area dividing device 100 in this Embodiment. First, the polarized image capturing unit 101 images a polarized image which is an image including polarization information by means that the imaging elements receives light from the object through the patterned polarizer 201 (S101). The polarization information generating unit 102 generates polarization information using luminance variation of the polarized image captured by the polarized image capturing unit 101 (S102). The area dividing unit 103 divides the image into diffuse reflection areas, specular reflection areas, and low luminance areas (attached shadow areas and cast shadow areas in this Embodiment) using the polarization information generated by the polarization information generating unit 102 and the luminance information obtained by the polarized image capturing unit 101 (S103).

Next, descriptions are given of detailed functions of the respective functional elements of the optical area dividing device 100 in this Embodiment.

Figure 5:
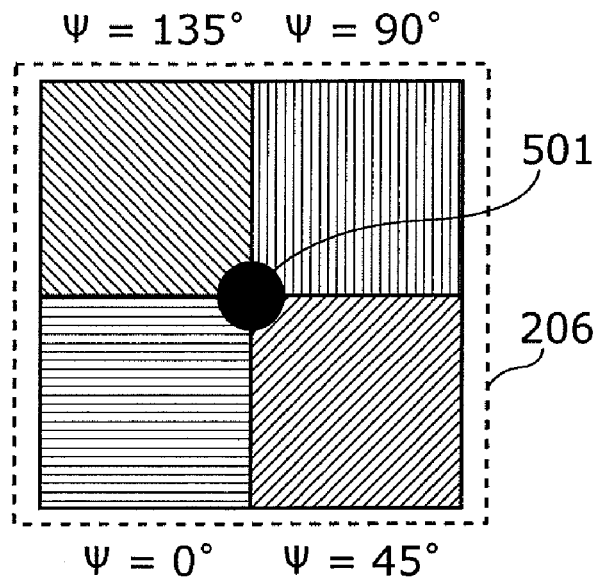
FIG. 5 is a schematic diagram for illustrating an arrangement state of the patterned polarizer provided in the camera shown in FIG. 2.

First, a detailed description is given of the polarized image capturing unit 101. The polarized image capturing unit 101 obtains polarized image including polarization information by means that the imaging elements 202 receive light from the object through the patterned polarizer 201. FIG. 5 is a diagram of a schematic view when the imaging units 206 shown in FIG. 3 are viewed in the direction of incidence light. In this diagram, the straight lines within each polarizer (each pixel) show the direction of the polarization principal axis of a micro deflecting plate placed on the pixel. In other words, this imaging unit 206 holds pixels including four kinds of polarization directions which forms rotation angles (of $\psi i=0$, 45, 90, and 135 degrees) with respect to the polarization axis. The patterned polarizer shows polarization characteristics that TM waves are transmitted while TE waves are reflected (not transmitted).

These characteristics are produced using photonic crystals disclosed, for example, in Non-patent Reference 3: "Pattern ka henkohshi wo mochiita henkoh imaging device to riyoh gijyutsu no kaihatsu (Development of polarization imaging device and applications using patterned polarizer)", the 2006 General Conference of the Institute of Electronics, Information and Communication, No. D-11-52, page 52, 2006. In the case of photonic crystals, light having vibration planes horizontal to grooves formed on the surfaces is TE waves, and light having vibration planes vertical to the grooves formed on the surfaces is TM waves.

As for imaging of this polarization information, the luminance dynamic range and the number of bits are desirably large as much as possible (for example, 16 bits).

Next, a description is given of detailed functions of the polarization information generating unit 102. The polarization information generating unit 102 is a processing unit for generating polarization information using polarized image obtained by the polarized image capturing unit 101.

Figure 6:
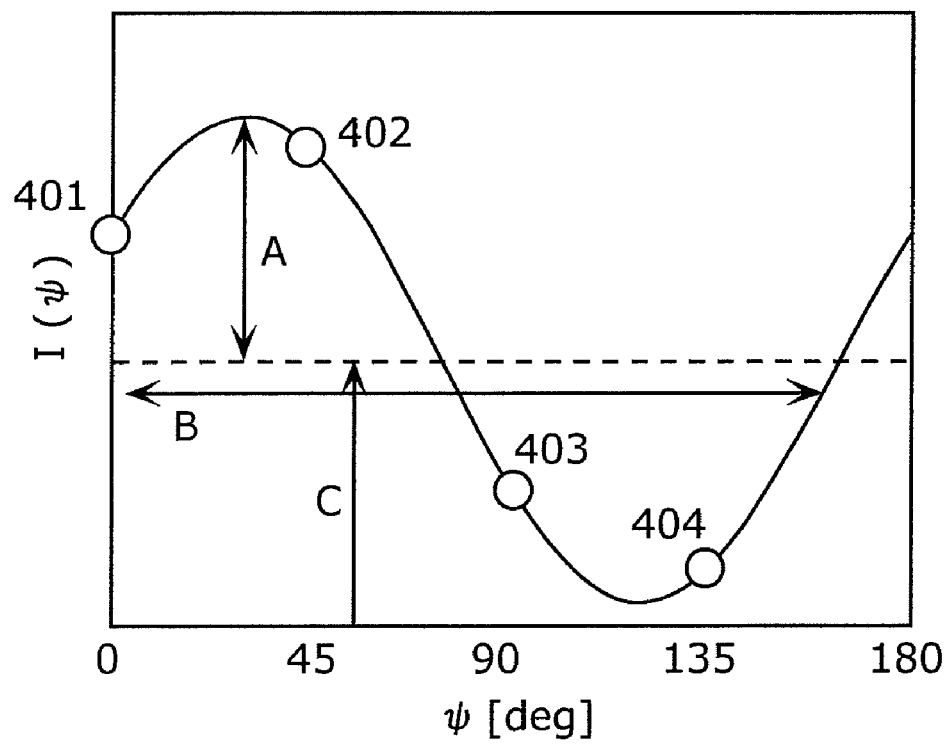
FIG. 6 is a schematic diagram for illustrating a luminance sinusoidal variation and observed luminance points.

It is known that the luminance changes after the transmission through the polarizers depending on the angles of polarization principal axes of the polarizers. FIG. 6 shows luminance sinusoidal curves 401 to 404 after the transmission through the four kinds of polarizers having different polarization principal axis angles ψi of 0, 45, 90, and 135 degrees, respectively. In other words, these sinusoidal curves show polarization characteristics in the point 501 in FIG. 5. It is to be noted that the polarization principal axis angle of 0 degree is identical to 180 degrees (π). In addition, it is desirable that a camera for achieving imaging gamma of 1 is used or the imaging gamma is corrected to 1 by linearity correction in the obtainment of these sinusoidal curves. These four points are drawn exactly on the respective sinusoidal curves, but in reality, it is desirable that one of these sinusoidal curves in 180-degree cycle is determined as the optimum value based on a lot of observation points.

This polarization information generating unit 102 generates, as polarization information, the amplitude and phase information of this curve. More specifically, the reflected light luminance I with respect to the principal axis angle φ of the patterned polarizer 201 is approximated as shown below.

[Math 1]

$$I(\psi) = A \cdot \sin 2(\psi - B) + C \quad \text{(Expression 1)}$$

Here, as shown in FIGS. 6, A, B, and C are constants in Expression 1, and represents the amplitude, phase, and average value of a luminance variation curve by a polarizer, respectively. Here, Expression 1 is expanded as shown below.

[Math 2]

$$I(\psi) = a \cdot \sin 2\psi + b \cdot \cos 2\psi + C \quad \text{(Expression 2)}$$

Where,

[Math 3]

$$A = \sqrt{a^2 + b^2},$$
$$\sin(-2B) = \frac{b}{\sqrt{a^2 + b^2}},$$
$$\cos(-2B) = \frac{a}{\sqrt{a^2 + b^2}}$$
(Expression 3)

[Math 4]

$$B = -\frac{1}{2}\tan^{-1}\left(\frac{b}{a}\right) \quad \text{(Expression 4)}$$

In other words, a sinusoidal (Expression 1) is approximated by calculating A, B, and C which minimize the following Expression 5 in the samples (φi, Ii) of the four pixels. However, Ii shows an observation luminance at the time when the rotation angle of the deflecting plate is φi. In addition, N is the number of samples, and is 4 here.

[Math 5]

$$f(a, b, C) = \sum_{i=0}^{N-1} (I_i - a \cdot \sin 2\psi_i - b\cos 2\psi_i - C)^2 \quad \text{(Expression 5)}$$

The above processes determine three parameters A, B, and C in sinusoidal approximation.

The polarization information generating unit 102 generates any one or some of the following as polarization information using parameters calculated in this way.

The degree of polarization ρ

[Math 6]

$$\rho = \frac{I_{max} - I_{min}}{I_{max} + I_{min}} = \frac{A}{C} = \frac{A}{\bar{I}} \quad \text{(Expression 6)}$$

Polarization phase φ (0 degree≦φ≦180 degrees)

[Math 7]

$$\phi = \frac{\pi}{4} + B \quad \text{(Expression 7)}$$

Estimated polarization error E

[Math 8]

$$E = \sum_{i=0}^{N-1} (I_i - A \cdot \sin 2(\psi_i - B) - C)^2 \quad \text{(Expression 8)}$$

Here, the degree of polarization is a parameter indicating the degree of polarization of light. A polarization phase is the angle at which luminance changing depending on the angle of the polarization principal axis becomes maximum. An estimated polarization error is the total of differences between the luminance values observed in the four pixel samples and the corresponding luminance values determined from the above sinusoidal obtained through the approximation.

Figure 7:
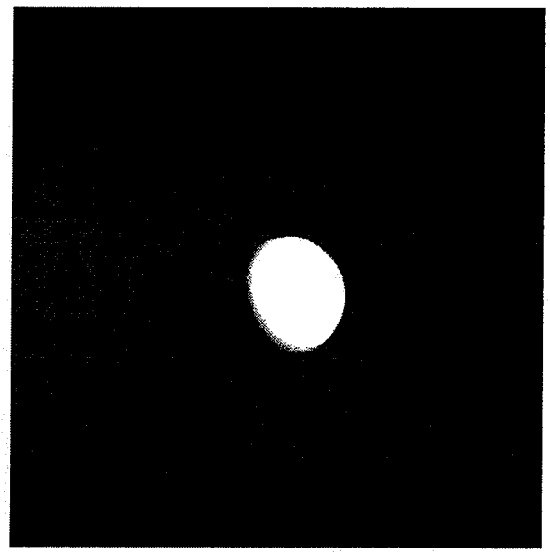
FIG. 7($a$) is a diagram showing a plastic sphere ball as an object, and FIG. 7($b$) to ($d$) are diagrams which respectively represent, in the three images, the degree of polarization $\rho$, the polarization phase angle $\phi$, and the estimated polarization error E in the case where the object is imaged.
Figure 7:
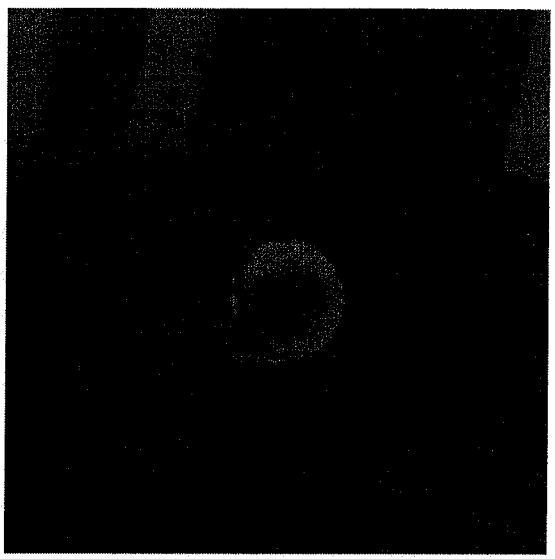
Figure 7:
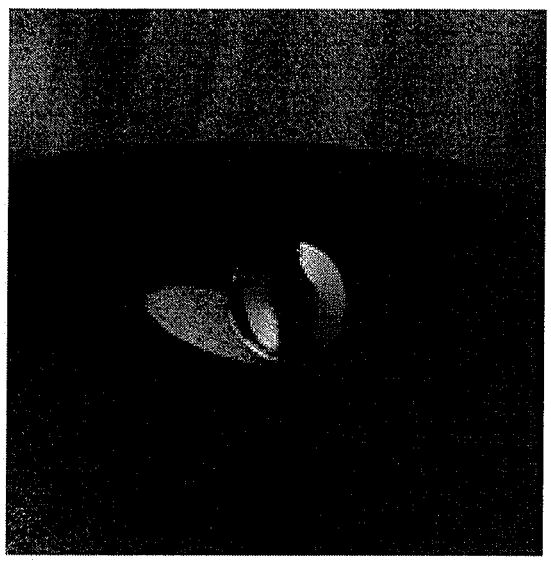
Figure 7:
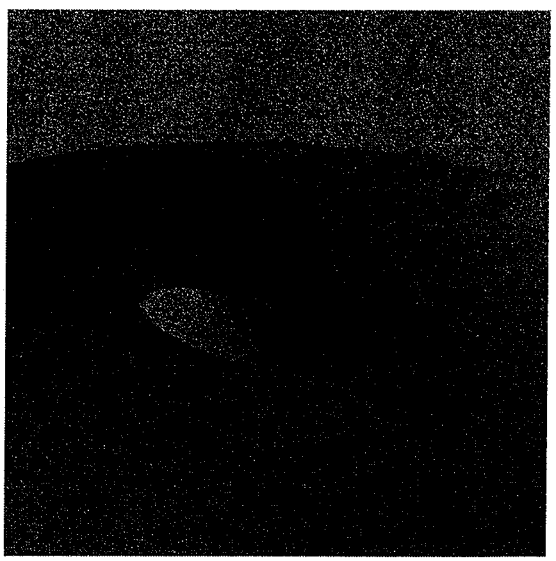
Figure 8:
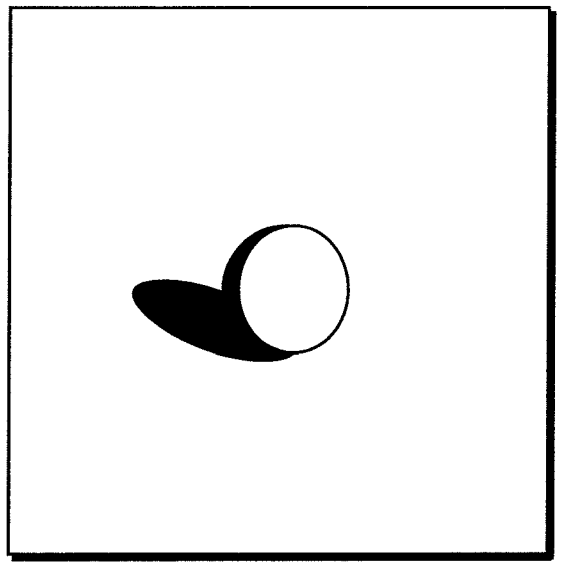
FIG. 8($a$) to ($d$) are schematic diagrams obtained by emphasizing the contrast of the respectively corresponding FIG. 7($a$) to ($d$)
Figure 8:
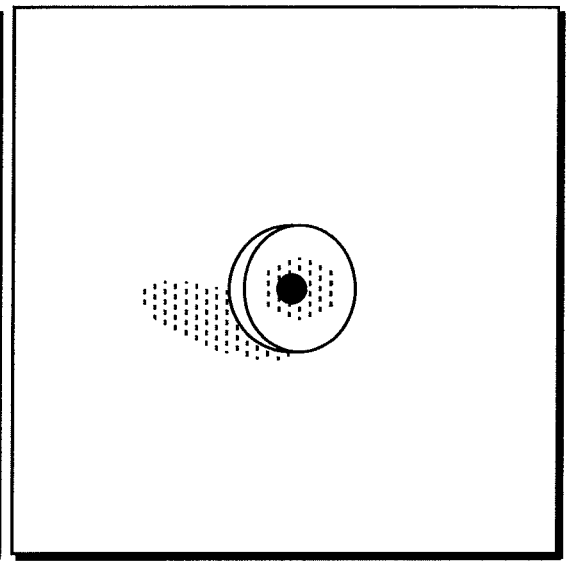
Figure 8:
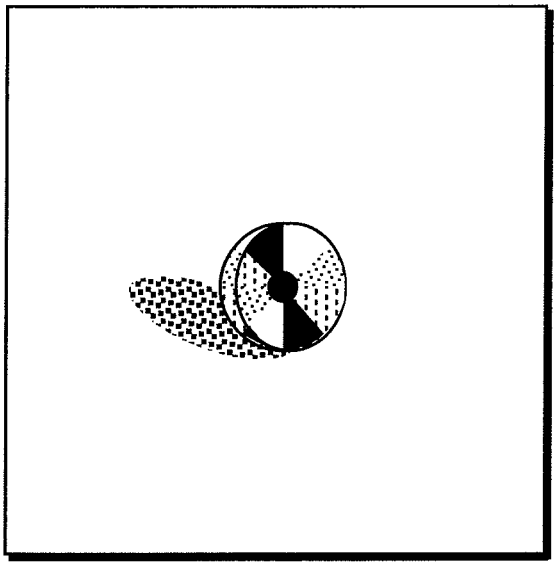
Figure 8:
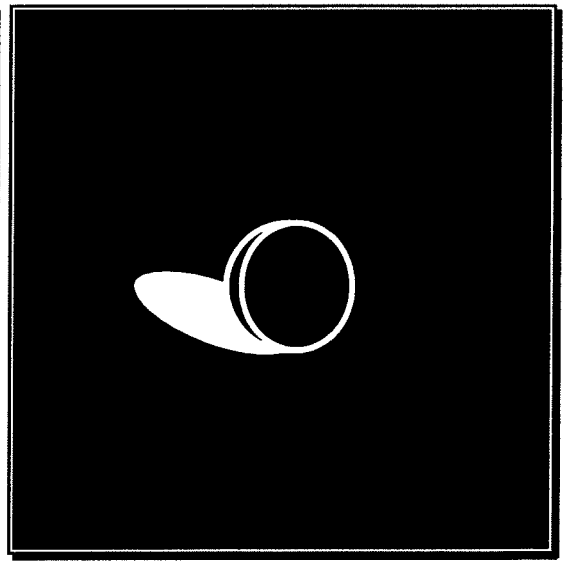

FIG. 7 is a diagram representing, in form of images, the degree of polarization ρ, the polarization phase φ, and the estimated polarization error E in the case where a plastic sphere ball as an object is imaged. In this diagram, FIG. 7(*a*) shows a plastic sphere ball as an object, and FIG. 7(*b*) shows the degree of polarization ρ of the object of FIG. 7(*a*), FIG. 7(*c*) shows the polarization phase φ (0 degree is shown in black, and 180 degrees is shown in white) of the object of FIG. 7(*a*), and FIG. 7(*d*) shows the estimated polarization error E of the object of FIG. 7(*a*). In addition, FIG. 8 shows schematic diagrams of FIG. 7 (including diagrams obtained by emphasizing the contrast of the diagrams of FIG. 7). Each of the drawings shows that white portions have larger luminance values, the degree of polarization is great around the shielding edge of the ball, the polarization phase simply increases in the 180 degree cycle counterclockwise around the sphere in the area which is not covered by the attached shadow of the object. This polarization phase is the angle at which the luminance changed by the rotation becomes the maximum value, and is the information of an emission plane in the case where light is diffuse reflected on the object.

Next, a description is given of the detailed functions of the area dividing unit 103. The area dividing unit 103 classifies the portions of an image into diffuse reflected areas, specular reflected areas, attached shadow areas, and cast shadow areas using polarization information generated by the polarization information generating unit 102 and the luminance information obtained by the polarized image capturing unit 101.

Here, descriptions are given of diffuse reflection and specular reflection. It is known that the reflection characteristics of the surface of the object are represented as the total of specular reflection components as "pressing mark" and diffuse reflection components as mat reflection components. The diffuse reflection components are observed irrespective of the direction of a light source which irradiates the object. Whereas, the specular reflection components can be observed only in the case where a light source is present in the substantially specular reflection direction with respect to the normal vector direction and sight line direction of the object because the specular reflection components are components having high direction dependency. This applies the polarization characteristics.

It is known that, in the case where the object is an object causing specular reflection which is "pressing mark", when light is irradiated from all the directions, the object is heavily affected by specular reflection which is specular reflection components (for example, as for transparent object, Non-patent reference 4: "Highlight no henkoh kaiseki ni motozuku tohmei buttai no hyomen keijyo sokutei (Measurement of Surface Orientations of Transparent Objects Using Polarization in Highlight), Megumi Saito, Yoichi Sato, Katsushi Ikeuchi, Hiroshi Kashiwagi, the Journal of The Institute of Electronics, Information and Communication, D-II, Vol. J82-D-II, No. 9, pp. 1383-1390, 1999

Figure 9:
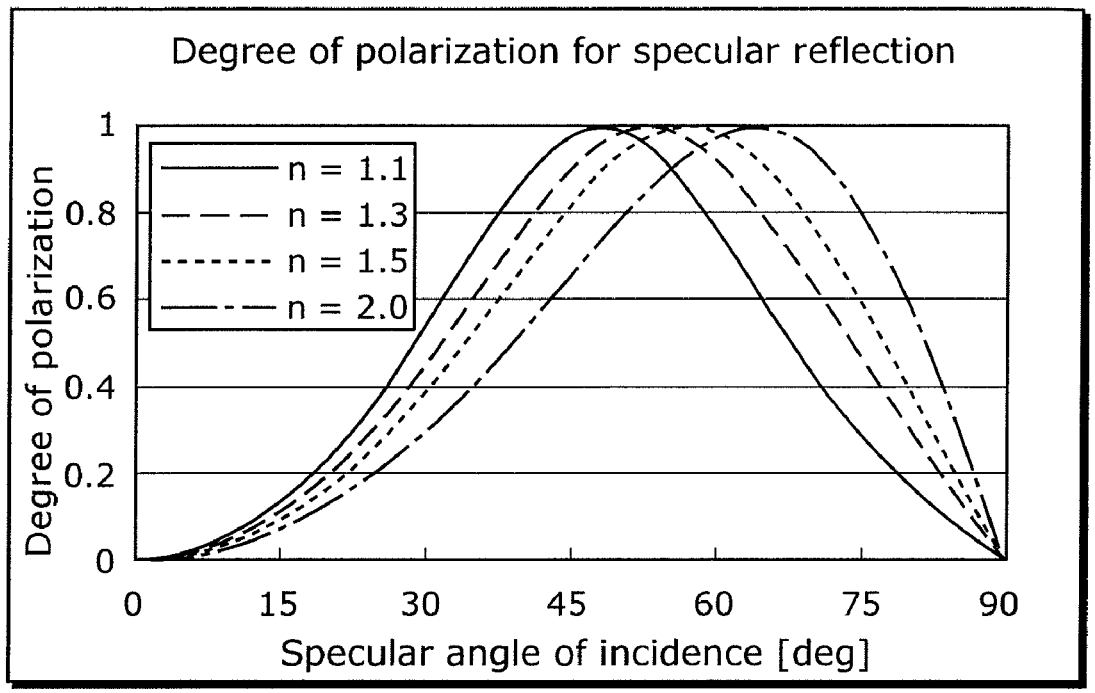
FIG. 9 is a graph showing the degree of polarization with respect to the incidence angle of specular reflection components when the refractive indices n of the object equal 1.1, 1.3, 1.5, and 2.0.
Figure 10:
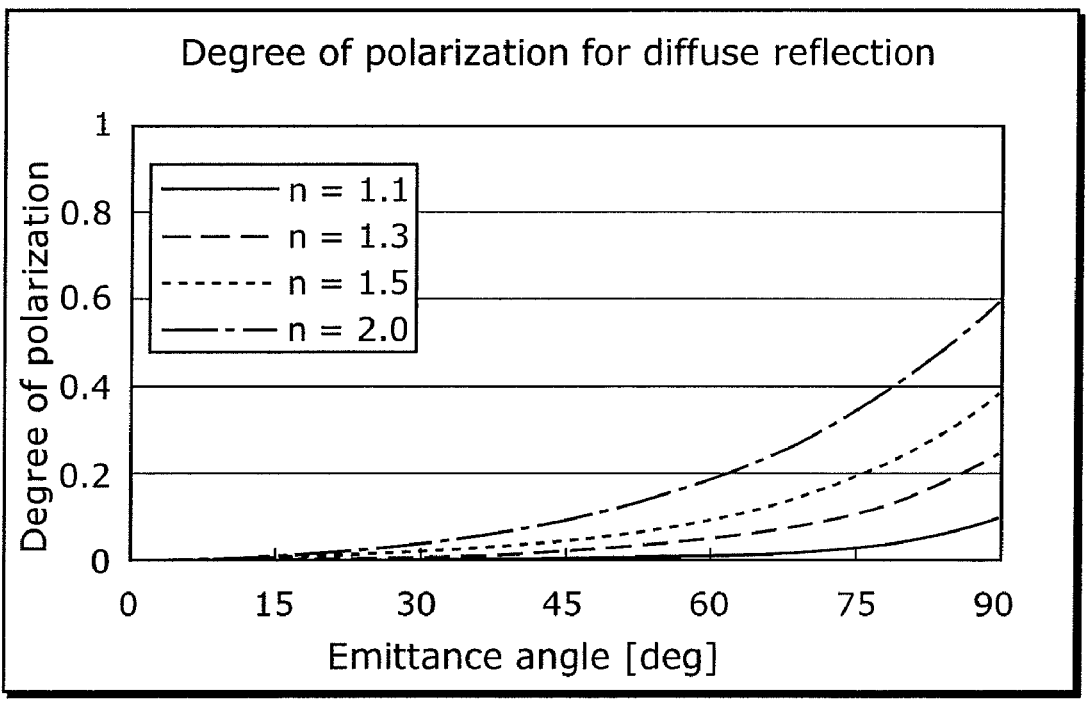
FIG. 10 is a graph showing the degree of polarization with respect to the emission angle of diffuse reflection components when the refractive indices n of the object equal 1.1, 1.3, 1.5, and 2.0.

FIG. 9 and FIG. 10 are graphs each showing the degree of polarization of specular reflection components and diffuse reflection components when the refractive index n of the object equals 1.1, 1.3, 1.5, and 2.0 (for example, "L. B. Wolff and T. E. Boult, 'Constraining object features using a polarization reflectance model', IEEE Transactions on Pattern Analysis and Machine Intelligence, Vol. 13, No. 7, pp. 635-657, 1991" Non-patent Reference 5.) Here, in FIG. 9, the horizontal axis shows an incidence angle, and the vertical axis shows the degree of polarization. In addition, in FIG. 10, the horizontal axis shows an emission angle, and the vertical axis shows the degree of polarization. The drawings show that the degrees of polarization of specular reflection components are higher than those of diffuse reflection components when light is emitted from all the directions. Based on this, it is estimated that specular reflection components are dominant also in respect of polarization characteristics. This applies when a shielding edge or the like having an emission angle of nearly 90 degrees is excluded.

Figure 11:
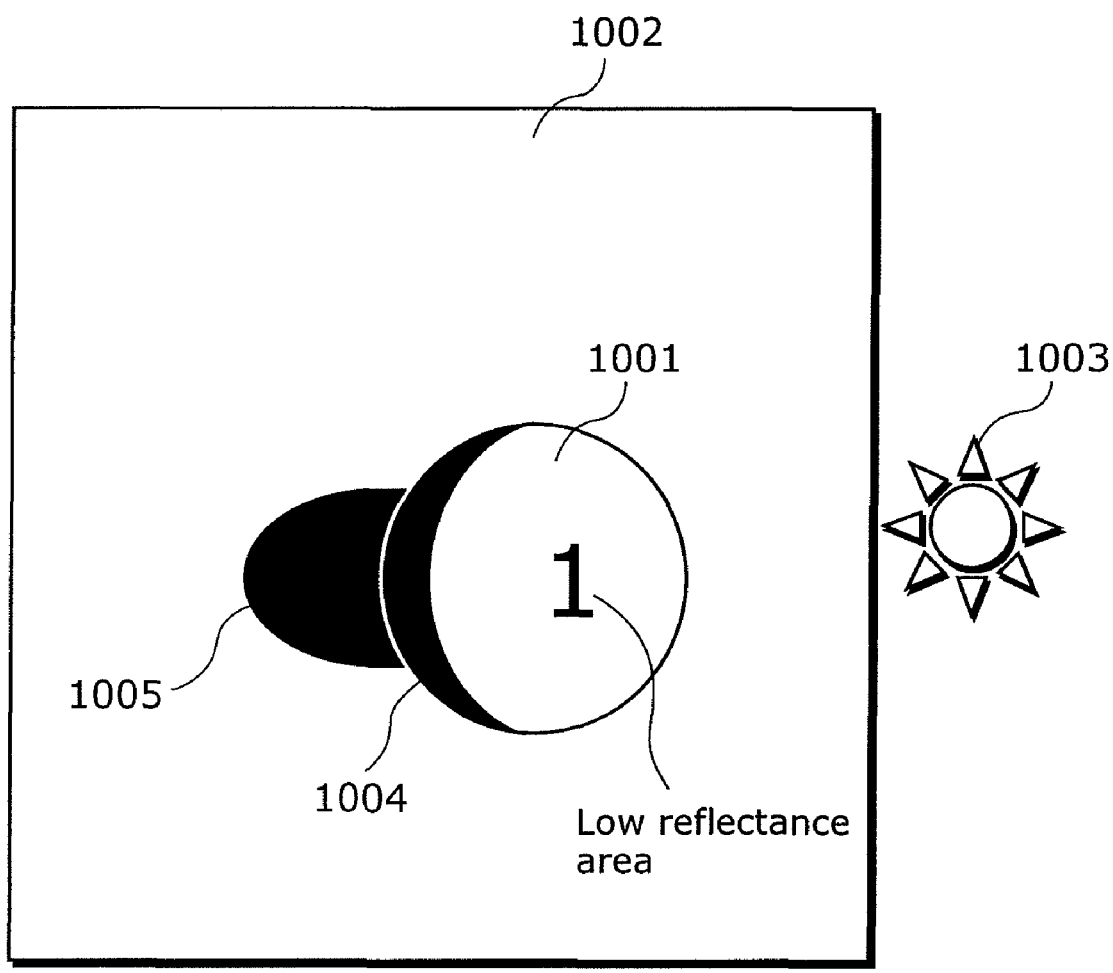
FIG. 11 is a schematic diagram for illustrating classification of a shadow area into an attached shadow area and a cast shadow area.

Next, descriptions are given of attached shadow areas and cast shadow areas. FIG. 11 is a schematic diagram for illustrating (classification of a shadow area into) an attached shadow area and a cast shadow area. What is shown here is that the object 1001 which is a sphere object placed on a plane 1002 is being lighted by the light source 1003. In this diagram, each of the area 1004 and the area 1005 shows a shadow area. The area 1004 is an "attached shadow area" which is generated because the normal vector of the object 1001 does not face the light source 1003, and the area 1005 is a "cast shadow area" which is generated because light is blocked by the object 1001 as a shielding.

Next, a description is given of the difference in polarization characteristics between attached shadow areas and cast shadow areas. First, it is assumed that a scene is imaged which satisfies the following Condition 1 satisfied by almost all image scenes captured on the ground.

Condition 1: "an object including a large plane exists near an object in an image scene, and a light source exists in the direction opposite to the large plane of the object.

This applies, for example, in the following scenes.

1. An indoor scene where a ball as an object is placed on a table. In addition, this ball is lighted by a fluorescent lamp placed on the ceiling.

2. An indoor scene where a person as an object is seated on a chair on a floor. In addition, this person is lighted by solar light coming through a window.

3. An outdoor scene where an automobile as an object is running on a road. This object is lighted by solar light.

In addition, this Condition is satisfied to almost all image scenes captured on the ground because walls and buildings have a large plane.

Figure 12:
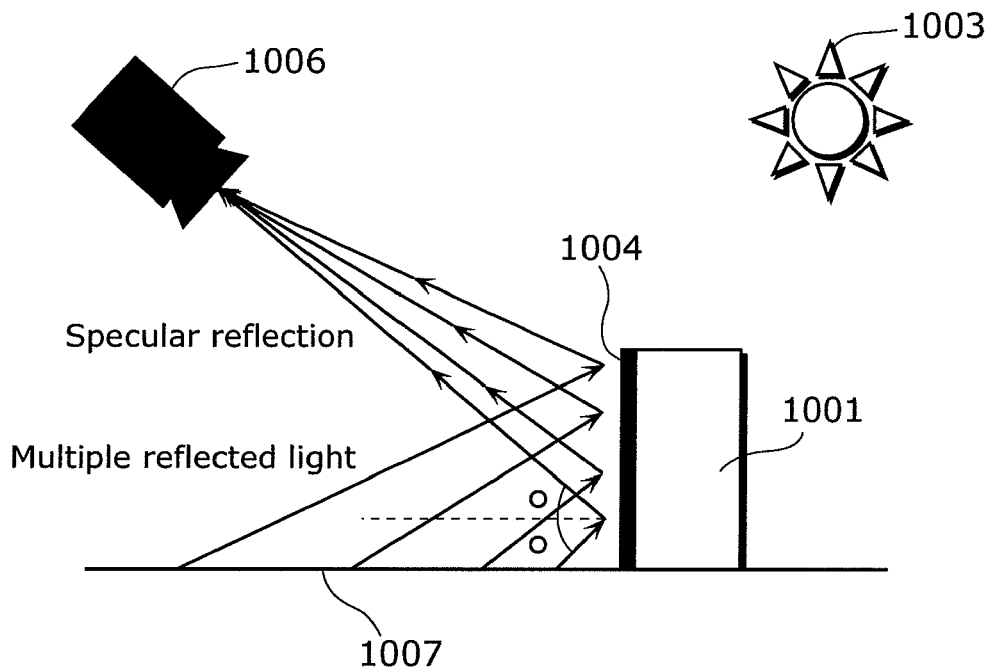
FIG. 12 is a schematic diagram for illustrating incidence of multiple reflected light in an attached shadow area.

First, a description is given of an attached shadow area in the case where this Condition 1 is satisfied. As shown in FIG. 11, an attached shadow area is a shadow area which appears because the normal vector of an object faces the direction opposite to the light source. Here, taking into consideration, based on the Condition 1, that a large plane exists in the direction opposite to the light source and that, in reality, a large amount of wraparound light (multiple reflected light) exist in the shadow area, it is considered that multiple reflected light is incident from various directions in the attached shadow area. In other words, it is considered that multiple reflected light as specular reflection exists with respect to the normal vectors of the camera 200 and the pixels in which attached shadow area is generated. FIG. 12 is a schematic diagram showing this state. In this diagram, the camera 1006 shows a camera mounting the optical area dividing device 100 in this Embodiment, and the plane 1007 shows the large plane.

As described earlier, the degrees of polarization of specular reflection components are higher than those of diffuse reflection components. Therefore, the attached shadow areas indicating the reflection characteristics of specular reflection components have a relatively higher degree of polarization.

Figure 13:
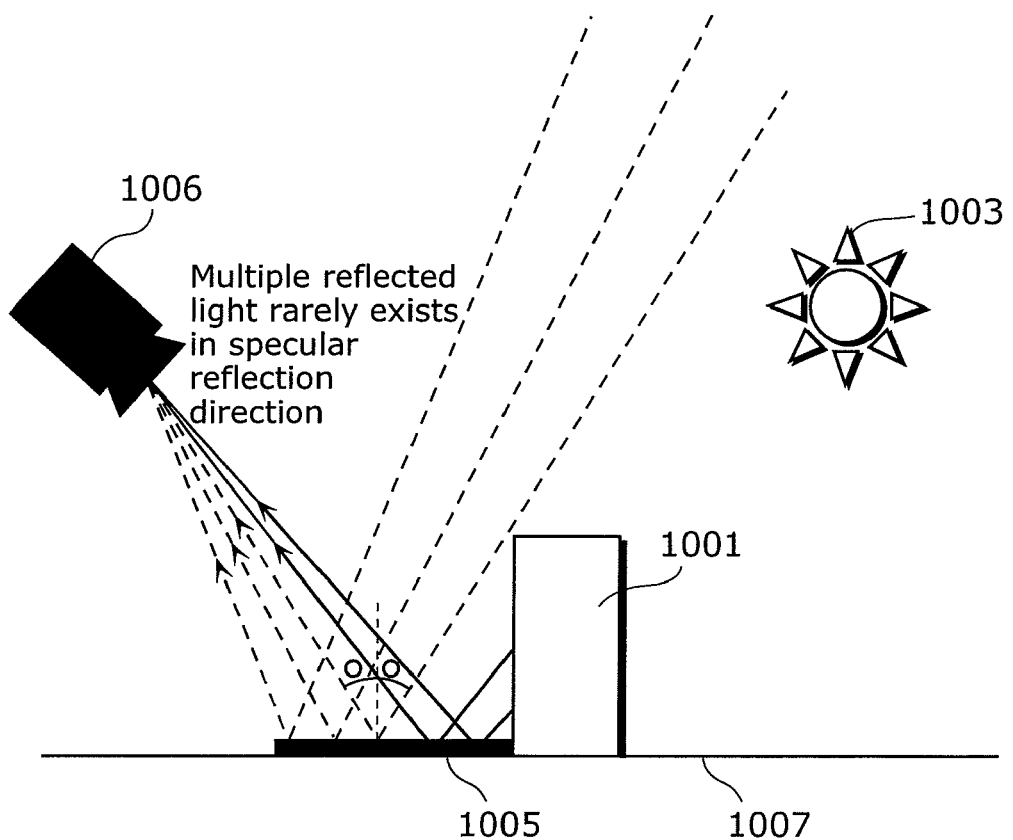
FIG. 13 is a schematic diagram for illustrating incidence of multiple reflected light in a cast shadow area.

Next, a description is given of attached shadow areas. As shown in FIG. 11, an attached shadow area is a shadow area which is generated when light is blocked by a shielding. Here, considering the Condition 1, it is likely that attached shadow areas are generated on a plane in a normal vector direction of a large plane. Therefore, multiple reflected light comes only from directions limited compared to the case of attached shadow area. From this, it is unlikely that the light source exists in the specular reflection direction. FIG. 13 is a schematic diagram showing this state.

Further, as shown in FIG. 10, the degree of polarization of diffuse reflection components is relatively low. This shows that the polarization components in the attached shadow area are relatively small. Luminance itself is small in shadow areas, and thus it is very difficult to estimate small polarization components. Therefore, the estimated polarization errors in the attached shadow areas are very large.

To sum up the above, the polarization characteristics of shadow areas are classified as shown below.

(1) Attached Shadow Areas
   The degree of polarization is high, and estimated polarization errors are small.
   In many cases, specular reflection characteristics are indicated.
(2) Cast Shadow Areas
   The degree of polarization is low, and estimated polarization errors are large in number.
   In many cases, diffuse reflection characteristics are shown.

The use of these classification standards makes it possible to classify shadow areas into attached shadow areas and cast shadow areas. For example, it is possible to divide, from attached shadow areas, low luminance areas identified by polarization information indicating polarization characteristics of specular reflection (indicating that the degree of polarization is high, or the estimated polarization errors are small). A description is given below of the area dividing unit 103 which performs area division using such characteristics.

Figure 14:
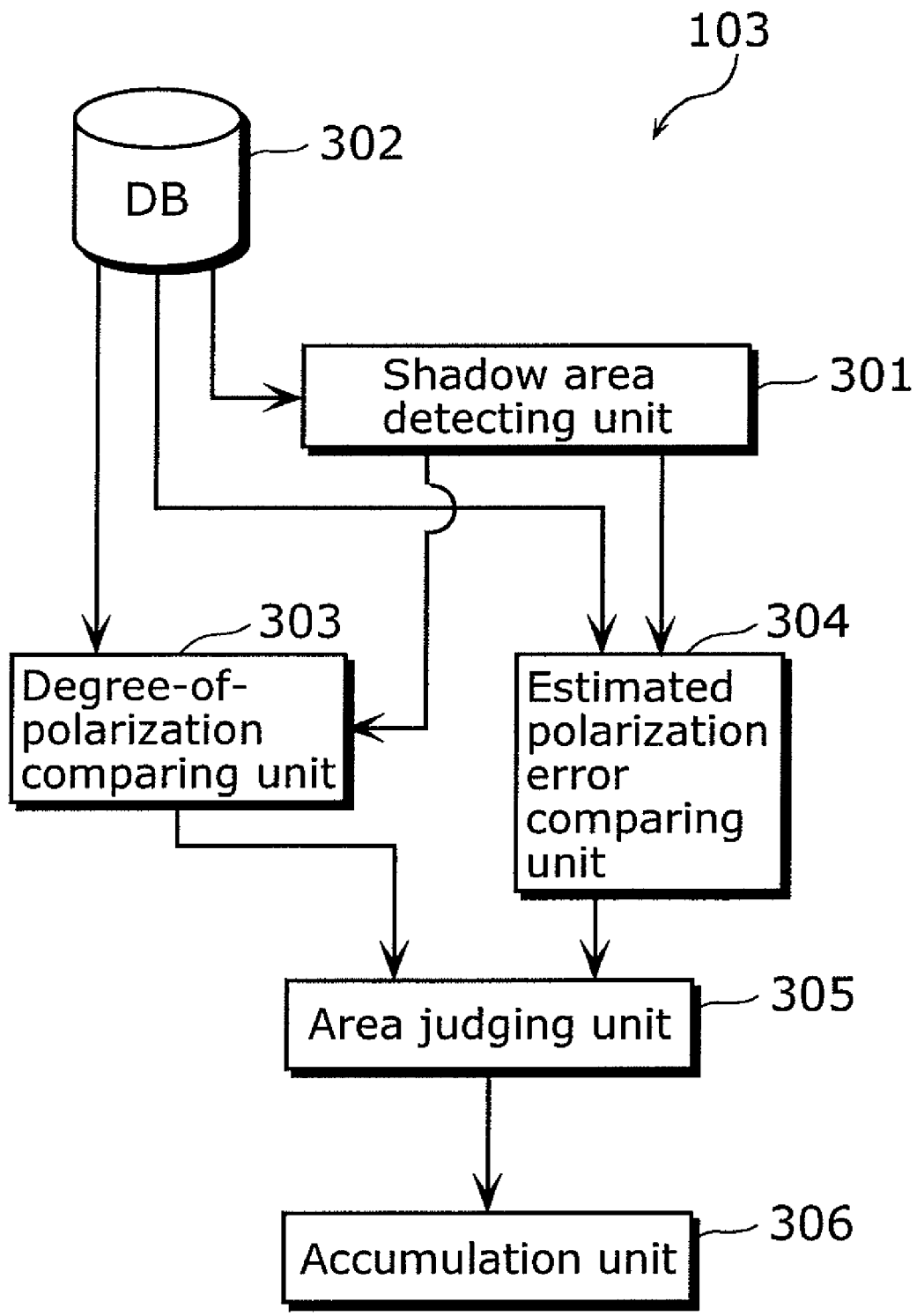
FIG. 14 is a functional block diagram showing a detailed structure of an area dividing unit in Embodiment 1 of the present invention.

FIG. 14 is a functional block diagram showing a detailed structure of the area dividing unit 103 in the optical area dividing device 100 shown in FIG. 1. The area dividing unit 103 is a processing unit for classifying the portions of an image into diffuse reflection areas, specular reflection areas, attached shadow areas, and cast shadow areas using the polarization information generated by the polarization information generating unit 102 and the luminance information obtained by the polarized image capturing unit 101. The area dividing unit 103 includes a shadow area detecting unit 301, a DB 302, a degree-of-polarization comparing unit 303, an estimated polarization error comparing unit 304, an area judging unit 305, and an accumulation unit 306.

The shadow area detecting unit 301 is a processing unit for estimating whether the pixels in an image obtained by the polarized image capturing unit 101 are shadow areas or not.

The DB 302 is a memory or the like for storing, in advance, a threshold value TH_PDS referred to by the degree-of-polarization comparing unit 303 and the threshold value Th_Err referred to by the estimated polarization error comparing unit 304.

The degree-of-polarization comparing unit 303 is a processing unit for reading the threshold value TH_PDS from the DB 302, and comparing the degree of polarization of a target pixel that the shadow area detecting unit 301 has estimated to be a non-shadow area and the threshold value TH_PDS.

The estimated polarization error comparing unit 304 is a processing unit for reading the threshold value Th_Err from the DB 302, and comparing the estimated polarization error E of a target pixel that the shadow area detecting unit 301 has estimated to be a shadow area and the threshold value Th_Err.

The area judging unit 305 judges whether the target pixel is a diffuse reflection area, a specular reflection area, a cast shadow area, or an attached shadow area, depending on the result of comparison made by the degree-of-polarization comparing unit 303 and the estimated polarization error comparing unit 304, and accumulates the result in the accumulation unit 306.

The accumulation unit 306 is a memory or the like for storing the result of the area division by the area judging unit 305.

Figure 15:
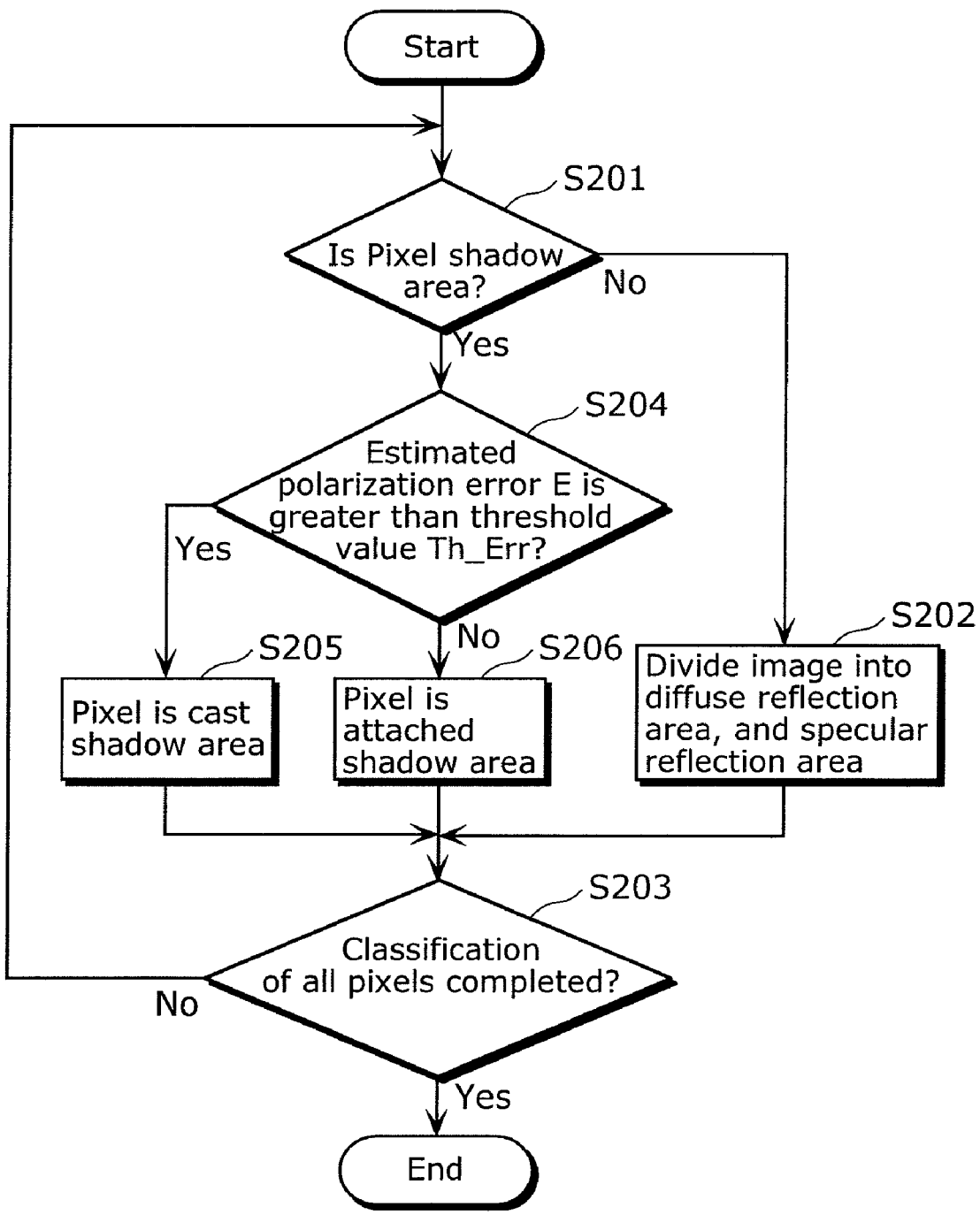
FIG. 15 is a flowchart of processes performed by the area dividing unit in Embodiment 1 of the present invention.

FIG. 15 is a flowchart of processes performed by this area dividing unit 103. First, the shadow area detecting unit 301 estimates whether or not a pixel in the image obtained by the polarized image capturing unit 101 is a low luminance area (a shadow area in this Embodiment) (S201). For example, the pixel having a luminance value or a luminance variation curve amplitude by a polarizer equal to or less than a threshold value may be estimated to be a shadow area, based on the fact that a shadow area has a low luminance value. The threshold value for estimating a shadow area in this way may be determined empirically. For example, 256 may be set for the luminance value of a 16-bit monochrome image. This threshold value may be held in the DB 302. FIG. 16(a) is a result of shadow detecting processes performed on the image of FIG. 7(a) (FIG. 8(a) which is a schematic diagram of FIG. 7(a)). The black area in the drawings shows the cast shadow resulting from the detection.

Figure 17:
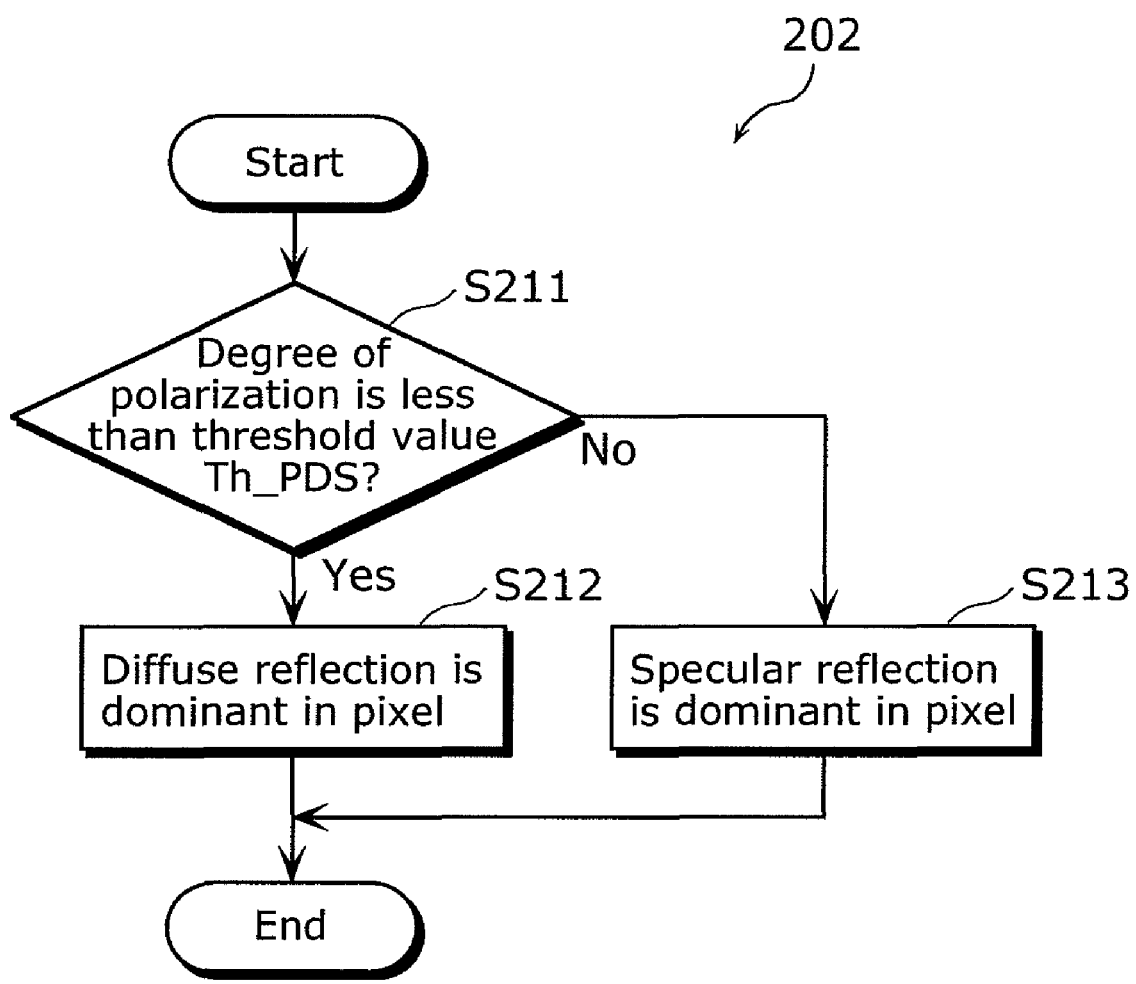
FIG. 17 is a flowchart of processes for classification into diffusion reflection and specular reflection in Embodiment 1 of the present invention.

When the pixel is not a shadow area (No in S201), the degree-of-polarization comparing unit 303 judges whether the diffuse reflection components are dominant or specular reflection components are dominant in the pixel (S202). FIG. 17 is a flowchart of detailed processes for classification into diffuse reflection and specular reflection (S202) by the degree-of-polarization comparing unit 303. Here, the degree-of-polarization comparing unit 303 judges whether the diffuse reflection is dominant or specular reflection is dominant in the pixel, based on the earlier-mentioned fact that "the degree of polarization is high in specular reflection". First, the degree-of-polarization comparing unit 303 checks whether the degree of polarization of the pixel is less than the threshold value TH_PDS or not (S211). When the degree of polarization of the pixel is less than the threshold value TH_PDS (Yes in S211), the area judging unit 305 judges that diffuse reflection is dominant in the pixel (the pixel is a diffuse reflection area) (S212). In the opposite case where the degree of polarization is greater than the threshold value TH_PDS (No in S211), the area judging unit 305 judges that specular reflection is dominant in the pixel (the pixel is a specular reflection area) (S213). The area judging unit 305 accumulates the result of the area division in the accumulation unit 306.

It is to be noted that the threshold value Th_PDS may be set based on the refraction index of the object, the normal vector direction of the object, the light source direction, the sight line direction and the like. As shown in FIG. 9 and FIG. 10, the polarization degree of specular reflection components of the object and the polarization degree of diffuse reflection components can be uniquely determined when the refraction index, the incidence angle, and the emission angle are calculated. Therefore, the polarization degree of specular reflection components and the polarization degree of diffuse reflection components calculated in FIG. 9 and FIG. 10 may be used as threshold values Th_PDS. In addition, in the case where information such as the refraction index of the object, the normal vector direction of the object, the light source direction, the sight line direction cannot be obtained, the threshold value Th_PDS may be determined based on the possible maximum value of the polarization degree of a diffuse reflection component. For example, it is considered, from FIG. 10, that the maximum value of the polarization degree of a diffuse reflection component is approximately 0.6 supposing that no object having a refraction index of 2.0 or more exists, and thus approximately 0.7 may be set as the threshold value Th_PDS. These threshold values may be held in the DB 302.

After the completion of the diffuse reflection/specular reflection classification process (S202), the area judging unit 305 checks whether or not the optical classification of all the pixels have been completed (S203). If there remains a pixel which has not been classified yet (No in S203), the shadow area detecting unit 301 detects whether or not another pixel is a shadow area (S201). In addition, the optical classification of all the pixels has been completed (Yes in S203), the area dividing unit 103 completes the processing.

In the opposite case where the pixel is a shadow area (Yes in S201), the estimated polarization error comparing unit 304 evaluates the magnitude of the estimated polarization error E defined according to the above Expression 8 (S204). In other words, the estimated polarization error comparing unit 304 compares the magnitude of the estimated polarization error E and the threshold value Th_Err. As the result, when the magnitude of the estimated polarization error E is greater than the threshold value Th_Err (Yes in S204), the area judging unit 305 judges that the pixel is a cast shadow area (S205). In contrast, when the magnitude of the estimated polarization error E is less than the threshold value Th_Err (No in S204), the area judging unit 305 judges that the pixel is an attached shadow area (S206). The area judging unit 305 accumulates the result of the area division in the accumulation unit 306.

The threshold value Th_Err at this time may be determined using, as standards, the luminance value of the captured image, the amplitude component A and the bias component C of Expression 2. For example, the following may be applied when determining the threshold value Th_Err using, as a standard, the amplitude component A.

[Math 9]

$$Th\_Err=(Th\_E)^2 \cdot (2A)^2 \cdot N \qquad \text{(Expression 9)}$$

This Expression shows the difference between the degree of the estimated polarization error E and the amplitude component A. Here, Th_E is a proper positive constant, and may be determined empirically. For example, 0.3 may be set. In addition, N is the number of samples mentioned above. These threshold values may be held in the DB 302.

Figure 16:
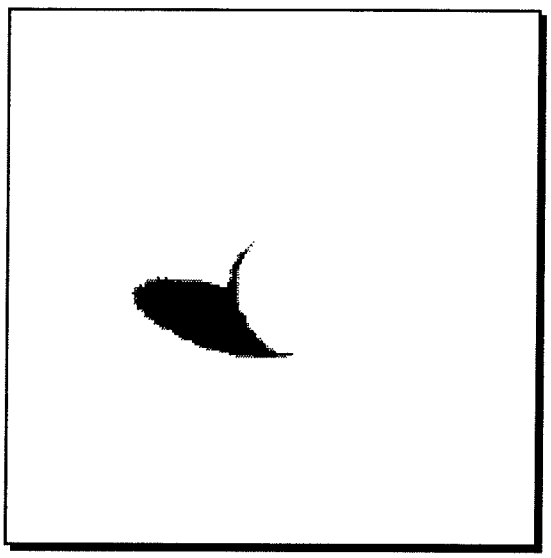
FIG. 16($a$), ($b$), and ($c$) are diagrams showing the results of optical area division performed by the area dividing unit in Embodiment 1 of the present invention.
Figure 16:
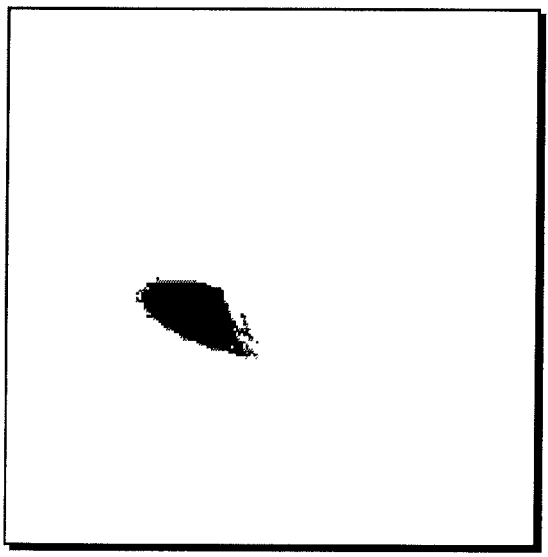
Figure 16:
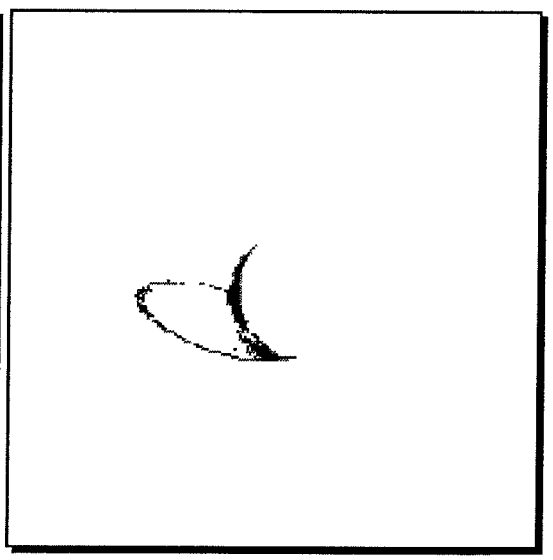

FIG. 16(*b*) and FIG. 16(*c*) show the attached shadow area and the cast shadow area calculated in this way. In the drawings, the black areas are selected areas. It is possible to separate the cast shadow area and the attached shadow area by performing contraction and expansion processes on large areas used in the image processing for each of the cast shadow areas and the attached shadow areas calculated in this way.

FIG. 18 is a diagram showing an example of area division performed by the area dividing unit 103. Here are shown, for each of the pixels which make up a polarized image, specific values of the pixel position, the amplitude A, the degree of polarization ρ, the polarization phase ϕ, the estimated polarization error E, and the result of the area division. Here, the judgment standards in the area division are as shown in FIG. 19. In other words, whether a pixel is a diffuse reflection area, a specular reflection area, or a shadow area is judged depending on whether the amplitude A is 256 or more (S201 in FIG. 15), whether a pixel is a diffuse reflection area, or a specular reflection area is judged depending on whether the degree of polarization ρ is less than 0.7 or not (S211 in FIG. 17), and whether a pixel is a cast shadow area or an attached shadow area is judged depending on whether the estimated polarization error E is greater than the threshold value Th_Err shown in the Expression 9 (S204 in FIG. 15). As the result of the judgment based on these judgment standards, as shown in FIG. 18, it is judged that the pixels (141, 117) belong to diffuse reflection areas, the pixels (151, 138) belong to specular reflection areas, the pixels (111, 144) belong to attached shadow areas, the pixels (98, 151) belong to cast shadow areas, and the pixels (165, 144) belong to diffuse reflection areas.

Figure 20:
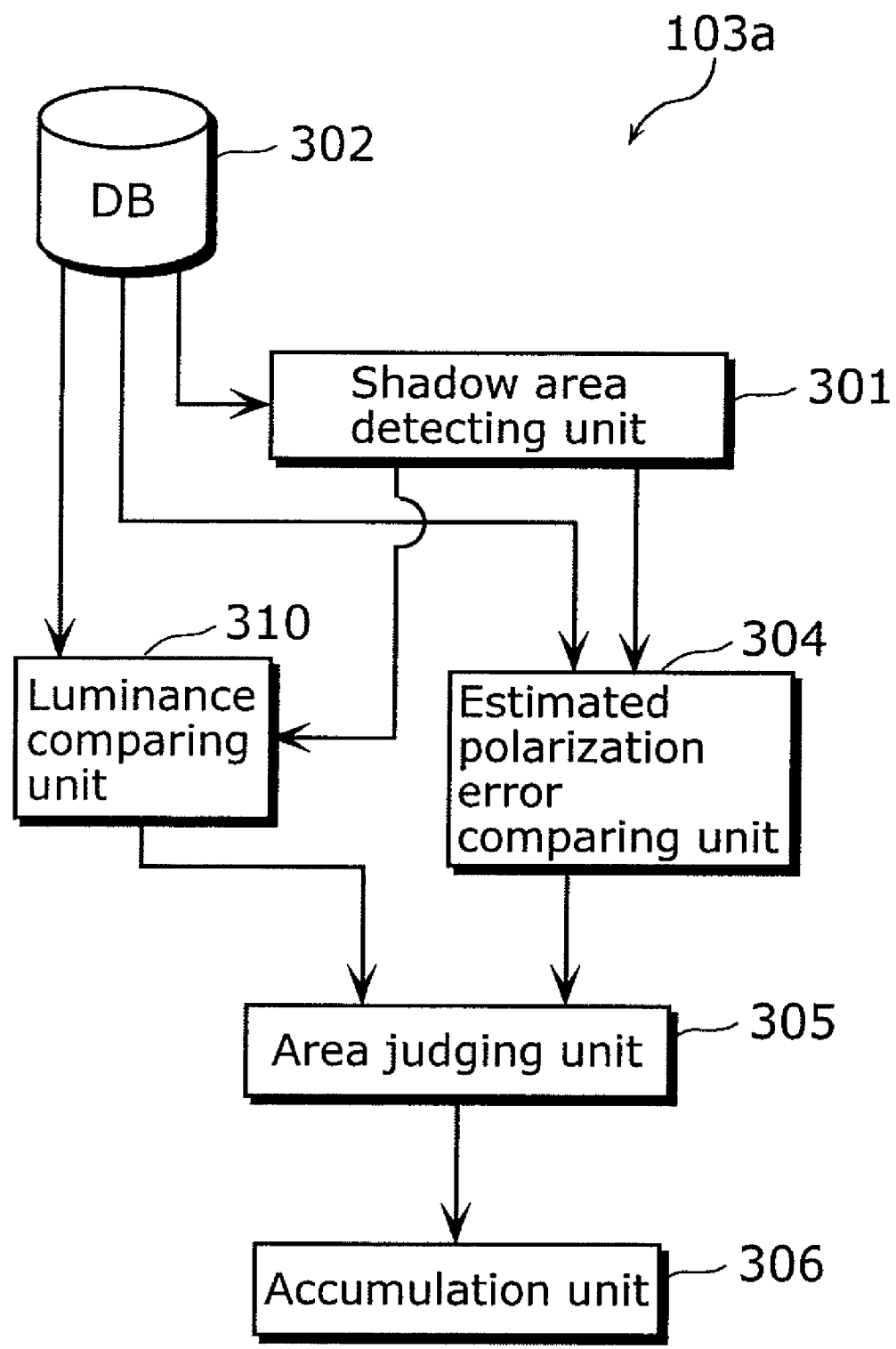
FIG. 20 is a functional block diagram showing the structure of the area dividing unit according to a Variation of Embodiment 1 in the present invention.

In the processes shown in FIG. 15, the degree of polarization is used to judge whether diffuse reflection components are dominant in the pixel or specular reflection components are dominant in the pixel (S202), but it is to be noted that a luminance value may be used. FIG. 20 is a functional block diagram showing the detailed structure of the area dividing unit 103*a* according to this Variation for judging diffuse reflection or specular reflection using the luminance value. This area dividing unit 103*a* includes a shadow area detecting unit 301, a DB 302, an estimated polarization error comparing unit 304, an area judging unit 305, an accumulation unit 306, and a luminance comparing unit 310. It is to be noted that, in FIG. 20, the structural elements common with FIG. 14 are assigned with the same numerical references as those in FIG. 14, and detailed descriptions thereof are omitted.

The luminance comparing unit 310 is a processing unit for reading the threshold value TH_IDS from the DB 302, and comparing the luminance value of the target pixel and the threshold value TH_IDS.

Figure 21:
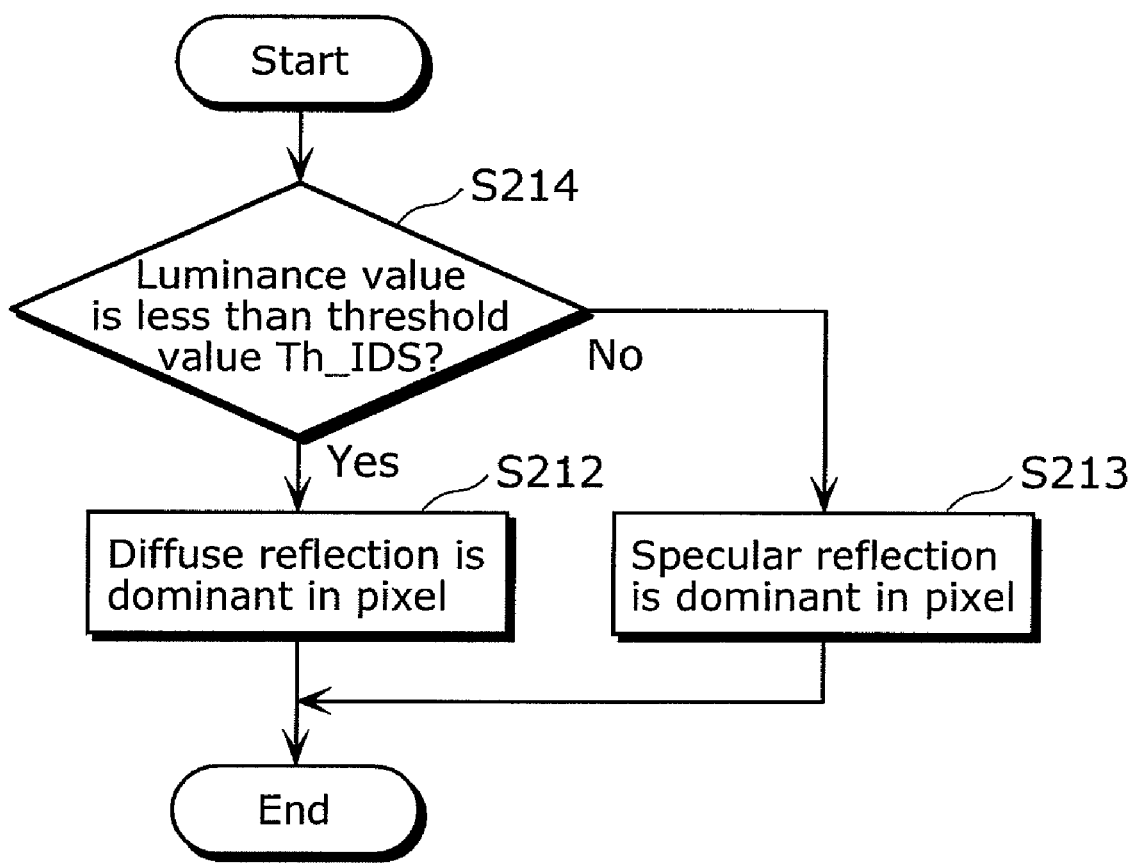
FIG. 21 is a flowchart of processes for classification into diffuse reflection and specular reflection performed by the area dividing unit shown in FIG. 20.

FIG. 21 is a flowchart of processes performed by this area dividing unit 103*a*. It is to be noted that, in FIG. 21, the steps common with FIG. 17 are assigned with the same numerical references as those in FIG. 17, and detailed descriptions thereof are omitted. The luminance comparing unit 310 checks whether the luminance value of the pixel is less than the threshold value TH_IDS or not (S214). When the luminance value of the pixel is less than the threshold value TH_IDS (Yes in S214), the area judging unit 305 judges that diffuse reflection is dominant in the pixel (S212). In the opposite case where the luminance value of the pixel is greater than the threshold value TH_IDS (No in S214), the area judging unit 305 judges that specular reflection is dominant in the pixel (S213). In this way, it is judged whether diffuse reflection components are dominant in the pixel or specular reflection components are dominant in the pixel using the luminance value.

Figure 22:
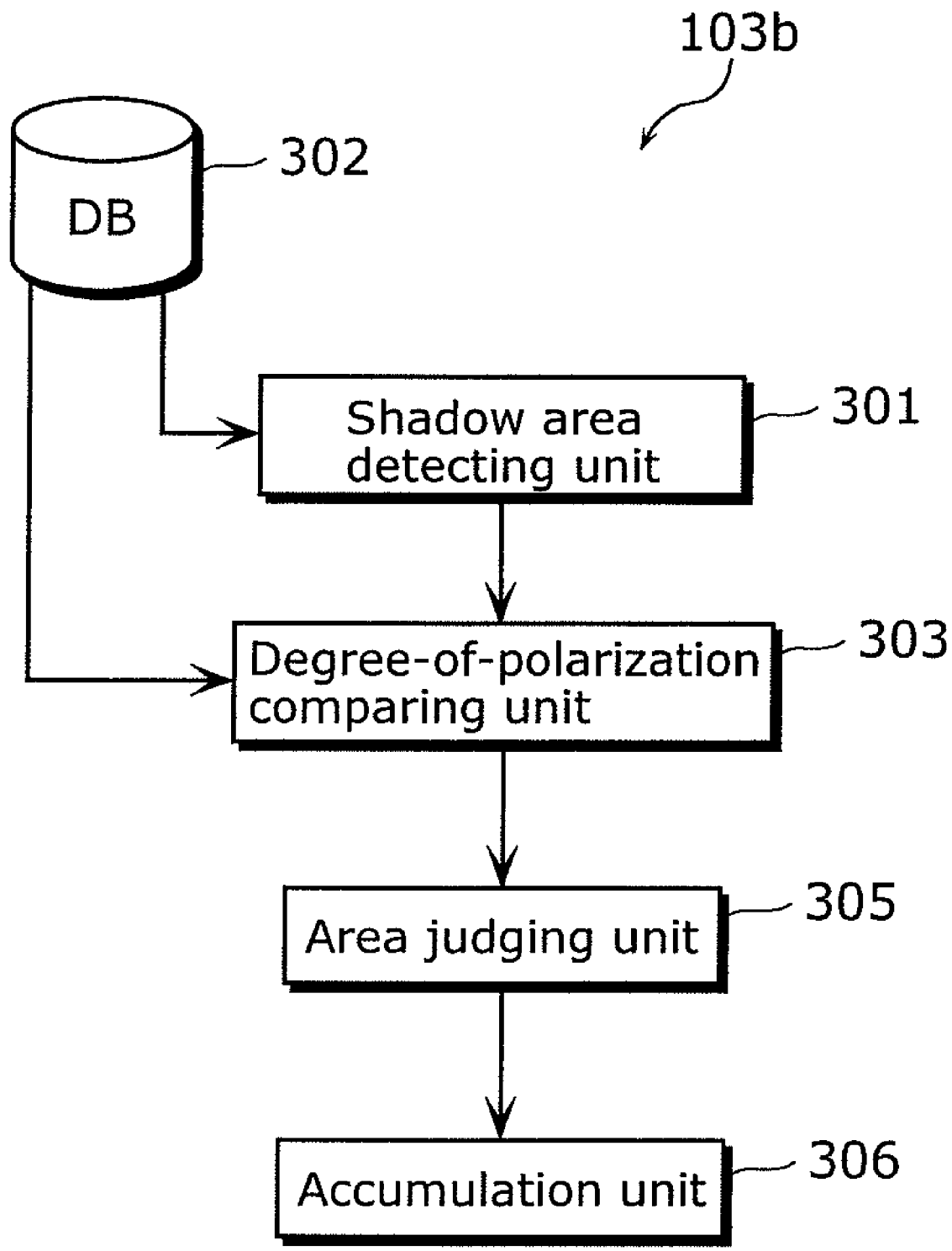
FIG. 22 is a functional block diagram showing the structure of the area dividing unit according to the Variation of Embodiment 1 in the present invention.

In addition, the degree of polarization may be used instead of the estimated polarization error in the judgment whether the pixel is an attached shadow area or a cast shadow area using an estimated polarization error (S204) in the processes shown in FIG. 15. FIG. 22 is a functional block diagram showing the detailed structure of the area dividing unit 103*b* according to this Variation for judging whether an attached shadow area or a cast shadow area using the degree of polarization. This area dividing unit 103*b* includes a shadow area detecting unit 301, a DB 302, an estimated polarization error comparing unit 304, an area judging unit 305 and an accumulation unit 306. It is to be noted that, in FIG. 22, the structural elements common with FIG. 14 are assigned with the same numerical references as those in FIG. 14, and detailed descriptions thereof are omitted.

Figure 23:
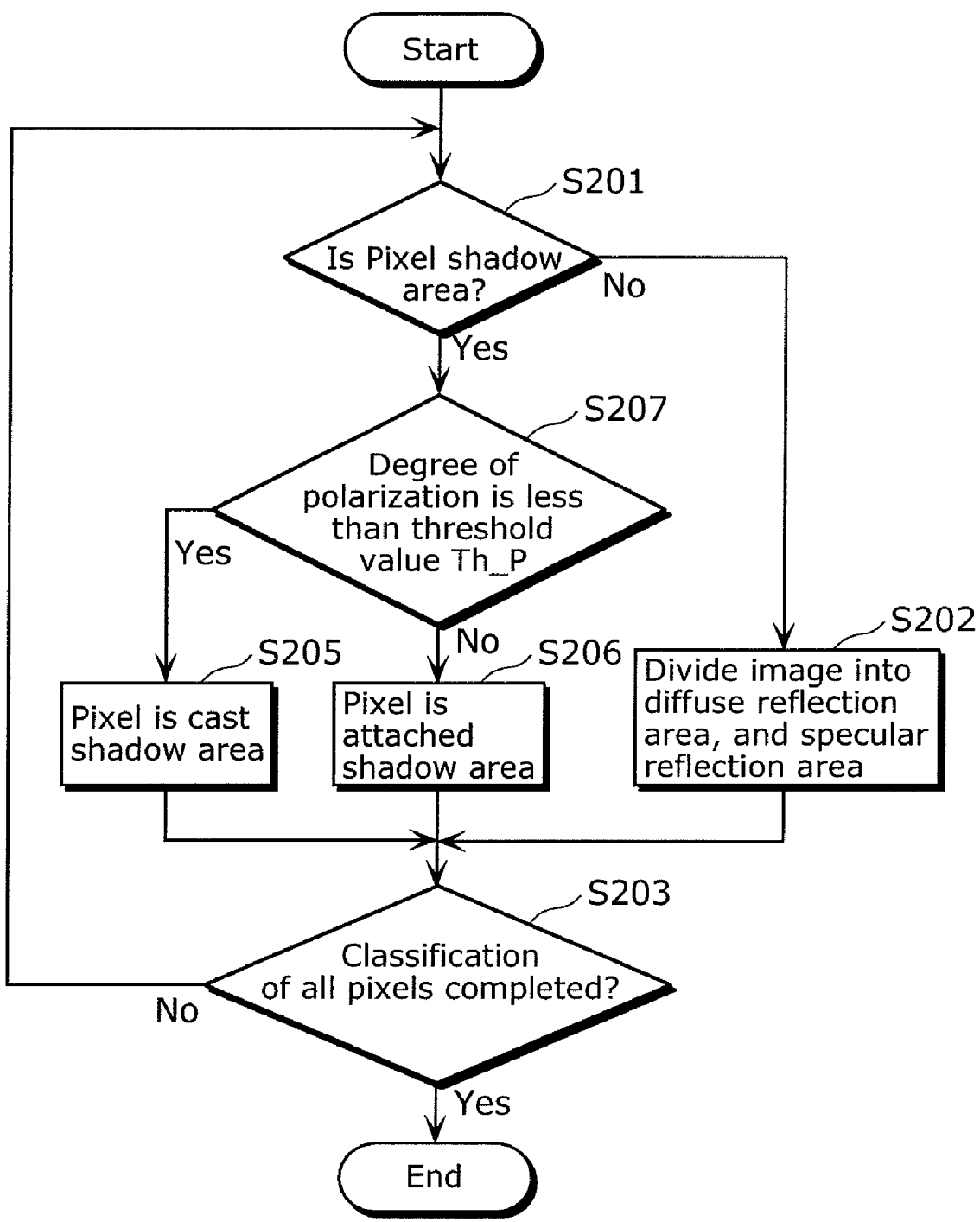
FIG. 23 is a flowchart of processes performed by the area dividing unit shown in FIG. 22.

FIG. 23 is a flowchart of processes performed by this area dividing unit 103*b*. It is to be noted that, in FIG. 23, the steps common with FIG. 15 are assigned with the same numerical references as those in FIG. 15, and detailed descriptions thereof are omitted.

When the shadow area detecting unit 301 judges that the pixel is a shadow area (Yes in S201), the degree-of-polarization comparing unit 303 compares the degree of polarization ρ defined by Expression 6 and the threshold value Th_P in order to judge whether the pixel is an attached shadow area or a cast shadow area (S207). As the result, when the degree of polarization ρ is less than the threshold value Th_P (Yes in S207), the area dividing unit 305 judges that the pixel is a cast shadow area (S205), whereas when the degree of polarization ρ is less than the threshold value Th_P (No in S207), the area dividing unit 305 judges that the pixel is an attached shadow area (S206). In this way, whether the pixel is an attached shadow area or a cast shadow area is judged based on the degree of polarization.

It is to be noted that the threshold value Th_P may be set based on the refraction index of the object, the normal vector direction of the object, the light source direction, the sight line direction and the like. As shown in FIG. 9 and FIG. 10, the polarization degree of specular reflection components of the object and the polarization degree of diffuse reflection components can be uniquely determined when the refraction index, the incidence angle, and the emission angle are calculated. Therefore, the polarization degree of specular reflection components and the polarization degree of diffuse reflection components calculated in FIG. 9 and FIG. 10 may be used as Th_P. In addition, in the case where information such as the refraction index of the object, the normal vector direction of the object, the light source direction, the sight line direction cannot be obtained, the threshold value Th_P may be determined based on the possible maximum value of the polarization degree of a diffuse reflection component. For example, it is considered, from FIG. 10, that the maximum value of the polarization degree of a diffuse reflection component is approximately 0.6 supposing that no object having a refraction index of 2.0 or more exists, and thus approximately 0.7 may be set as the threshold value Th_P.

Figure 24:
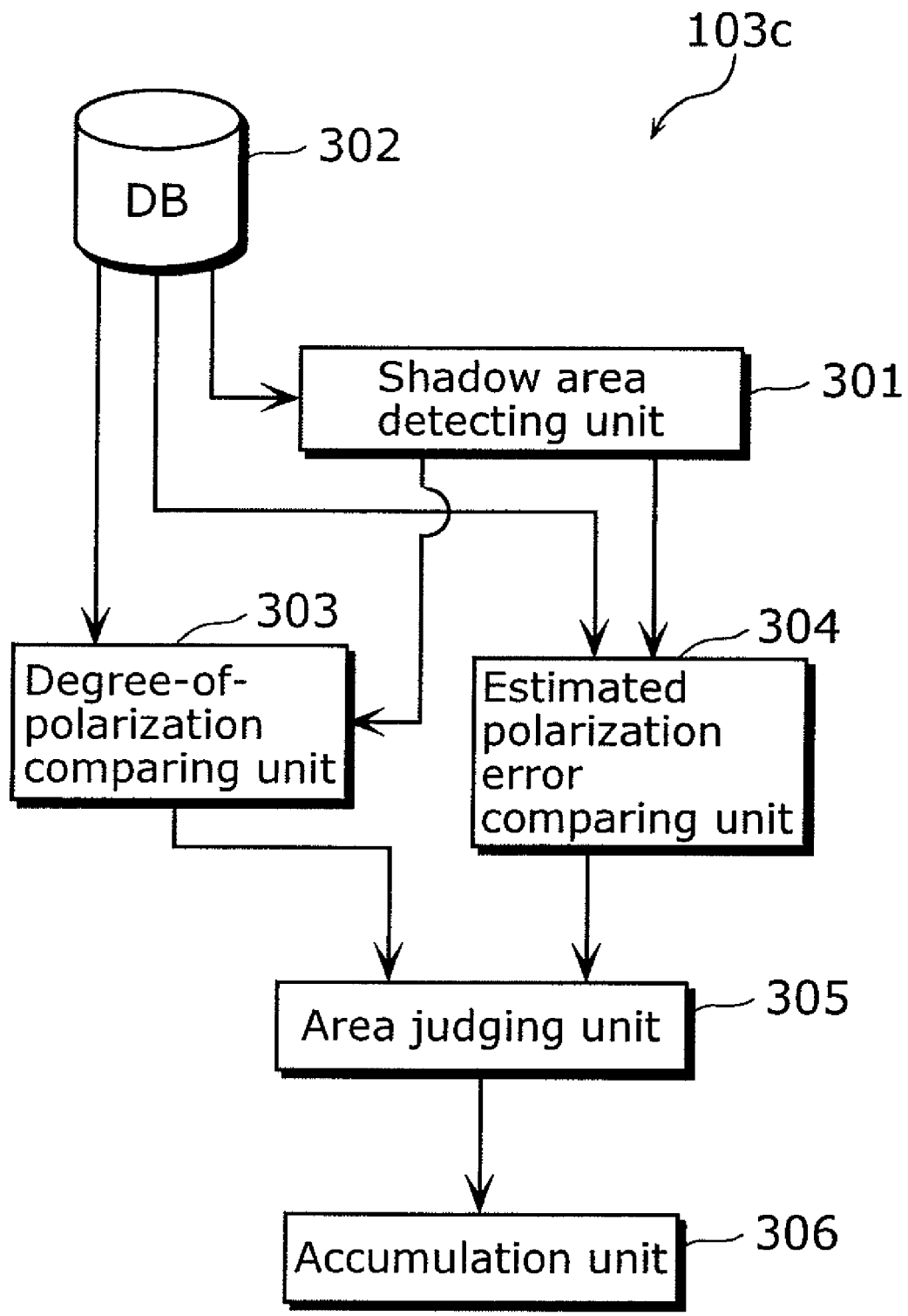
FIG. 24 is a functional block diagram showing the structure of the area dividing unit according to the Variation of Embodiment 1 in the present invention.

In addition, in the processes shown in FIG. 15, both an estimated polarization error and the degree of polarization may be used not only one of these in the judgment whether the pixel is an attached shadow area or a cast shadow area (S204). FIG. 24 is a functional block diagram showing the detailed structure of the area dividing unit 103c according to this Variation for judging whether the pixel is an attached shadow area or a cast shadow area using both the estimated polarization error and the degree of polarization. This area dividing unit 103c includes a shadow area detecting unit 301, a DB 302, a degree-of-polarization comparing unit 303, an estimated polarization error comparing unit 304, an area judging unit 305, and an accumulation unit 306. It is to be noted that, in FIG. 24, the structural elements common with FIG. 14 are assigned with the same numerical references as those in FIG. 14, and detailed descriptions thereof are omitted. This area dividing unit 103c includes the same structural elements as those of the area dividing unit 103 shown in FIG. 14, but the judgment standards in the area division performed by the area judging unit 305 are different from those of the area dividing unit 103.

Figure 25:
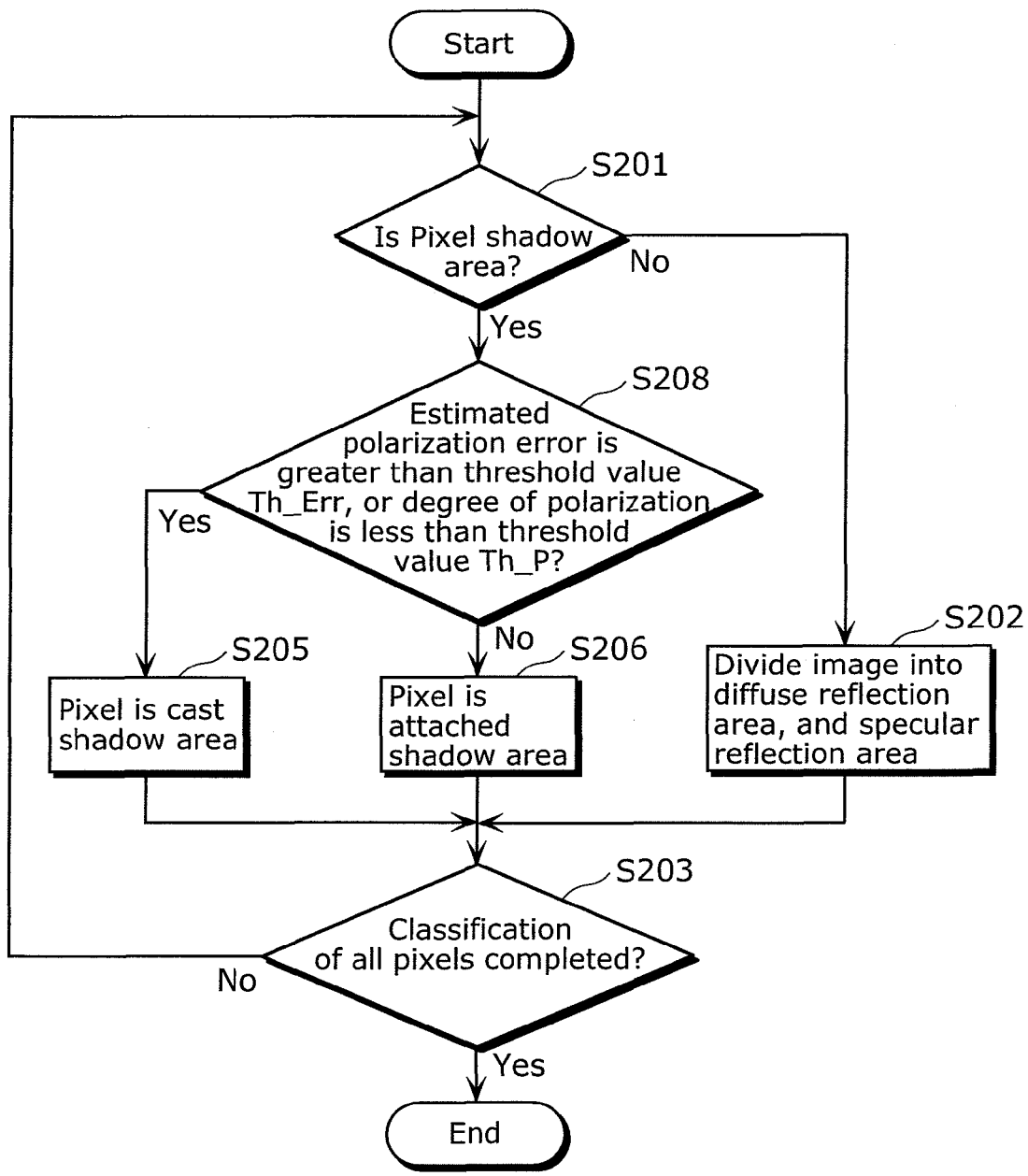
FIG. 25 is a flowchart of processes performed by the area dividing unit shown in FIG. 24.

FIG. 25 is a flowchart of processes performed by this area dividing unit 103c. It is to be noted that, in FIG. 25, the steps common with FIG. 15 are assigned with the same numerical references as those in FIG. 15, and detailed descriptions thereof are omitted. When the shadow area detecting unit 301 judges that a target pixel is a shadow area (Yes in S201), the estimated polarization error comparing unit 304 and the degree-of-polarization comparing unit 303 evaluate the estimated polarization error E defined by Expression 8 and the degree of polarization ρ defined by Expression 6 respectively in order to judge whether the pixel is an attached shadow area or a cast shadow area. In other words, the estimated polarization error comparing unit 304 compares the estimated polarization error E and the threshold value Th_Err, and the degree-of-polarization comparing unit 303 compares the degree of polarization ρ and the threshold value Th_P.

As the result, when the estimated polarization error E is greater than the threshold value Th_Err, or the magnitude of the degree of polarization ρ is less than the threshold value Th_P (Yes in S208), the area judging unit 305 judges that the pixel is a cast shadow area (S205), whereas when the magnitude of the estimated polarization error E is less than the threshold value Th_Err, and the magnitude of the degree of polarization ρ is greater than the threshold value Th_P (No in S208), the area judging unit 305 judges that the pixel is an attached shadow area (S206). In this way, both the estimated polarization error and the degree of polarization are used to judge whether the pixel is an attached shadow area or a cast shadow area.

It is to be noted that the threshold value Th_Err of the estimated polarization error E may take a greater value compared to the case of making a judgment by only using the estimated polarization error as in the processes in FIG. 15, and that the threshold value Th_P of the degree of polarization ρ may take a smaller value compared to the case of making a judgment based on the degree of polarization only as in the processes in FIG. 23. In addition, the area judging unit 305 may judge that the pixel is an attached shadow area only when the magnitude of the estimated polarization error E is greater than the threshold value Th_Err, and the magnitude of the degree of polarization ρ is less than the threshold value Th_P (S208).

In addition, an estimated polarization error is used to judge whether the pixel is an attached shadow area or a cast shadow area (S204) in the processes of FIG. 15, the judgment may be made based on the fact that the polarization characteristics of the attached shadow area are specular reflection characteristics. For example, the polarization phase ϕ defined by Expression 7 may be used. As described above, the polarization phase ϕ shows one component of the normal vector of the object, but the relationship between the polarization phase ϕ and the one component of the normal vector of the object vary by 90 degrees depending on whether specular reflection components are dominant regarding the object or diffuse reflection components are dominant regarding the object. For example, FIG. 7(c) (FIG. 8(c) which is a schematic diagram of FIG. 7(c)) shows that the polarization phase of the attached shadow area is significantly different from the polarization phase information of the adjacent area. This is because the attached shadow area shows the polarization characteristics of specular reflection components, and the adjacent area shows the polarization characteristics of diffuse reflection components. For this, the pixel indicating the polarization characteristics of specular reflection components is detected and the attached shadow area is detected by evaluating the continuity of the polarization phase of the object.

In addition, the present invention can be implemented not only as an independent optical area dividing device as shown in FIG. 1, but also as a device obtained by combining a processing unit for generating normal vector information using output by the optical area dividing device 100 with the optical area dividing device 100.

Figure 26:
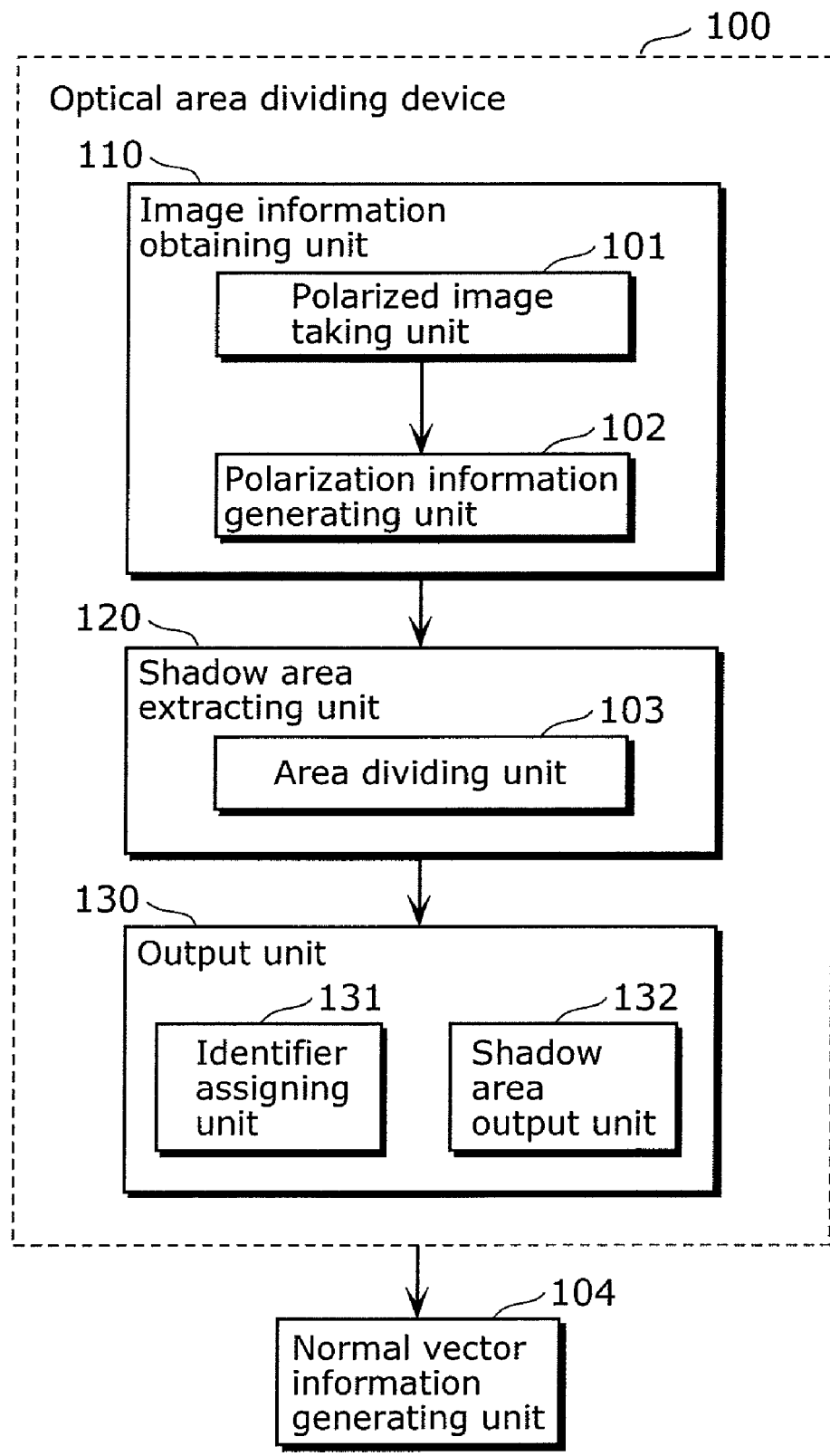
FIG. 26 is a functional block diagram showing the structure of the device obtained by combining a normal vector information generating unit with the image processing device according to the present invention.

FIG. 26 is a functional block diagram showing the structure of the device obtained by combining the processing unit for generating normal vector information (normal vector information generating unit) with the optical area dividing device 100 which is an example of the image processing device according to the present invention. The normal vector information generating unit 104 is a processing unit for generating, for each area divided by the area dividing unit 103, normal vector information identifying a normal vector on the surface of a corresponding object using polarization information generated by the polarization information generating unit 102.

Figure 27:
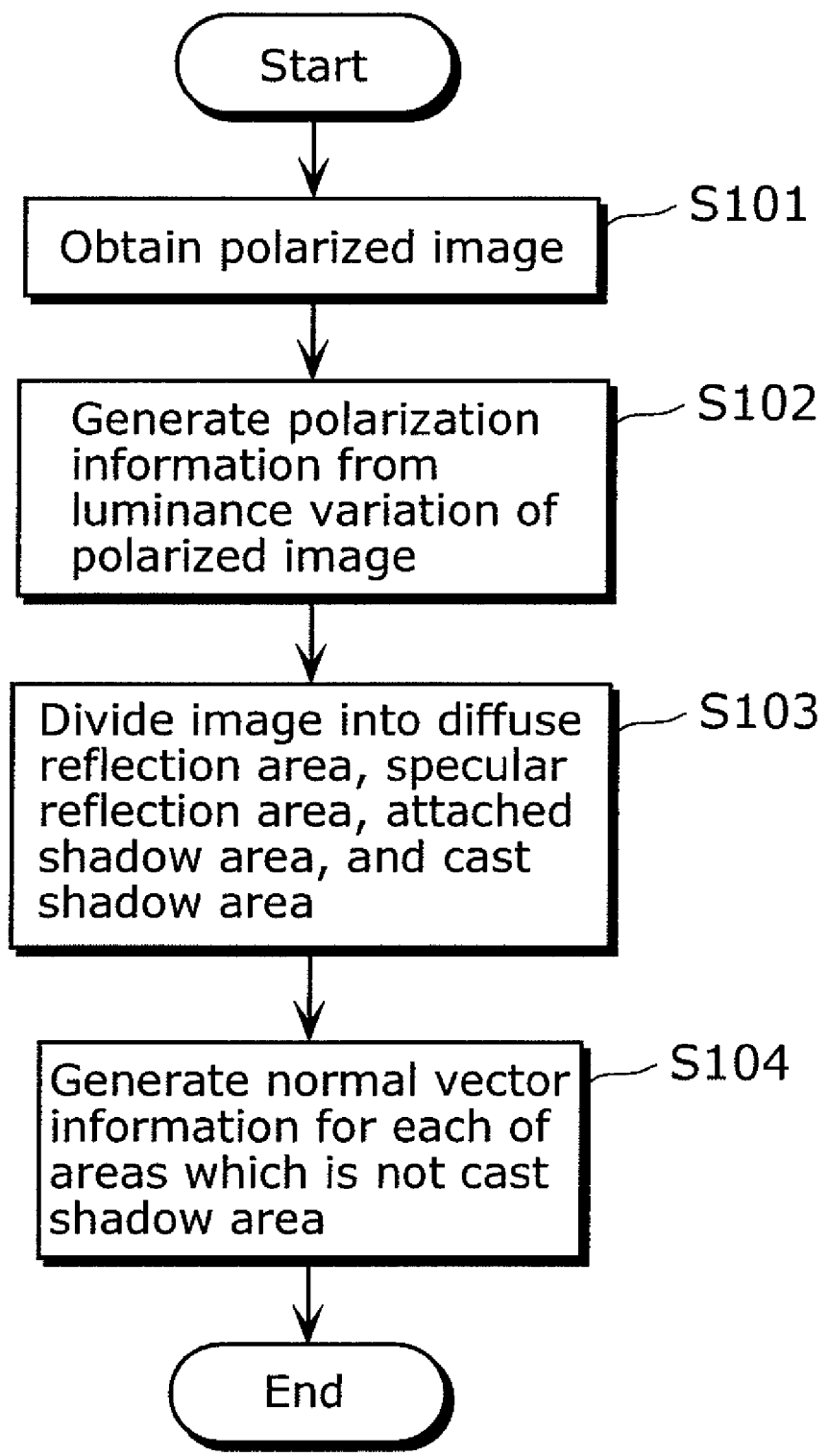
FIG. 27 is a flowchart of processes performed by the optical area dividing device and the normal vector information generating unit shown in FIG. 26.

FIG. 27 is a flowchart of processes performed by the optical area dividing device and the normal vector information generating device shown in FIG. 26. This diagram includes step S104 for processing normal vector information next to step S103 in the flowchart shown in FIG. 4. The normal vector information generating unit 104 generates, for each area divided by the area dividing unit 103, normal vector information identifying a normal vector on the surface of a corresponding object using the polarization information generated by the polarization information generating unit 102 (S104), after the area dividing process (S103).

Here, a description is given of an algorism for generating normal vector information from polarization information. In addition, a known method is a method for calculating, based on the polarization phase φ, the one-dimensional degree of freedom of an angle at an emission plane (incidence angle) containing rays of incidence light and reflected light from among the normal vector information of the object. It is also known that how to calculate normal vector information is totally different depending on whether specular reflection is dominant or diffuse reflection is dominant in the object (for example, see Non-patent Reference 6: "Using polarization to determine intrinsic surface properties", Ondrej Drbohlav and Sara Radim, Proc. SPIE Vol. 3826, pp. 253-263, 1999). In the case where diffuse reflection components are dominant, information of an emission plane of diffuse reflection can be calculated as an angle at which luminance changed by the rotation of a deflecting plate becomes the maximum. In the opposite case where specular reflection components are dominant, information of an incidence plane of specular reflection can be calculated as an angle at which luminance changed by the rotation of a deflecting plate becomes the minimum. Here, focusing on the fact that the variation curve of the polarization luminance is a sinusoidal of a 180-degree cycle, it is known that the one-dimensional freedom degree of an estimated normal vector includes an error of 90 degrees in the case where normal vector information is generated without considering whether diffuse reflection is dominant or specular reflection is dominant. Therefore, classification into diffuse reflection and specular reflection is important in the process of generating normal vector information from polarization information.

Figure 28:
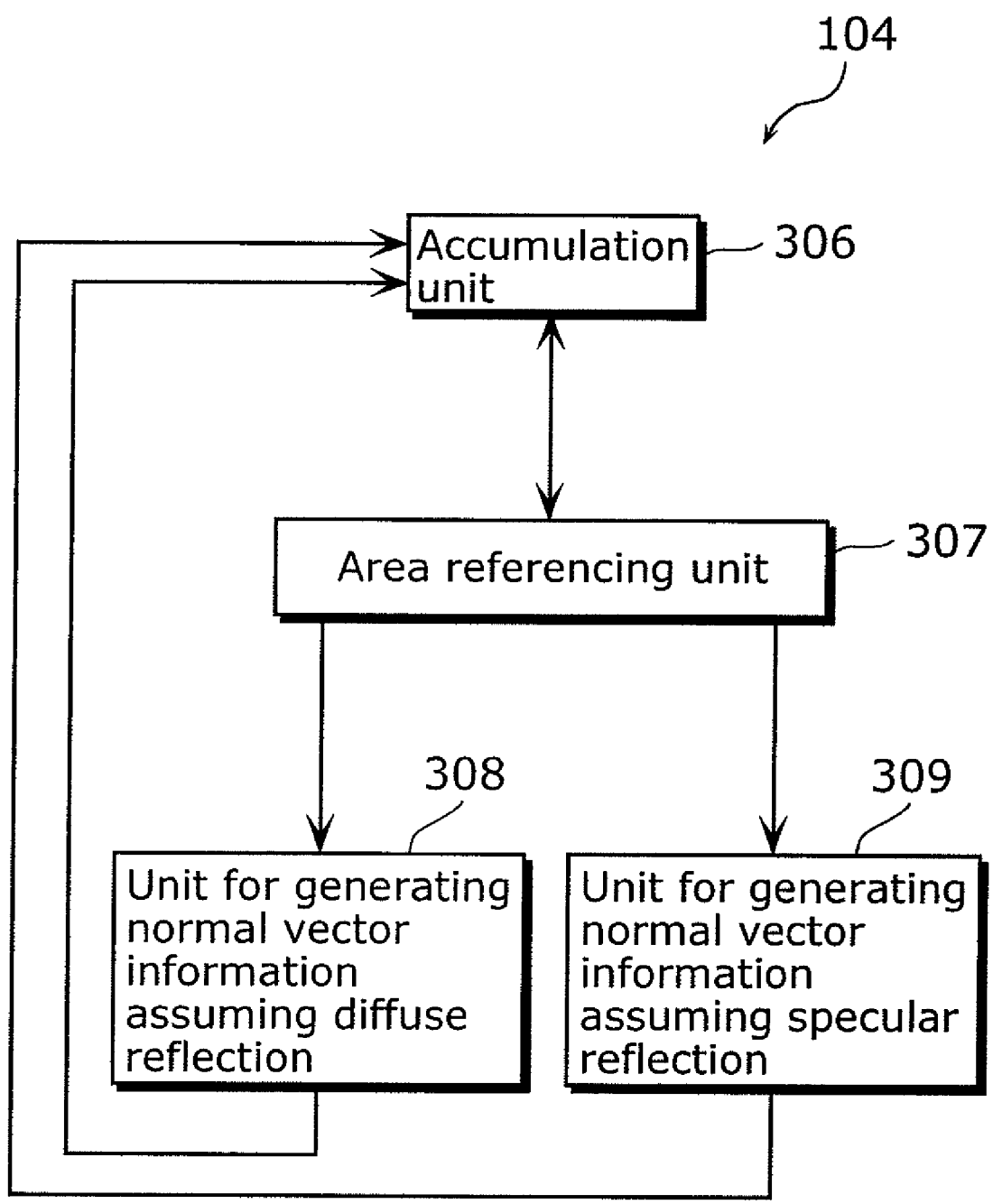
FIG. 28 is a functional block diagram showing a detailed structure of the normal vector information generating unit shown in FIG. 26.

FIG. 28 is a functional block diagram showing a detailed structure of the normal vector information generating unit 104 shown in FIG. 26. The normal vector information generating unit 104 is a processing unit for generating normal vector information from polarization information based on the result of the area division performed by the area dividing unit 103, and includes an accumulation unit 306, an area referencing unit 307, a unit for generating normal vector information assuming diffuse reflection 308, and a unit for generating normal vector information assuming specular reflection 309. It is to be noted that, in this diagram, the structural elements common with FIG. 14 are assigned with the same numerical references as those in FIG. 14, and detailed descriptions thereof are omitted.

The area referencing unit 307 is a processing unit for judging whether diffuse reflection components are dominant or specular reflection components are dominant in a target pixel (whether the target pixel is a diffuse reflection area or the target pixel is a specular reflection area), or whether the pixel is an attached shadow area or not, by referring to the result of the area division accumulated in the accumulation unit 306.

The unit for generating normal vector information assuming diffuse reflection 308 is a processing unit for generating normal vector information of a pixel corresponding to a diffuse reflection area assuming diffuse reflection. More specifically, the angle of the polarization principal axis at which the luminance becomes the maximum in the sinusoidal obtained through the approximation is generated as the normal vector information of the emission plane of the object corresponding to the pixel.

The unit for generating normal vector information assuming specular reflection 309 is a processing unit for generating normal vector information of pixels corresponding to specular reflection areas and attached shadow areas assuming specular reflection. More specifically, the angle of the polarization principal axis at which the luminance becomes the minimum in the sinusoidal obtained through the approximation is generated as the normal vector information of the incidence plane of the object corresponding to the pixel.

Figure 29:
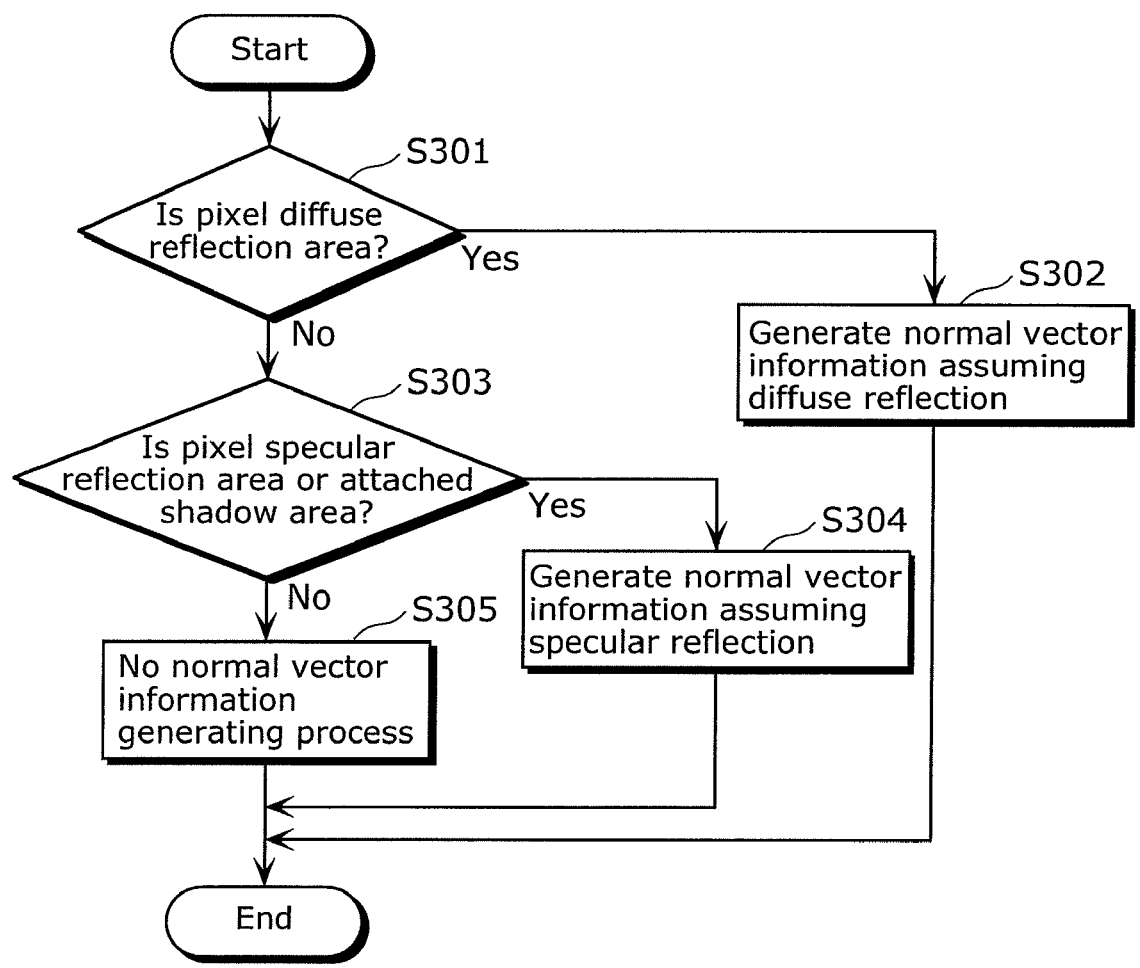
FIG. 29 is a flowchart of processes performed by the normal vector information generating unit shown in FIG. 26.

FIG. 29 is a flowchart of processes performed by this normal vector information generating unit 104. First, the area referencing unit 307 judges whether or not diffuse reflection components are dominant in the pixel, based on the result of the optical area division detected by the area dividing unit 103. In this processing, the result of the area division may be read from the accumulation unit 306 in which the result of the area judging unit 305 is accumulated. When it is judged that diffuse reflection components are dominant (Yes in S301), the unit for generating normal vector information assuming diffuse reflection 308 generates normal vector information of the pixel assuming diffuse reflection (S302). More specifically, the one-dimensional degree of freedom of the normal vector on an emission plane is calculated as an angle at which luminance changed by the rotation of a deflecting plate becomes the maximum value. In other words, the angle of the polarization principal axis at which the luminance becomes the maximum in the sinusoidal obtained through the approximation is generated as the normal vector information of the emission plane of the object corresponding to the pixel.

In addition, when diffuse reflection components are not dominant in the pixel (No in S301), the area referencing unit 307 judges whether specular reflection components are dominant (the pixel is a specular reflection area) or the pixel is an attached shadow area (S303). As the result, it is judged that specular reflection components are dominant, or the pixel is an attached shadow area (Yes in S303), the unit for generating normal vector information assuming specular reflection 309 generates normal vector information of the pixel assuming specular reflection (S304). More specifically, the one-dimensional degree of freedom of the normal vector on the incidence plane is calculated as the angle at which the luminance changed by the rotation of a deflecting plate becomes the minimum value. In other words, the angle of the polarization principal axis at which the luminance becomes the minimum in the sinusoidal obtained through the approximation is generated as normal vector information of the incidence plane of the object corresponding to the pixel.

In contrast, when the pixel is judged to be a cast shadow area, in other words, when neither diffuse reflection components nor specular reflection components are dominant, and the pixel is not a cast shadow area (No in S303), this normal vector information generating unit 104 judges that errors are dominant in the polarization information of the pixel and that it is impossible to generate accurate normal vector information, and does not perform any normal vector information generating process (S305).

As described above, it is possible to achieve a normal vector information generating device which automatically generates normal vector information for each optical area including a shadow area by combining the normal vector information generating unit with the image processing device according to the present invention.

In addition, the shadow area detecting unit 301 shown in FIG. 14 and the like may use a light emitting device 207 (such as a flash) mounted on a camera 200. This is because, when an object having a sufficiently small reflectance such as a blackout curtain exists, a judgment based on the luminance value is insufficient to distinguish the shadow area and the blackout curtain. With reference to the drawings, a detailed description is given of the optical area dividing device according to the Variation of this Embodiment in which such flash is used.

Figure 30:
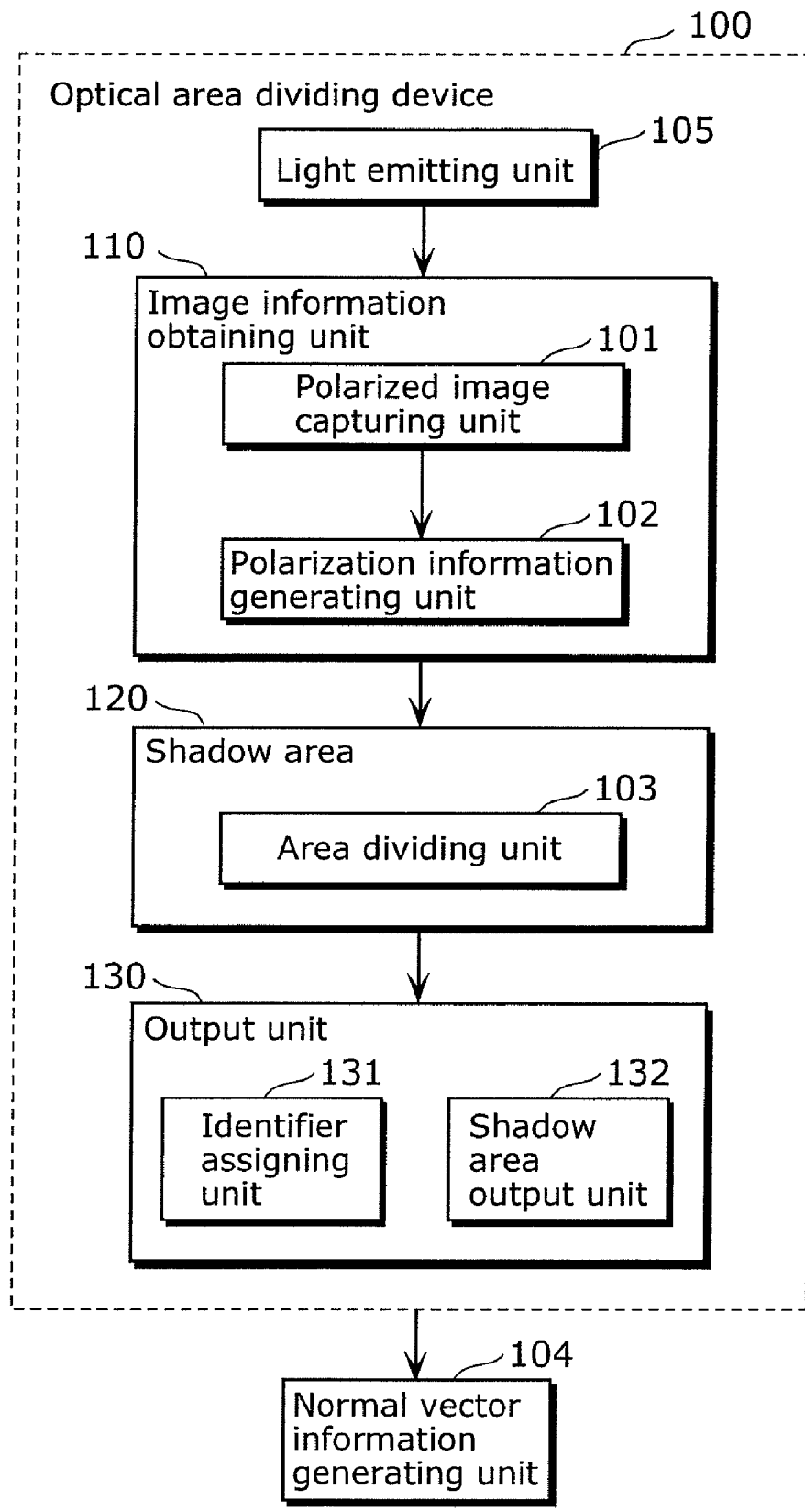
FIG. 30 is a functional block diagram showing the structure of the optical area dividing device of the Variation, in Embodiment 1, using a flash.

FIG. 30 is a functional block diagram showing the structure of the optical area dividing device 100a according to the Variation like this. Here, a normal vector information generating unit 104 is also shown in this example of a processing in which the result of processing performed by the optical area dividing device 100a is used. This optical area dividing device has the structure of the optical area dividing device 100 shown in FIG. 1 and the light-emitting unit 105 added thereto. It is to be noted that, in FIG. 30, the structural elements common with FIG. 26 are assigned with the same numerical references as those in FIG. 26, and detailed descriptions thereof are omitted.

The light emitting unit 105 is a flash for projecting light onto the object working with the imaging operations performed by the optical area dividing device 100a. At this time, this light emitting unit 105 controls lighting of the flash. The polarized image capturing unit 101 captures two images working with the light emitting unit 105; one of the images is captured in a state where the flash is used, and the other is captured in a state where the flash is not used. At this time, the images are captured in such a manner that the positional relationship between the object and the camera 200 is not changed. For example, such imaging may be performed using a serial imaging function of the camera 200.

Figure 31:
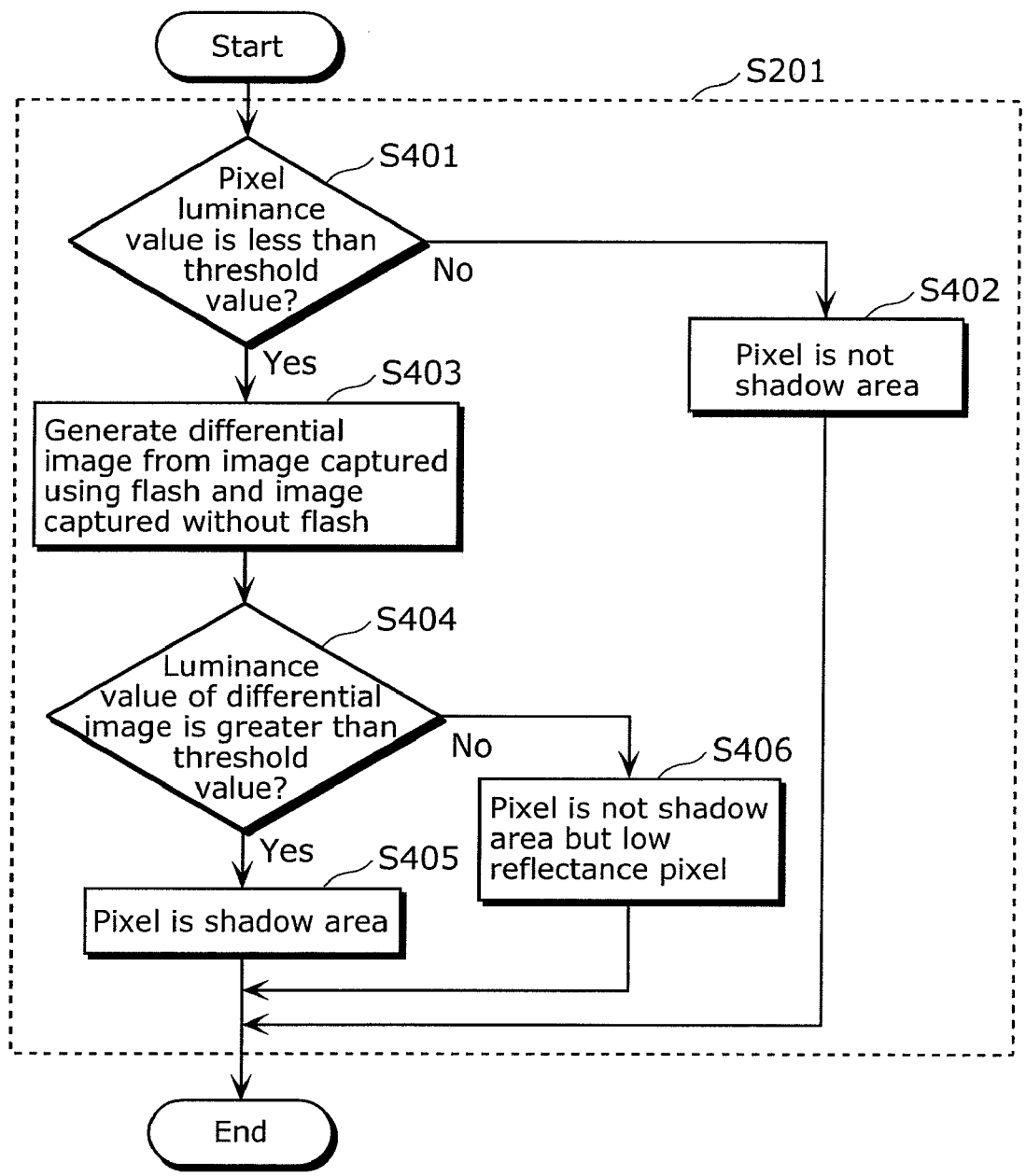
FIG. 31 is a flowchart of shadow detecting processes performed by the normal vector information generating device shown in FIG. 30.

FIG. 31 is a flowchart of shadow detecting processes performed by the optical area dividing device 100a according to this Variation. In other words, FIG. 29 is a flowchart indicating another approach of the shadow area detecting process (S201) in FIG. 15. First, the shadow area detecting unit 301 checks the luminance value of the pixel in a state where the flash is not used (S401). In the case where the luminance value of the pixel is greater than the threshold value (No in S401), the shadow area detecting unit 301 judges that the pixel is not a low luminance area (here, a shadow area) (S402), and ends the processing.

In the opposite case where the luminance value of the pixel is less than the threshold value (Yes in S401), it is highly likely that the pixel is a shadow area, and thus, the shadow area detecting unit 301 generates a differential image between the flash image captured using the flash and the normal image captured without using the flash (S403). Assuming that the lighting position of the flash is sufficiently close to the positions of the imaging elements and the distances between them are approximately equal, a cast shadow caused by the lighting flash does not exist on the image. This is because the sight line direction equals to the light source direction. Therefore, direct light appears on the areas when the flash is lighted although the areas are shadow areas in a no-flash state. Accordingly, the luminance values of the shadow areas increase significantly.

On the other hand, when the pixel is not a shadow area and a blackout curtain having a low reflectance, the luminance value does not substantially change when the flash is used because of its low reflectance. In other words, when the luminance value of the differential image captured using the flash is equal to or greater than the threshold value (Yes in S404), the shadow area detecting unit 301 judges that the pixel is a shadow area (S405), and ends the processing. In contrast, when the luminance value of the differential image by the flash is less than the threshold value, the shadow area detecting unit 301 judges that the pixel is not a shadow area but a low reflectance area (or a low reflectance pixel) (S405), and ends the processing.

Even when an object such as a blackout curtain having a small reflectance exists in this way, it is possible to detect shadow areas accurately, classify the shadow areas into attached shadow areas and cast shadow areas, and generate accurate normal vector information of the shadow areas by assuming specular reflection. In addition, as for shadow areas having polarization information including a lot of errors and where only extremely poor accuracy is obtained when normal vector information is generated, not performing normal vector information generating processes makes it possible to generate highly accurate normal vector information of areas as large as possible.

As described above, according to the optical area dividing device in this Embodiment, it is possible to classify the shadow areas of a snapshot-like image into attached shadow areas and cast shadow areas in a general environment, without requiring a large-scale system enabling movement of a light source.

In this Embodiment, photonic crystals are used as a patterned polarizer 201, but film-type polarizing elements or polarizing elements of wire grid type or using another mechanism may be used. In addition, luminance having different polarization principal axes may be obtained in time series by performing imaging while rotating the deflecting plate mounted in the front of the lens of the camera 200 without using a patterned polarizer. This method is disclosed in Japanese Patent Application Publication No. 11-211433: Patent Reference 1.

Embodiment 2

Next, a description is given of an optical area dividing device in Embodiment 2 of the present invention.

Figure 32:
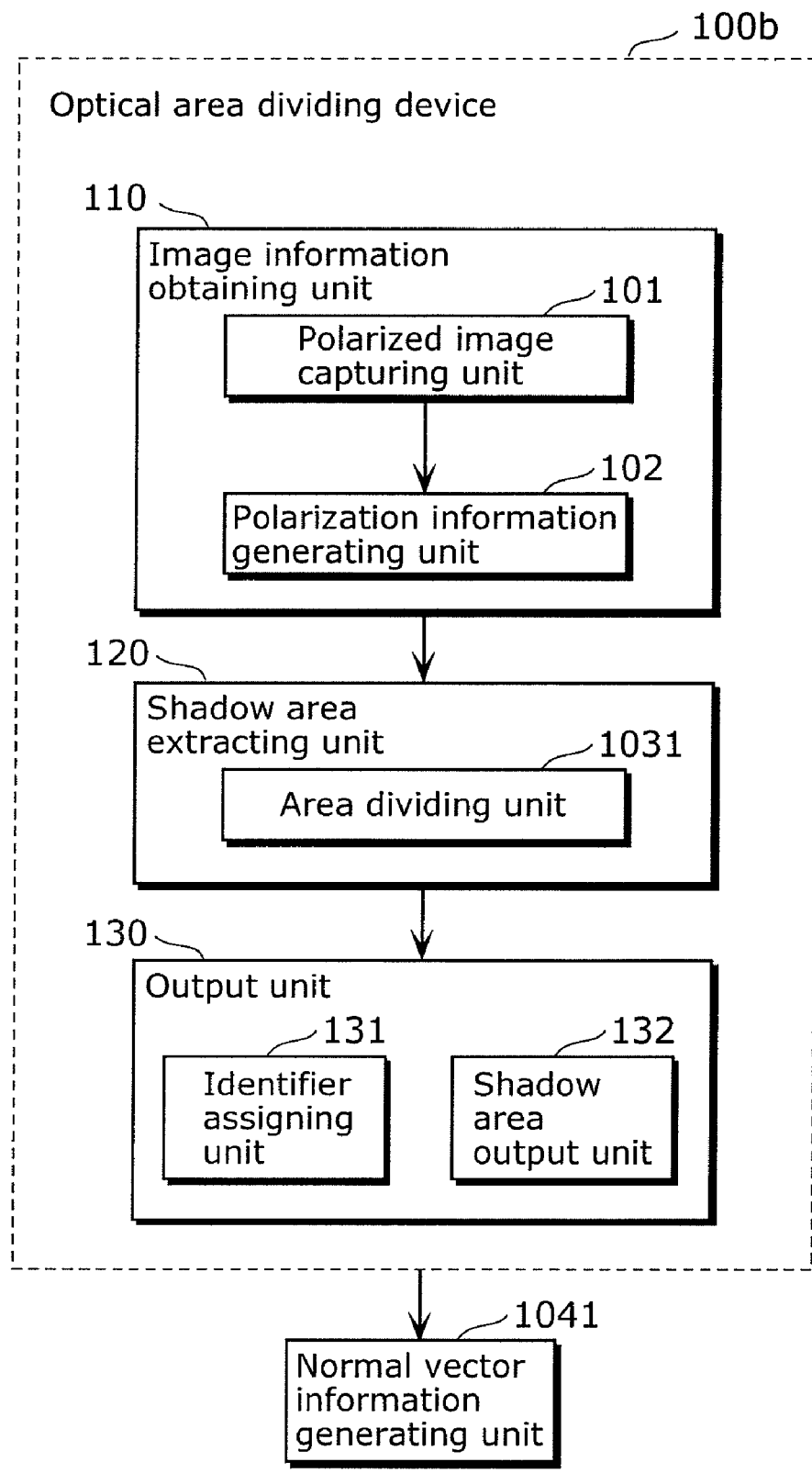
FIG. 32 is a functional block diagram showing the structure of an optical area dividing device in Embodiment 2 of the present invention.

FIG. 32 is a functional block diagram showing the structure of the optical area dividing device 100b in this Embodiment. This optical area dividing device 100b is a device for performing optical area division on the surface of an object by imaging the object, and is characterized by classifying low luminance areas into "attached shadow areas or low reflectance areas" and cast shadow areas. This optical area dividing device 100b includes an area dividing unit 1031 instead of the area dividing unit 103 in the optical area dividing device 100 shown in FIG. 1. Here, the normal vector information generating unit 1041 is also shown in this example of processing in which the result of processing by the optical area dividing device 100b is used. Although the normal vector information generating unit 1041 is not an essential structural element of the image processing device according to the present invention, but it is shown as an example of a post-processing unit in which the result of the processing by the image processing device according to the present invention is used. It is to be noted that, in FIG. 32, the same structural elements as those of the optical area dividing device 100 in FIG. 26 are assigned with the same numerical references, and descriptions thereof are omitted.

The area dividing unit 1031 is a processing unit for dividing a polarized image into plural areas each of which is a group of image areas having optically common characteristics using similarity (likeness) between the luminance information of the polarized image and the polarized information generated by the polarization information generating unit 102. At this time, the area dividing unit 1031 compares the luminance of each image area and a predetermined threshold value, and classifies the image area as a low luminance area including a shadow area (the low luminance area including "an attached shadow area or a low reflectance area" and a cast shadow area in this Embodiment) when the luminance is less than the threshold value. In this Embodiment, the area dividing unit 1031 classifies the low luminance areas into "attached shadow areas or low reflectance areas" and cast shadow areas to divide the image into diffuse reflection areas, specular reflection areas, "attached shadow areas or low reflectance areas" and shadow areas.

The normal vector information generating unit 1041 is a processing unit for generating normal vector information from polarized information for each of the areas divided by the area dividing unit 1031. This normal vector information generating unit 1041 generates normal vector information assuming that the attached shadow areas are "attached shadow areas or low reflectance areas", unlike the normal vector information generating unit 104 described in Embodiment 1.

Figure 33:
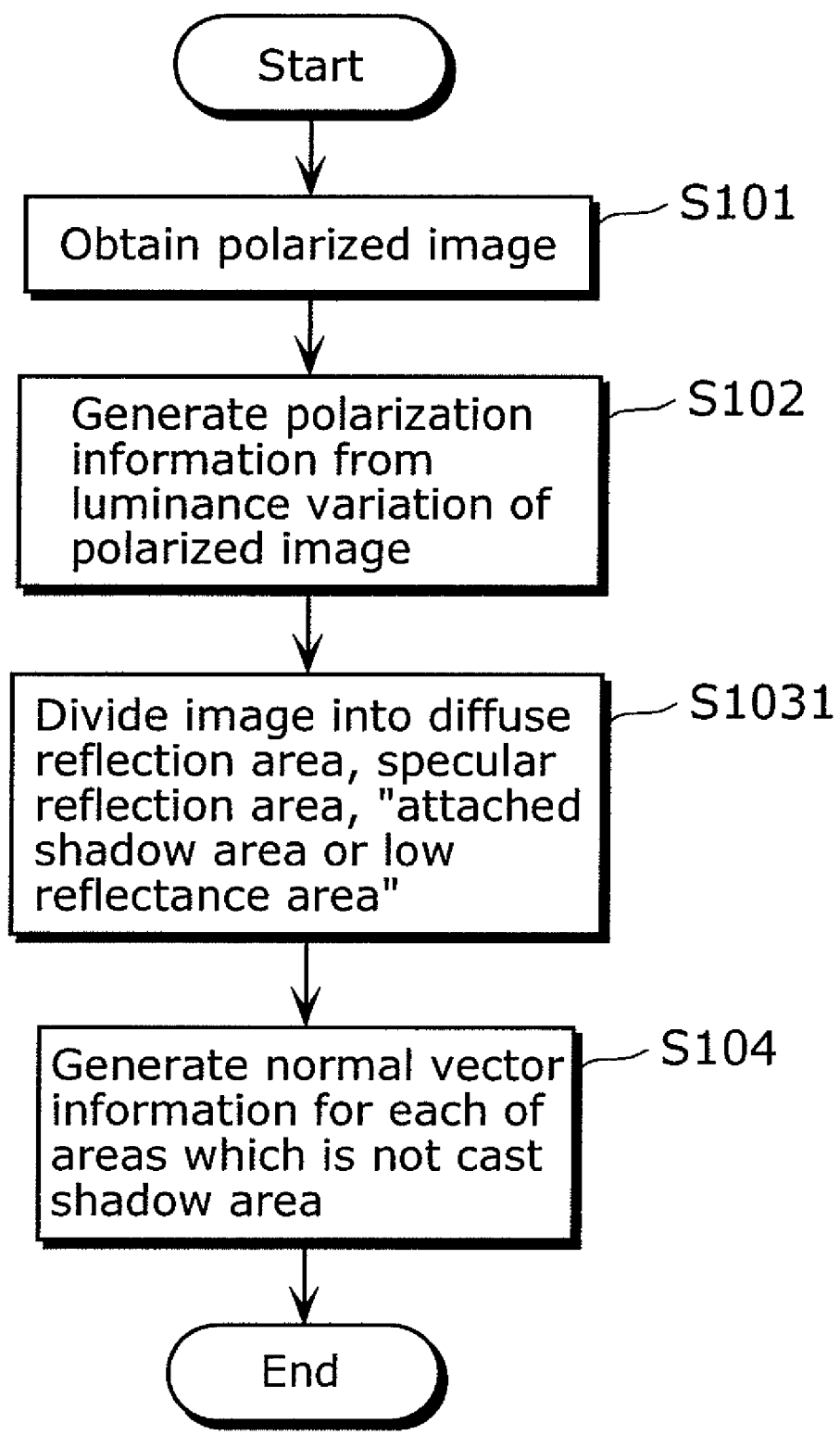
FIG. 33 is a flowchart of processes performed by the optical area dividing device and the normal vector information generating unit in Embodiment 2 of the present invention.

FIG. 33 is a flowchart of processes performed by the optical area dividing device 100*b* and the normal vector information generating unit 1041 in this Embodiment. It is to be noted that, in FIG. 33, the steps common with FIG. 4 in Embodiment 1 are assigned with the same numerical references as those in FIG. 4, and the descriptions thereof are omitted.

The area dividing unit 1031 classifies the portions of the image into diffuse reflection areas, specular reflection areas, and low luminance areas (in this Embodiment, "attached shadow areas or low reflectance areas" and cast shadow areas) using the polarization information generated by the polarization information generating unit 102 and the luminance information obtained by the polarized image capturing unit 101 (S1031).

The normal vector information generating unit 1041 generates normal vector information from the polarization information based on the result of the area division performed by the area dividing unit 1031 as described later (S104). At this time, no normal vector information generating process is performed because a lot of errors are included in the polarization information about cast shadow areas.

First, a description is given of the difference in the polarization characteristics of an object having a low reflectance. The internal reflection of the object having smooth surface and has a low reflectance is approximately 0, and diffuse reflection components are very weak. On the other hand, under the specular reflection condition, light is reflected and thus specular reflection becomes greater. In other words, it is considered that diffuse reflection components are weak in the low reflectance area, and specular reflection components become relatively dominant. This shows that the object having a low reflectance has the polarization characteristics as in the attached shadow areas described below.

(1) "Attached shadow areas or low reflectance areas"
  The degree of polarization is high, and estimated polarization errors are small.
  In many cases, specular reflection characteristics are indicated.
(2) Cast shadow areas
  The degree of polarization is low, and estimated polarization errors are large.
  In many cases, diffuse reflection characteristics are shown.

The low luminance areas are classified into "attached shadow areas or low reflectance areas" and cast shadow areas based on these classification standards. These processes are described in detail below with reference to the drawings.

Figure 34:
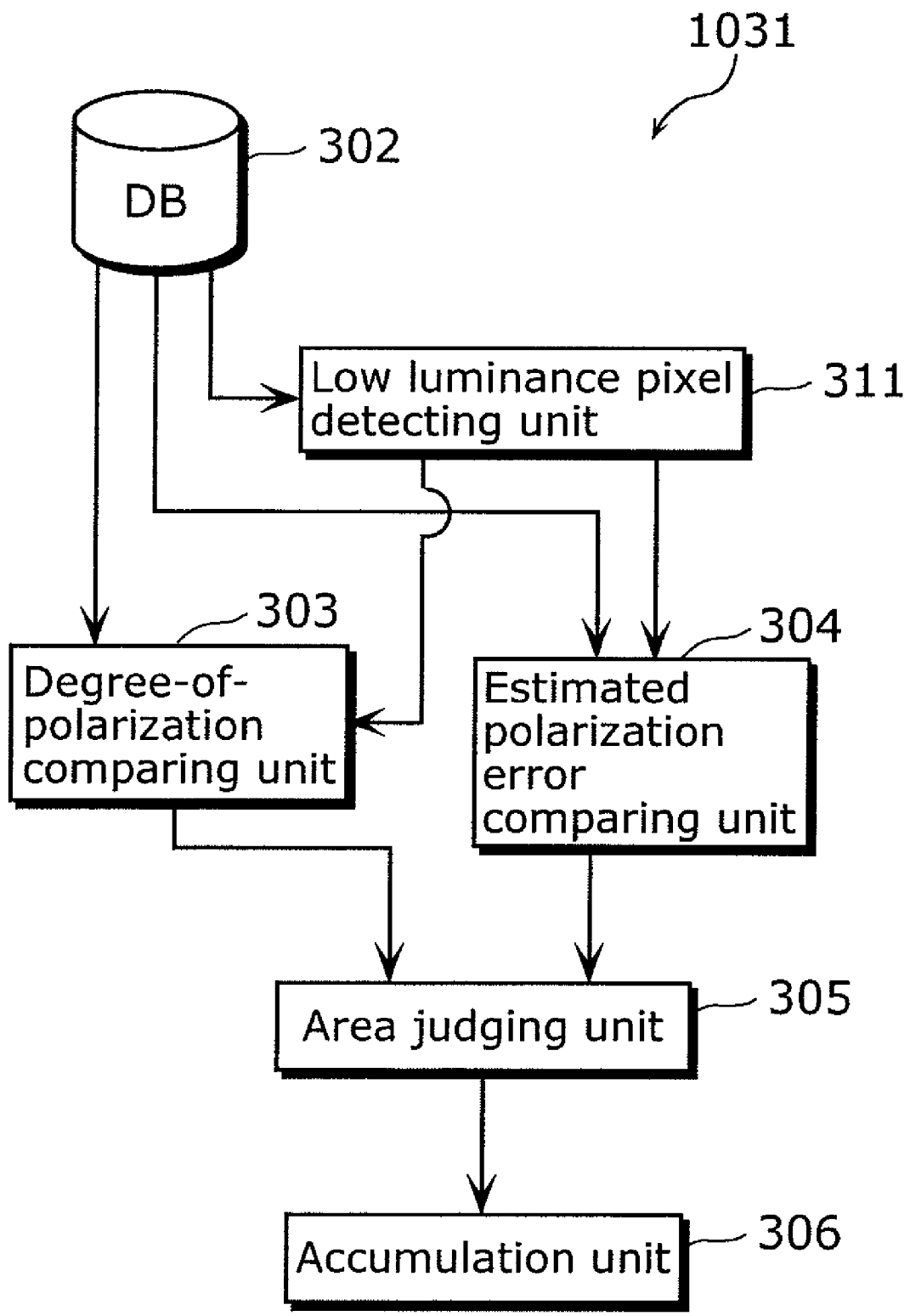
FIG. 34 is a functional block diagram showing a detailed structure of the area dividing unit in Embodiment 2 of the present invention.

FIG. 34 is a functional block diagram showing the detailed structure of the area dividing unit 1031 in the optical area dividing device 100*b* shown in FIG. 32. This area dividing unit 1031 includes a DB 302, a degree-of-polarization comparing unit 303, an estimated polarization error comparing unit 304, an area judging unit 305, an accumulation unit 306, and a low luminance pixel detecting unit 311. It is to be noted that, in FIG. 34, the steps common with FIG. 14 in Embodiment 1 are assigned with the same numerical references as those in FIG. 14, and the descriptions thereof are omitted.

The low luminance pixel detecting unit 311 is a processing unit for estimating whether or not the pixels in the image obtained by the polarized image capturing unit 101 are low luminance areas (areas including "attached shadow areas or low reflectance areas" and cast shadow areas).

Figure 35:
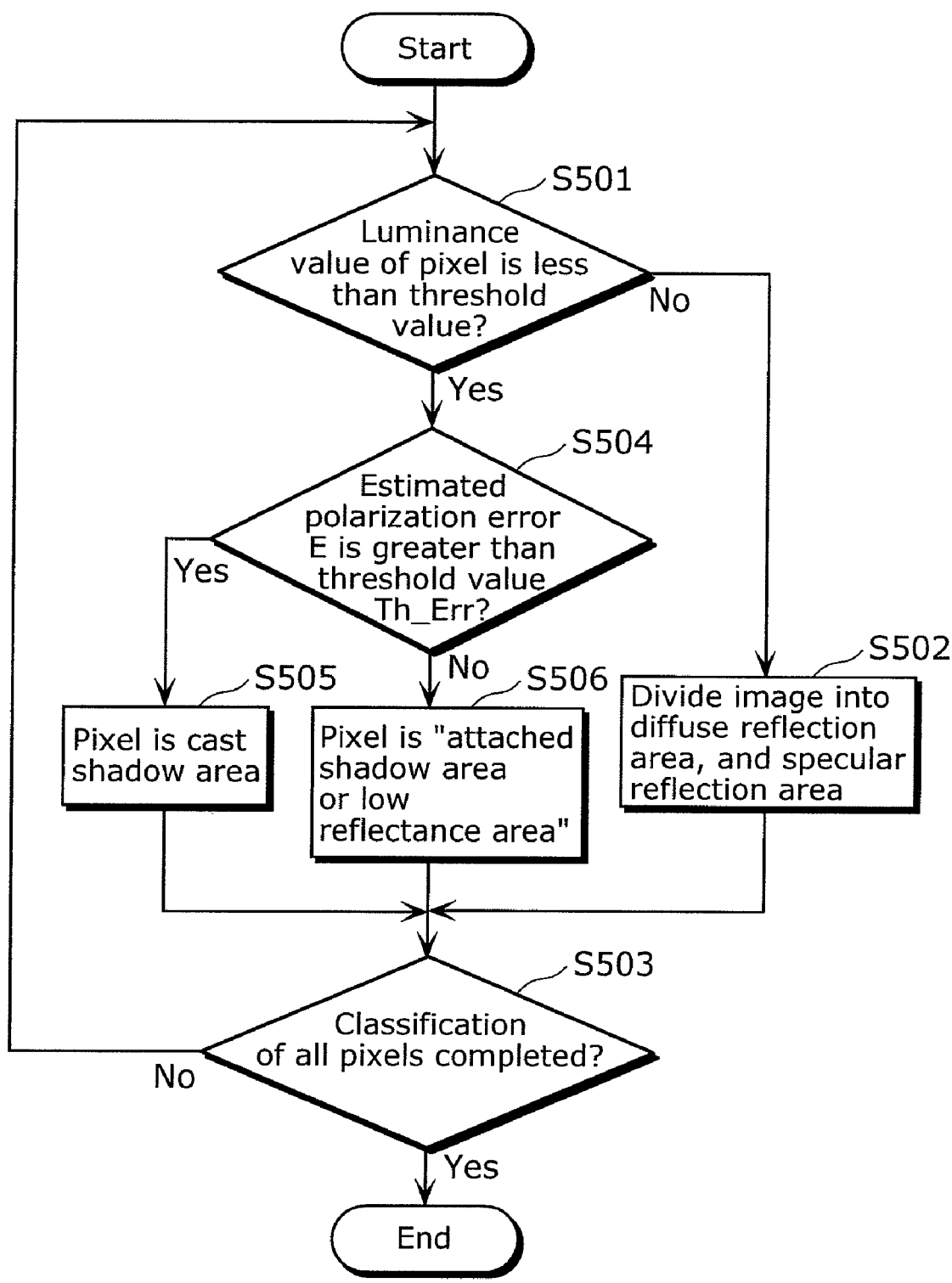
FIG. 35 is a flowchart of processes performed by the area dividing unit in Embodiment 2 of the present invention.

FIG. 35 is a flowchart of processes performed by this area dividing unit 1031. First, the low luminance pixel detecting unit 311 evaluates the luminance values of the pixels in the image obtained by the polarized image capturing unit 101 (S501). As in the step S201 described above, an evaluation is made to determine whether or not each of the luminance values is less than a threshold value. The threshold value for estimating the low luminance areas like this may be empirically determined, and for example, 256 may be set for a 16-bit monochrome image. This threshold value may be held in the DB 302. In the case where the luminance value is greater than the threshold value (No in S501), the area dividing unit 1031 judges whether diffuse reflection components are dominant in the image or specular reflection components are dominant in the image according to the method as in the step S202 described above (comparison by the degree-of-polarization comparing unit 303) (S502). After the completion of the diffuse reflection/specular reflection classification process (S502), the area judging unit 305 checks whether or not the optical classification of all the pixels has been completed (S503). In the case where there remains a pixel which has not yet been classified (No in S503), the low luminance pixel detecting unit 311 evaluates the luminance value of another pixel (S501). In addition, the optical classification of all the pixels has been completed (Yes in S503), the area dividing unit 1031 completes the processing.

On the other hand, when the luminance value of the pixel is equal to or less than the threshold value (Yes in S501), whether the pixel is "an attached shadow area or a low reflectance area" is judged (S504). As described above, the estimated polarization error comparing unit 304 is implemented by evaluating the magnitude of the estimated polarization error E defined by Expression 8 (by comparing the estimated polarization error E and the threshold value Th_Err). As the result, the area judging unit 305 judges that the pixel is an attached shadow area (S505) in the case where the magnitude of the estimated polarization error E is greater than the threshold value Th_Err (Yes in S504), while the area judging unit 305 judges that the pixel is "an attached shadow area or a low reflectance area" (S506) in the case where the magnitude of the estimated polarization error E is less than the threshold value Th_Err (No in S504). The threshold value Th_Err at this time may be determined according to the above-mentioned method. The result of the area division is accumulated in the accumulation unit 306.

The normal vector information generating unit 1041 generates normal vector information from the polarization information based on the result of the area division performed by the area dividing unit 1031. This normal vector information generating unit 1041 has the same structure as that of the normal vector information generating unit 104 in Embodiment 1, in other words, includes the accumulation unit 306, the area referencing unit 307, a unit for generating normal vector information assuming diffuse reflection 308 and a unit for generating normal vector information assuming specular reflection 309, as shown in FIG. 26. This normal vector information generating unit 1041 generates normal vector information assuming that the attached shadow areas are "attached shadow areas or low reflectance areas", unlike Embodiment 1.

Figure 36:
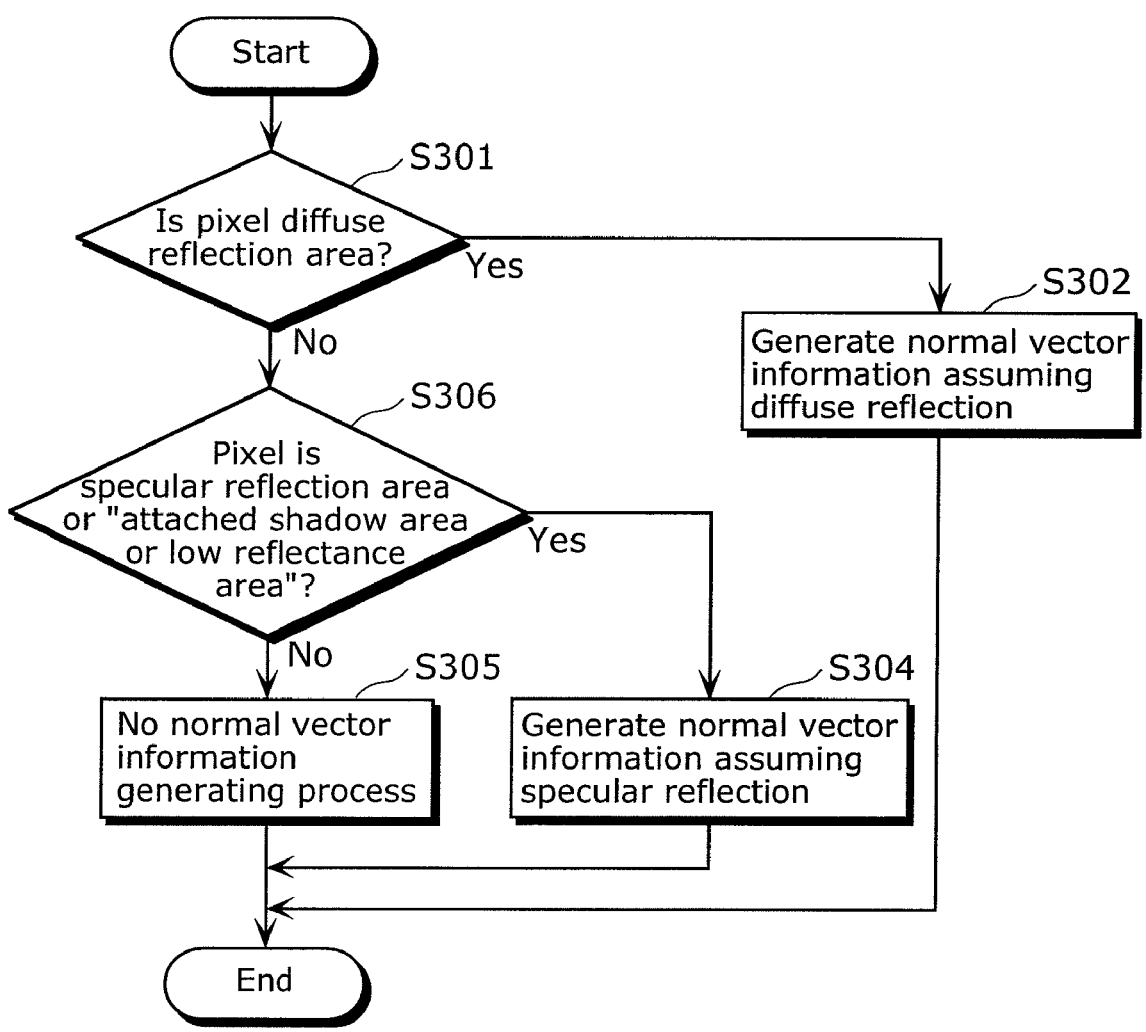
FIG. 36 is a flowchart of processes performed by the normal vector information generating unit in Embodiment 2 of the present invention.

FIG. 36 is a flowchart of processes performed by this normal vector information generating unit 1041. It is to be noted that, in FIG. 36, the steps common with FIG. 29 are assigned with the same numerical references as those in FIG. 29, and detailed descriptions thereof are omitted.

The area referencing unit 307 of the normal vector information generating unit 1041 judges whether or not diffuse reflection components are dominant in the pixel based on the result of the optical area division detected by the area dividing unit 1031 (S301). In this processing, the result of the area division may be read from the accumulation unit 306 in which the result of the area judging unit 305 is accumulated. When it is judged that diffuse reflection components are dominant (Yes in S301), the unit for generating normal vector information assuming diffuse reflection 308 generates normal vector information of the pixel assuming diffuse reflection (S302). More specifically, the one-dimensional degree of freedom of the normal vector on an emission plane is calculated as an angle at which luminance changed by the rotation of a deflecting plate becomes the maximum value. In addition, not diffuse reflection components (No in S301) but specular reflection components are dominant in the pixel or the pixel is "an attached shadow area or a low reflectance area" (Yes in S306), the unit for generating normal vector information assuming specular reflection 309 generates normal vector information of the pixel assuming specular reflection (S304). More specifically, the one-dimensional degree of freedom of the normal vector on the incidence plane is calculated as the angle at which the luminance changed by the rotation of a deflecting plate becomes the minimum value. On the other hand, in the case where the pixel is a cast shadow area (No in S303), it is judged that errors are dominant in the polarization information of the pixel, and no accurate normal vector information can be generated, and the normal vector information generating unit 1041 does not perform normal vector information generating processes (S305).

As described above, according to the optical area dividing device in this Embodiment, it is possible to classify the shadow areas of a snapshot-like image into attached shadow areas and cast shadow areas in a general environment, without requiring a large-scale system enabling movement of a light source. Further, as for "the attached shadow areas or the low reflectance areas", the normal vector information generating unit generates accurate normal vector information assuming specular reflection. In addition, as for shadow areas having polarization information including a lot of errors and where only extremely poor accuracy is obtained when normal vector information is generated, not performing normal vector information generating processes makes it possible to generate highly accurate normal vector information of areas as large as possible.

It is to be noted that, in step S504, the degree of polarization, both the estimated polarization error and the degree of polarization, or the polarization phase may be used as in Embodiment 1 instead of the estimated polarization error in order to judge whether the pixel is "an attached shadow area or a low reflectance area", or a cast shadow area.

Embodiment 3

Next, a description is given of an optical area dividing device in Embodiment 3 of the present invention.

Figure 37:
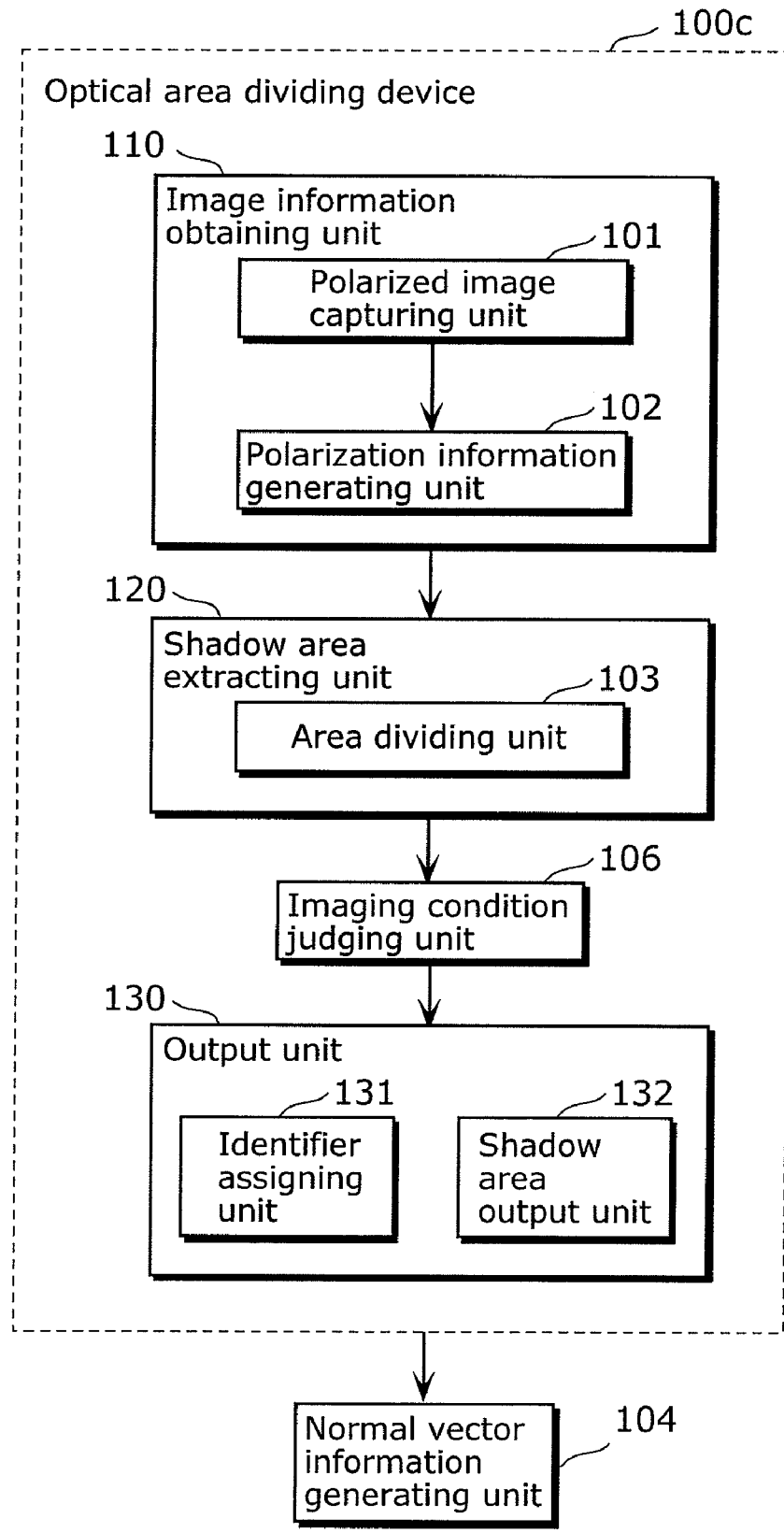
FIG. 37 is a functional block diagram showing the structure of an optical area dividing device in Embodiment 3 of the present invention.

FIG. 37 is a functional block diagram showing the structure of the optical area dividing device 100c in this Embodiment. This optical area dividing device 100c is a device for performing optical area division on the surface of an object by imaging the object, and is characterized by generating normal vector information only when accurate normal vector information can be generated. This optical area dividing device 100c includes an imaging condition judging unit 106 in addition to the structure of the optical area dividing device 100 shown in FIG. 1. Here, a normal vector information generating unit 104 is also shown in this example of processing in which the result of processing performed by the optical area dividing device 100c is used. Although this normal vector information generating unit 104 is not an essential element of the image processing device according to the present invention, but is shown as an example of a post-process processing unit which uses the result of the processing performed by the image processing device according to the present invention. It is to be noted that, in FIG. 37, the structural elements common with FIG. 26 are assigned with the same numerical references as those in FIG. 26, and detailed descriptions thereof are omitted.

The imaging condition judging unit 106 is a processing unit for judging whether or not the target scene to be imaged by the polarized image capturing unit 101 satisfies the imaging condition predetermined as an imaging condition under which the area dividing unit 103 can perform accurate area division.

Figure 38:
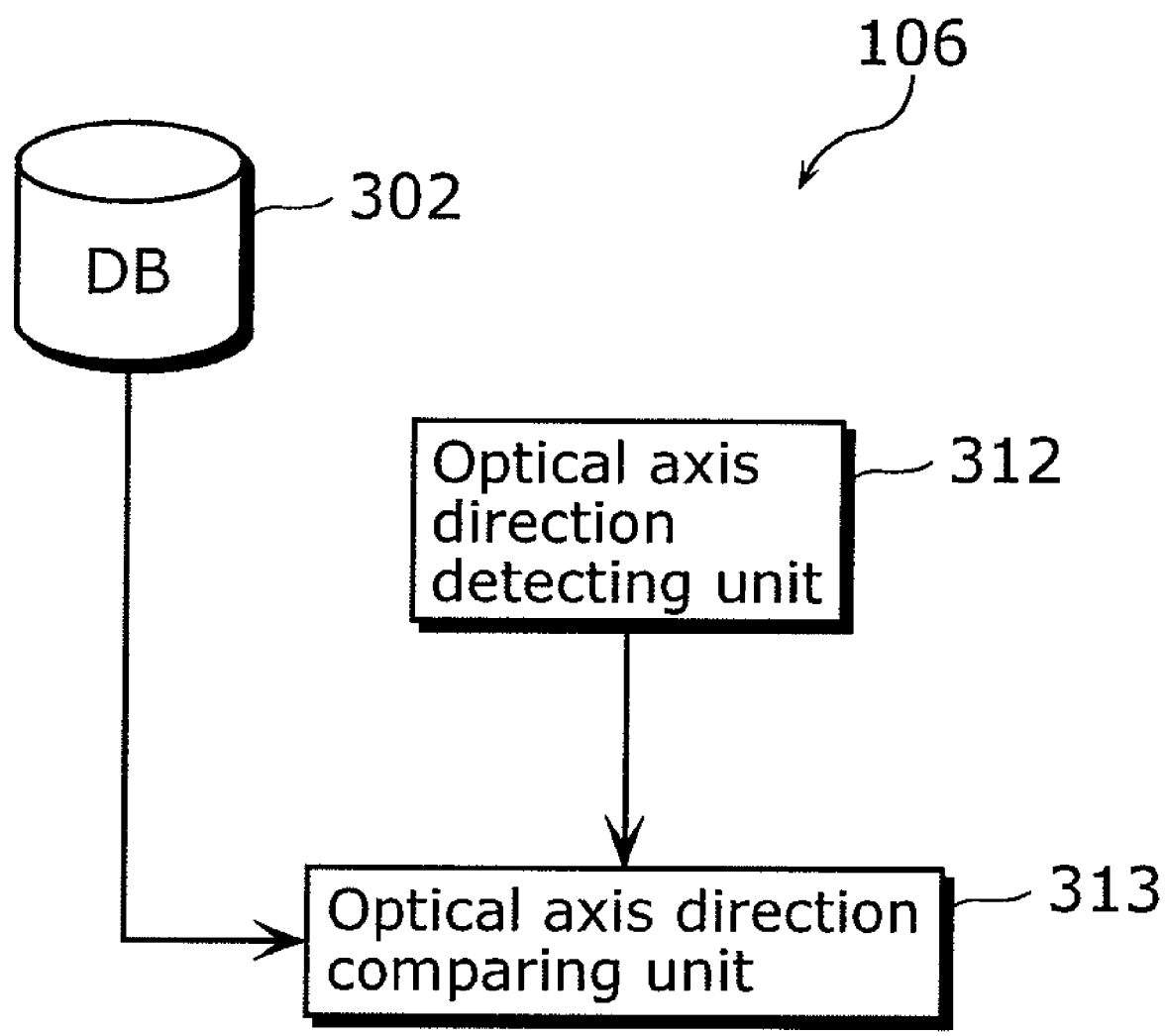
FIG. 38 is a functional block diagram showing a detailed structure of an imaging condition judging unit in Embodiment 3 of the present invention.

FIG. 38 is a functional block diagram showing the detailed structure of this imaging condition judging unit 106. This imaging condition judging unit 106 includes a DB 302, an optical axis direction detecting unit 312, and an optical axis direction comparing unit 313.

The optical axis direction detecting unit 312 is an angle sensor or the like for detecting an optical axis direction of the optical area dividing device 100c.

The optical axis direction detecting unit 313 is a processing unit for judging whether or not the optical area dividing device 100c faces the upward direction of the horizontal surface (horizon plane).

Here, in this Embodiment, the image scene is required to satisfy the Condition 1 as explained in Embodiment 1.

Condition 1: "an object including a large plane exists near an object in an image scene, and a light source exists in the direction opposite to the object from a large plane.

It is to be noted that the above Condition 1 is not always satisfied in a state where the optical area dividing device 100c is placed. For this, in this Embodiment, the imaging condition judging unit 106 judges whether or not the above Condition 1 is satisfied. Here, focusing on the great likelihood that a light source is in the upward direction, the Condition 1 is not satisfied under the following Condition 2.

Condition 2: "an image capturing person captures an image of an upward direction.

This Condition 2 is satisfied, for example, in the following image scene.

1. An outdoor scene of the sky, the moon, or stars.
2. An indoor scene in the direction of the ceiling on which fluorescent lamps are used.

In the case of the above image scene 1, for example, it is considered to image a crescent moon. It is considered that the shadow area of the crescent moon is an attached shadow area. However, this shadow area has a luminance due to the reflection which is multiple reflection from the Earth called earth shine. Therefore, although it is an attached area, it is considered that the multiple reflected light is incident from an extremely limited range, that is, only from the Earth, and that there are substantially no specular reflection components which are specular reflection components. Therefore, the optical area dividing device 100c does not function accurately. For this, the imaging condition judging unit 106 judges whether or not the optical area dividing device 100c accurately functions (can perform accurate area division). When it is considered that the optical area dividing device 100c accurately functions, processes for area division into attached shadow areas and cast shadow areas are performed, while processes for area division into shadow areas are cancelled and processes for generating normal vector information based on the shadow areas are cancelled when it is considered that the optical area dividing device 100c does not accurately function.

Figure 39:
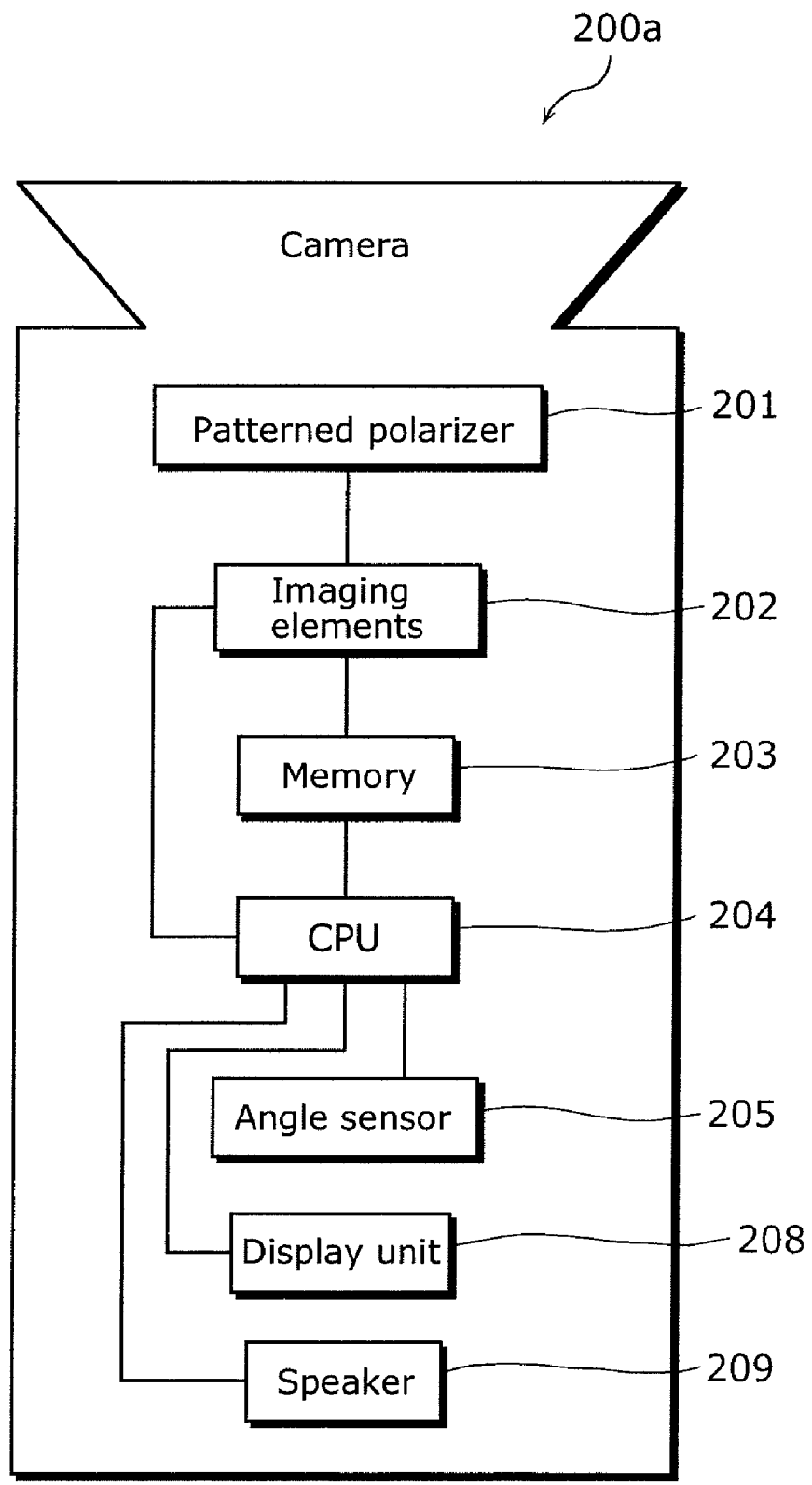
FIG. 39 is a structural example of a camera mounting the optical area dividing device in Embodiment 3 of the present invention.

FIG. 39 shows an example of the hardware structure of a camera 200a mounting an optical area dividing device 100c in this Embodiment. This camera 200a is an imaging device including a function for optically dividing the areas of an image captured, and includes a patterned polarizer 201, imaging elements 202, a memory 203, a CPU 204, an angle sensor 205, a display unit 208, and a speaker 209. It is to be noted that, in FIG. 39, the structural elements common with FIG. 2 are assigned with the same numerical references as those in FIG. 2, and detailed descriptions thereof are omitted.

The angle sensor 205 detects the optical axis direction of the camera 200a and outputs the information.

When the imaging condition judging unit 106 judges that the image scene does not satisfy the above Condition 1, the display unit 208 displays a message indicating the fact.

When the imaging condition judging unit 106 judges that the scene does not satisfy the above Condition 1, the speaker 209 outputs, in form of speech, the message indicating the fact.

It is noted that the optical axis direction detecting unit 312 shown in FIG. 38 is implemented as an angle sensor 205 shown in FIG. 39. The optical axis direction comparing unit 313 shown in FIG. 36 is implemented triggered by that the CPU 204 shown in FIG. 39 executes a program stored in the memory 203.

Figure 40:
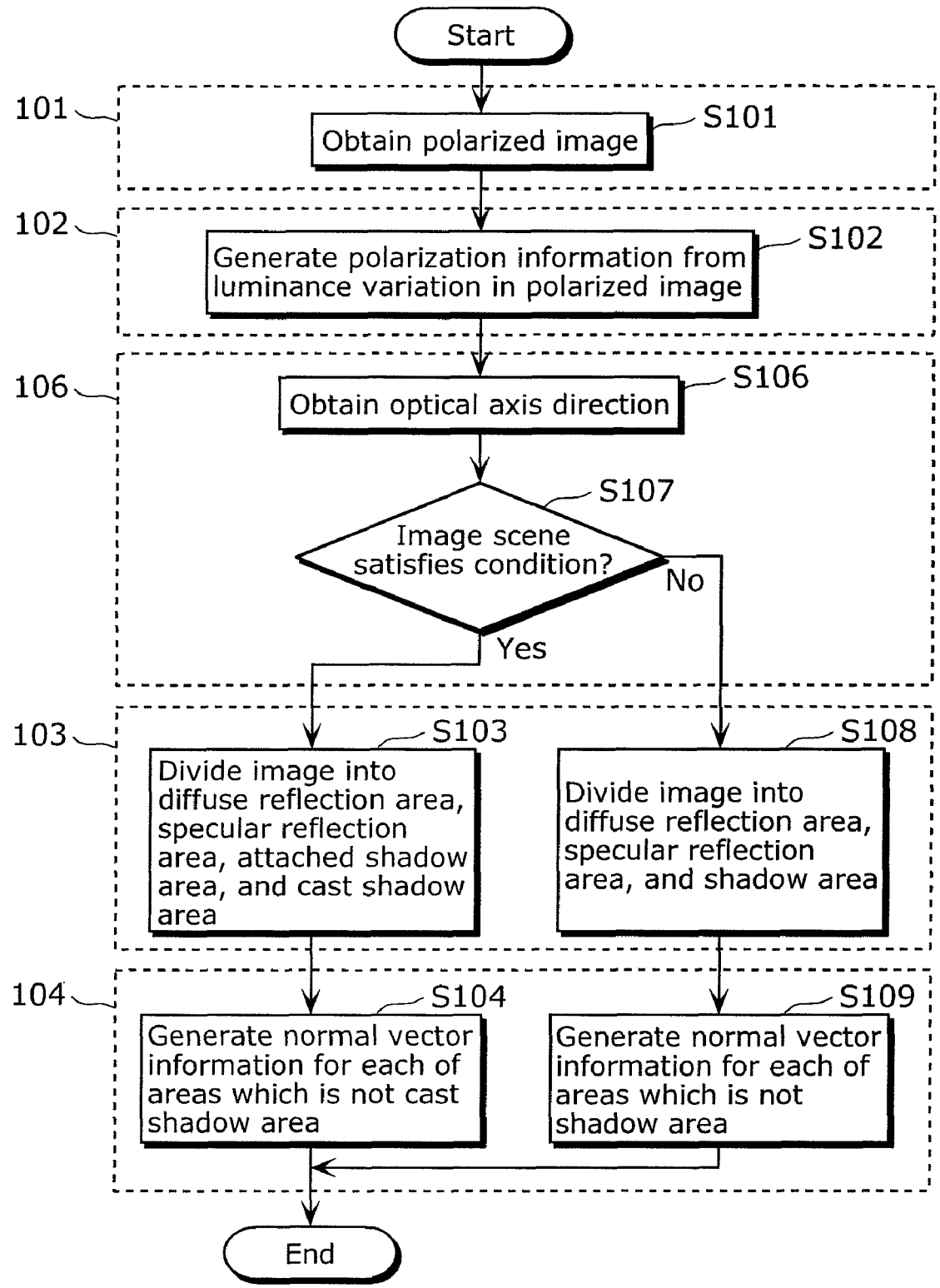
FIG. 40 is a flowchart of processes performed by the optical area dividing device and the normal vector information generating unit in Embodiment 3 of the present invention.

FIG. 40 is a flowchart of processes performed by the optical area dividing device 100c and the normal vector information generating unit 1041 in this Embodiment. It is to be noted that, in FIG. 40, the steps common with FIG. 4 are assigned with the same numerical references as those in FIG. 4, and the detailed descriptions thereof are omitted.

Figure 41:
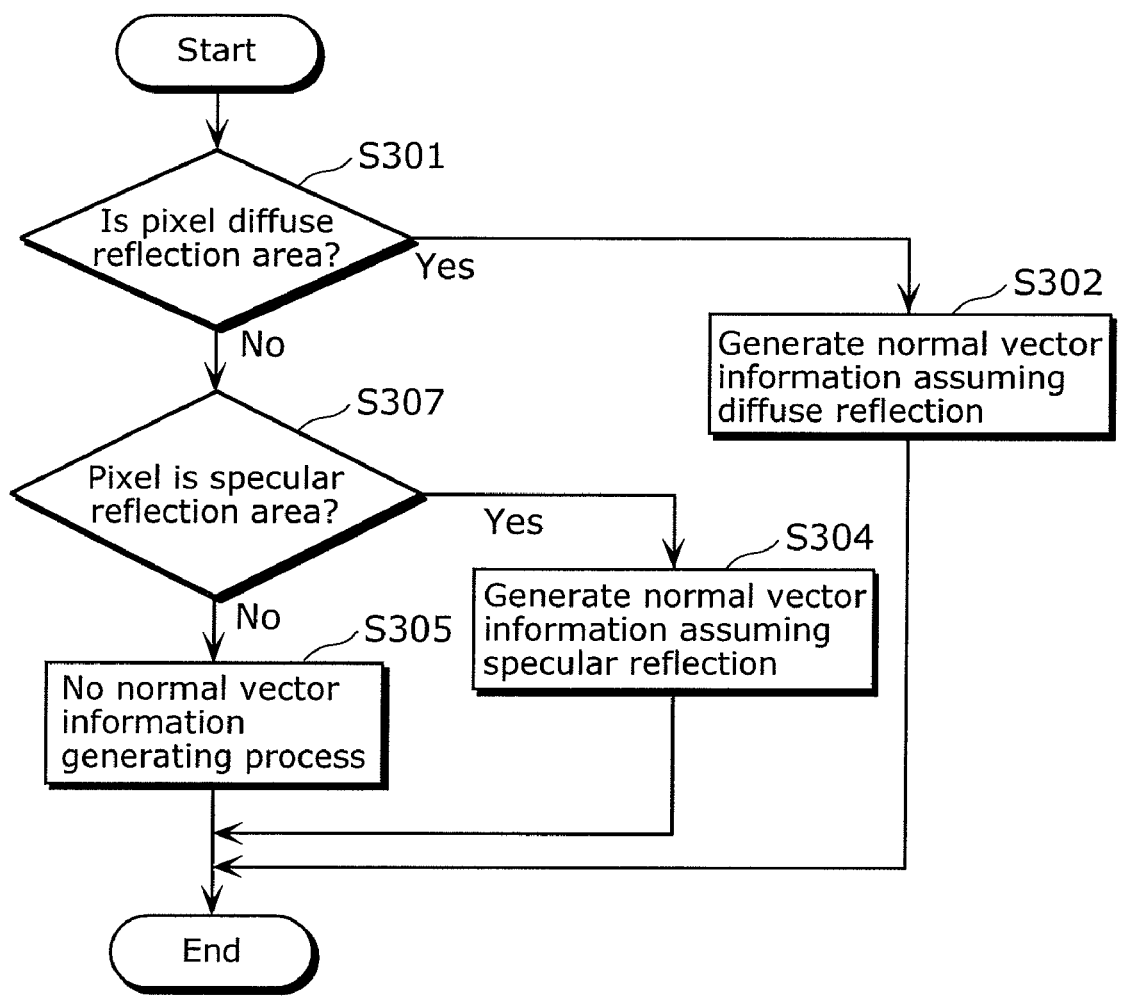
FIG. 41 is a flowchart of processes performed by the normal vector information generating unit in Embodiment 3 of the present invention.

In this Embodiment, the optical axis direction detecting unit 312 (angle sensor 205) obtains optical axis direction information indicating the optical axis direction of the optical area dividing device 100c (camera 200a) (S106). Based on the optical direction information calculated in this way, a judgment is made as to whether or not an image scene can be captured in an environment allowing generation of normal vector information (S107). This judgment is made by the optical axis direction comparing unit 313 depending on whether or not the optical axis direction of the optical area dividing device 100c (camera 200a) faces upward. The optical axis direction comparing unit 313 judges that the optical axis direction faces upward when the optical axis faces upward by 45 degrees or more from the horizontal direction. This threshold value of 45 degrees may be determined empirically, and such threshold value may be held in the DB 302. Here, when the optical axis direction comparing unit 313 judges that the optical axis direction faces upward, the imaging condition judging unit 106 judges that the image scene does not satisfy the Condition 1 (No in S107), and the area dividing unit 103 classifies the portions of the image into diffuse reflection areas, specular reflection areas, and shadow areas, based on the polarization information generated by the polarization information generating unit 102 and the luminance information obtained by the polarized image capturing unit 101 (S508). Since the Condition 1 is not satisfied in this case, shadow areas are not classified into attached shadow areas and cast shadow areas. Subsequently, the normal vector information generating unit 104 generates normal vector information from the polarization information, based on the result of the area division performed by the area dividing unit 103 (S109). FIG. 41 is a flowchart of detailed processes of this processing (S109). It is to be noted that, in FIG. 41, the steps common with FIG. 29 are assigned with the same numerical references as those in FIG. 29, and detailed descriptions thereof are omitted.

The normal vector information generating unit 104 judges whether or not diffuse reflection components are dominant in the pixel based on the result of the optical area division detected by the area dividing unit 103 (S301). When it is judged that diffuse reflection components are dominant (Yes in S301), the normal vector information generating unit 104 generates normal vector information of the pixel assuming diffuse reflection (S302). More specifically, the one-dimensional degree of freedom of the normal vector on an emission plane is calculated as an angle at which luminance changed by the rotation of a deflecting plate becomes the maximum value. In addition, in the case where specular reflection components are dominant in the pixel (Yes in S307) not diffuse reflection components are dominant in the pixel (No in S301), the normal vector information generating unit 104 generates normal vector information of the pixel assuming specular reflection (S304). More specifically, the one-dimensional degree of freedom of the normal vector on the incidence plane is calculated as the angle at which the luminance changed by the rotation of a deflecting plate becomes the minimum value. On the other hand, in the case where the pixel is a shadow area, that is, neither diffuse reflection components nor specular reflection components are dominant (No in S307), the normal vector information generating unit 104 judges that errors are dominant in the polarization information of the pixel, and that no accurate normal vector information can be generated, and thus the normal vector information generating unit 104 does not perform normal vector information generating process (S305).

In contrast, when it is judged that the optical axis direction does not face upward (Yes in S107), the imaging condition judging unit 106 judges that the image scene satisfies the Condition 1, the area dividing unit 103 performs optical area dividing process (S103), and subsequently, the normal vector information generating unit 104 generates normal vector information (S104).

It is to be noted that, when the imaging condition judging unit 106 judges that the image scene does not satisfy the Condition 1, it is desirable that the display unit 208 displays, on the display, a message indicating that "No area division can be implemented.", and that the speaker 209 notifies the image capturing person of a similar message by generating an audio signal.

As a matter of course, when the imaging condition judging unit 106 judges that the image scene does not satisfy the Condition 1, it is also good to generate normal vector information of the shadow areas assuming diffuse reflection instead of not performing optical area dividing processes and normal vector information generating processes, and it is good that the display unit 208 displays, on the display, a message indicating that "Area dividing processes are unstable.", and that the speaker 209 notifies the image capturing person of the similar message by generating an audio signal.

In addition, when the imaging condition judging unit 106 judges that the image scene does not satisfy the Condition 1, the normal vector information generating unit 104 may synthesize normal vector information by performing an interpolating process using the normal vector information of the adjacent areas for the shadow areas. This interpolating process requires a conventional approach only.

In addition, the imaging condition judging unit 106 does not necessarily have the optical axis direction detecting unit 312, and for example, it is good to use a processing unit having a function for recognizing an environment where the optical area dividing device 100c is placed. This is implemented by, for example, using a sonar or the like. A description is given of a normal vector information generating device according to this Variation, of this Embodiment, having such function for recognizing an environment.

Figure 42:
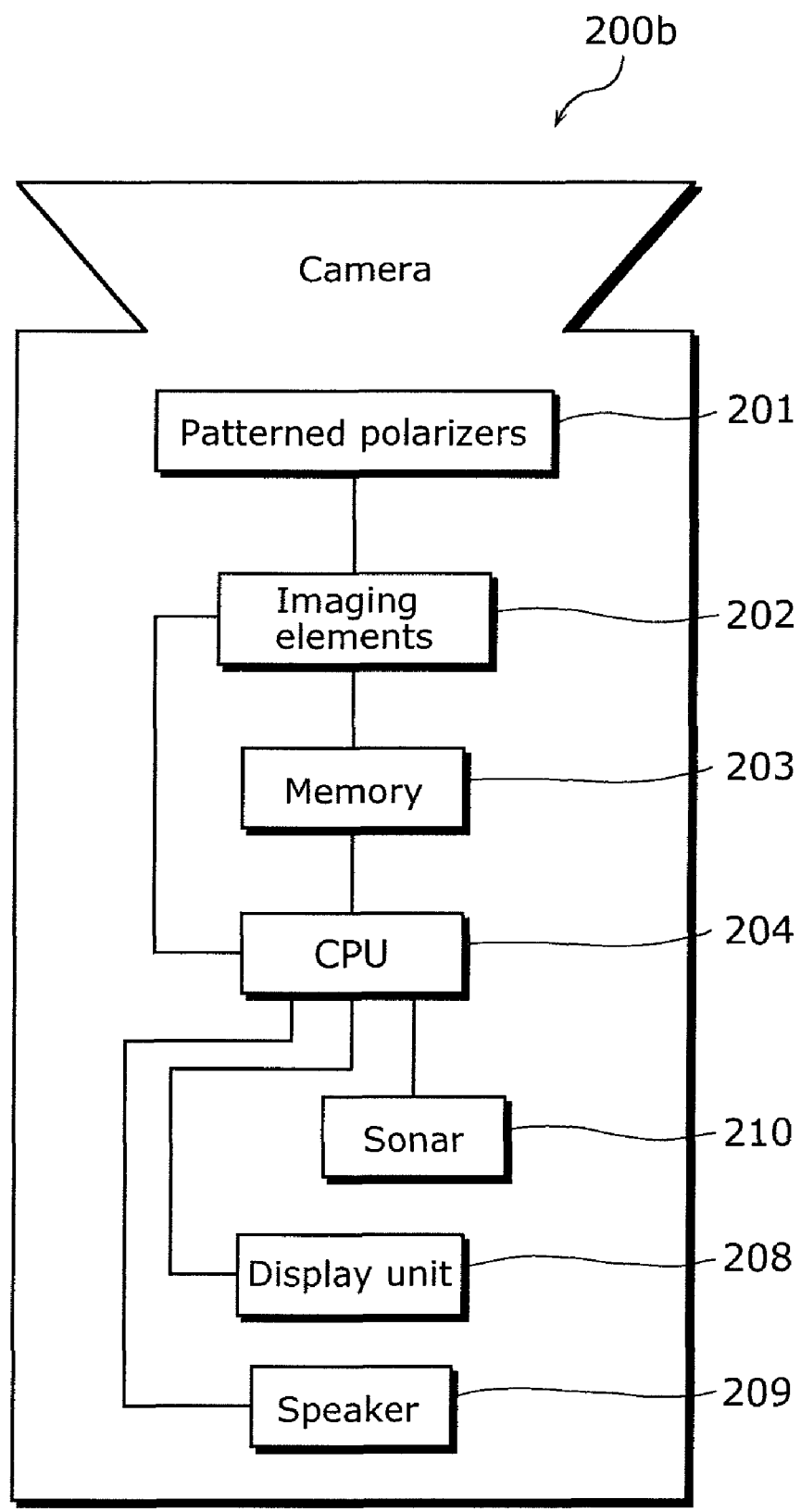
FIG. 42 is a structural example of the camera mounting the optical area dividing device in a Variation using sonar, of a Variation of Embodiment 3 in the present invention.

FIG. 42 shows an example of the hardware structure of the camera 200b mounting the optical area dividing device according to this Variation. This camera 200b has the same structure as that of the camera 200a in this Embodiment shown in FIG. 39 except that the angle sensor 205 is replaced with the sonar 210. It is to be noted that, in FIG. 42, the structural elements common with FIG. 39 are assigned with the same numerical references as those in FIG. 39, and detailed descriptions thereof are omitted.

Figure 43:
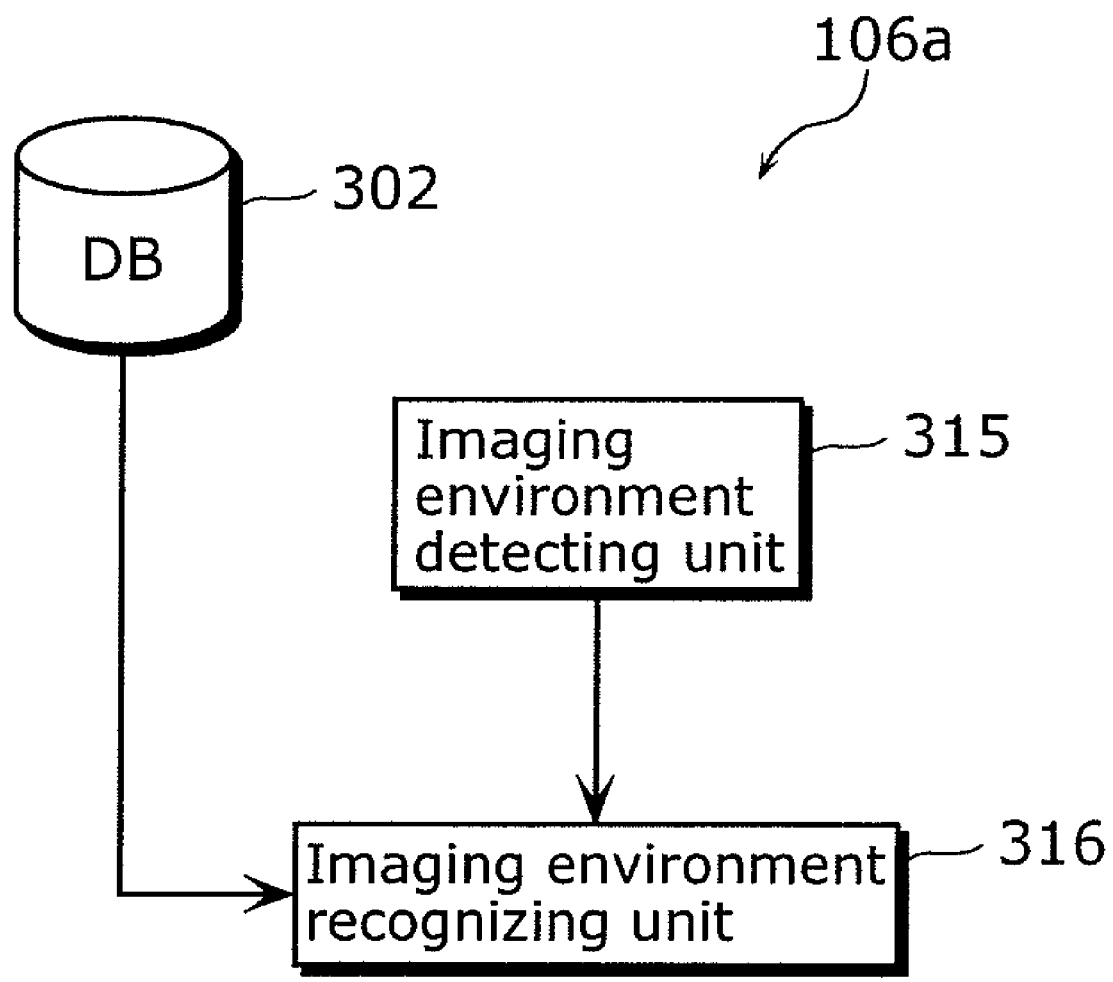
FIG. 43 is a functional block diagram showing a detailed structure of an imaging condition judging unit in Embodiment 3 of the present invention.

FIG. 43 is a functional block diagram showing the detailed structure of the imaging condition judging unit 106a included in the normal vector information generating device according to this Variation. It is to be noted that the normal vector information generating device according to this Variation has the same structure as that of the optical area dividing device 100c in the Embodiment shown in FIG. 37 except that the imaging condition judging unit 106 is replaced with the imaging condition judging unit 106a. This imaging condition judging unit 106a includes a sonar for measuring a distance to a nearby object by generating a sound wave and receiving a reflected wave of the sound wave, judges whether or not there is a material body near the normal vector information generating device using the sonar, characterized by judging, when it is judged that there is no such material body, that the image scene does not satisfy the imaging condition, and includes a DB 302, an imaging environment detecting unit 315, and an imaging environment recognizing unit 316. It is to be noted that, in FIG. 43, the structural elements common with FIG. 38 are assigned with the same numerical references as those in FIG. 38, and detailed descriptions thereof are omitted.

The imaging environment detecting unit 315 is a processing unit for measuring the distance to the nearby object, and generating the distance information as imaging environment information, and corresponds to the sonar 210 shown in FIG. 42.

The imaging environment recognizing unit 316 is a processing unit for judging whether or not a current environment is an environment where optical area division can be performed on the image scene using the imaging environment information from the imaging environment detecting unit 315.

Figure 44:
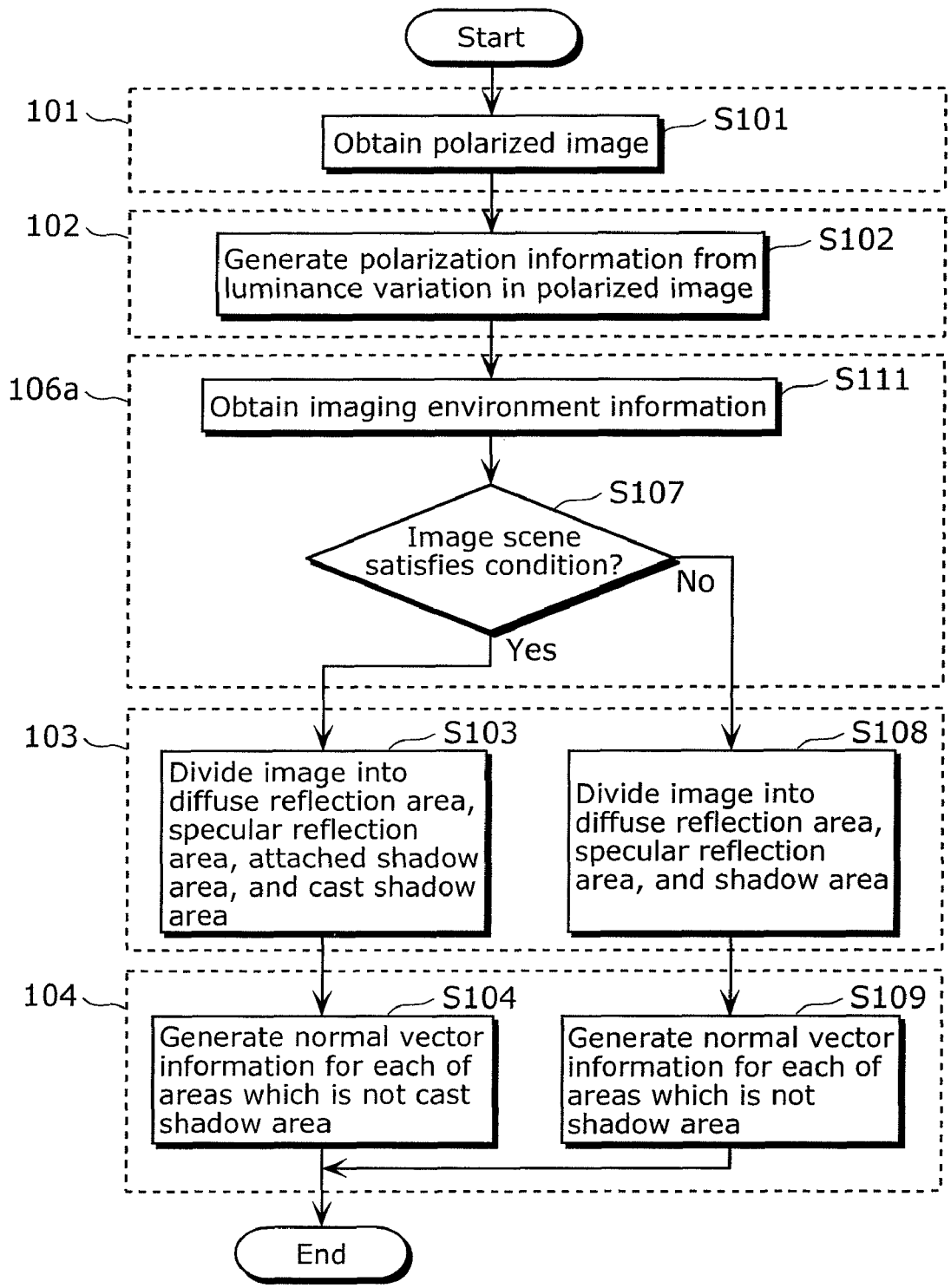
FIG. 44 is a flowchart of processes performed by the optical area dividing device and the normal vector information generating unit shown in FIG. 42.

FIG. 44 is a flowchart of processes performed by the optical area dividing device and the normal vector information generating unit 104 according to this Variation. It is to be noted that, in FIG. 44, the steps common with FIG. 40 are assigned with the same numerical references as those in FIG. 40, and detailed descriptions thereof are omitted.

In the normal vector information generating device according to this Variation, the imaging environment detecting unit 315 obtains the image environment information using the sonar (S111). This sonar 210 is an active sonar which measures the distance to the nearby object by generating an ultrasound wave and a sound wave, and receiving the reflected wave. Therefore, the use of the sonar 210 makes it possible to detect whether or not there is a material body near the camera 200b, and when there is a material body, obtains the distance information to the material body as the imaging environment information. It is to be noted that the sonar 210 is widely used as a fish detector or the like and is known in public, and thus the detailed descriptions thereof are omitted.

Whether or not a current environment is an environment where optical area division is performed on the image scene is judged based on the imaging environment information calculated in this way (S107). This is performed triggered by that the imaging environment recognizing unit 316 judges whether or not there is a material body near the camera 200b. More specifically, it is only necessary that the imaging environment detecting unit 315 obtains the distance information to a material body near (in all directions) the camera 200b, and evaluates the magnitude of the solid angle at the distance shorter than a constant value TH_S. Here, in the case where the magnitude of the solid angle is less than the threshold value TH_SR, the imaging condition judging unit 106 judges that the image scene does not satisfy the Condition 1 (No in S107), and the area dividing unit 103 classifies the portions of the image into diffuse reflection areas, specular reflection areas, and shadow areas using the polarization information generated by the polarization information generating unit 102 and the luminance information obtained by the polarized image capturing unit 101 (S108). Since the Condition 1 is not satisfied, no classification of shadow areas into attached shadow areas and cast shadow areas is performed. Further, the normal vector information generating unit 104 generates normal vector information from the polarized information based on the result of the area division performed by the area dividing unit 103 (S109). On the other hand, when the magnitude of the solid angle like this is greater than the threshold value TH_SR, the imaging condition judging unit 106 judges that the image scene satisfies the Condition 1 (Yes in S108), and the area dividing unit 103 performs optical area dividing processes and further, the normal vector information generating unit 104 generates normal vector information.

It is to be noted that such threshold value TH_S, and TH_SR may be empirically determined and held in the DB 302.

As described above, according to the optical area dividing device in this Embodiment, it is possible to classify the shadow areas of a snapshot-like image into attached shadow areas and cast shadow areas in a general environment, without requiring a large-scale system enabling movement of a light source. Furthermore, if it is difficult to perform such classification, the optical area dividing device can perform highly-reliable area dividing process by not obtaining an inaccurate result but notifying the image capturing person of the fact that it is impossible to perform the intended process.

Embodiment 4

Next, a description is given of an optical area dividing device in Embodiment 4 of the present invention.

Figure 45:
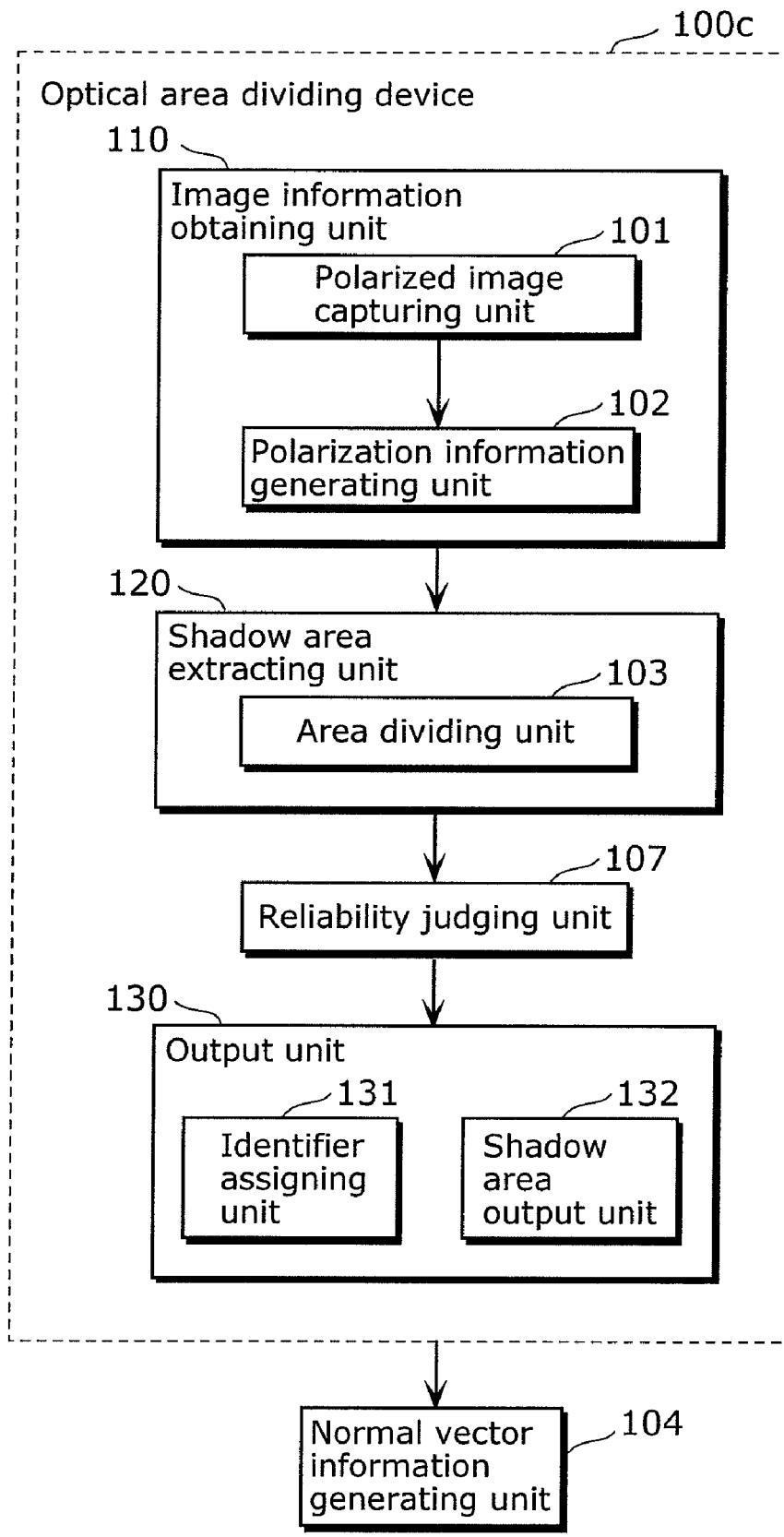
FIG. 45 is a functional block diagram showing the structure of an optical area dividing device in Embodiment 4 of the present invention.

FIG. 45 is a functional block diagram showing the structure of the optical area dividing device 100d in this Embodiment. This optical area dividing device 100d is a device for performing optical area division on the surface of an object by imaging the object, and is characterized by not generating unreliable area division result and normal vector information. This optical area dividing device 100c includes a reliability judging unit 107 in addition to the structure of the optical area dividing device 100 shown in FIG. 1. Here, a normal vector information generating unit 104 is also shown in this example of processing in which the result of processing performed by the optical area dividing device 100d is used. Although this normal vector information generating unit 104 is not an essential structural element of the image processing device according to the present invention, but is shown as an example of a post-process processing unit which uses the result of the processing performed by the image processing device according to the present invention. It is to be noted that, in FIG. 45, the structural elements common with FIG. 26 are assigned with the same numerical references as those in FIG. 26, and detailed descriptions thereof are omitted. In addition, the camera mounting the optical area dividing device 100*d* in this Embodiment has the same hardware structure as that of the camera 200 in Embodiment 1 shown in FIG. 2.

The reliability judging unit 107 evaluates the reliability of the result of the optical area division using the result of the optical area division performed by the area dividing unit 103, and when there is no reliability, discards the result of the optical area division and the normal vector information. As the result, the normal vector information of areas without reliability is discarded.

Figure 46:
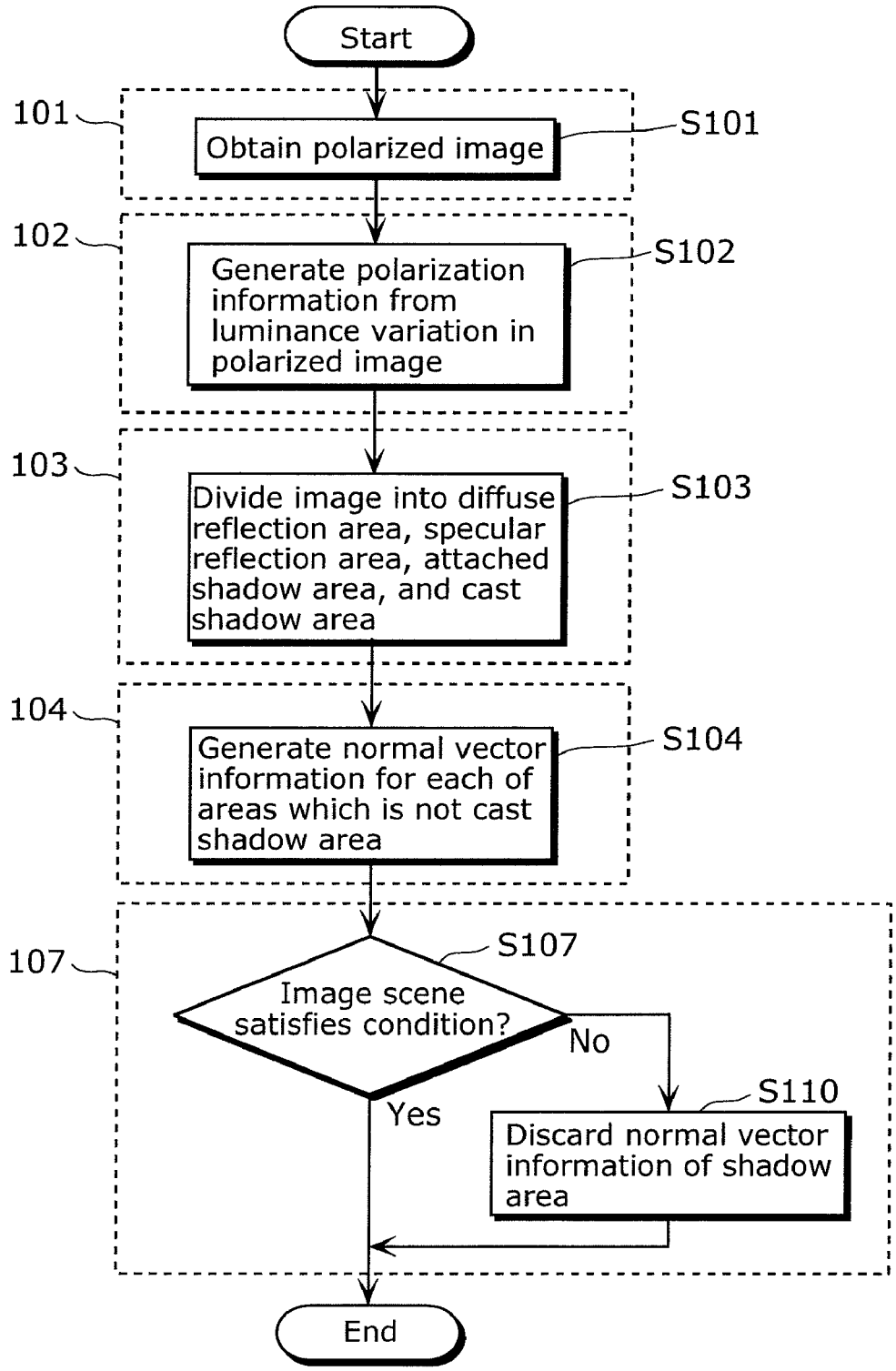
FIG. 46 is a flowchart of processes performed by the optical area dividing device and the normal vector information generating unit in Embodiment 4 of the present invention.

FIG. 46 is a flowchart of processes performed by the optical area dividing device 100*d* and the normal vector information generating unit 104 in this Embodiment. It is to be noted that, in FIG. 46, the steps common with FIG. 4 and FIG. 40 are assigned with the same reference numerals as those in FIG. 4 and FIG. 40, and the detailed descriptions thereof are omitted. The reliability judging unit 107 evaluates whether or not the above-mentioned Condition 1 is satisfied, in other words, the reliability of the result of the optical area division, using the result of the optical area division performed by the area dividing unit 103. In the case where there is no reliability (No in S107), the reliability judging unit 107 discards the result of the optical area division and the normal vector information generated by the normal vector information generating unit 104 (S110).

Here, in order to judge whether or not the Condition 1 is satisfied, it is good to judge whether or not there is an attached shadow area where specular reflection components are dominant due to the influence of multiple specular reflected light within the shadow area. For this, here, a description is given of a method for evaluating the reliability based on the degree of polarization and the luminance value of the polarized image. It is good to judge that the Condition 1 is not satisfied in the case where no pixel indicating specular reflection polarization characteristic exists in the shadow area, in other words, no attached shadow area exists on the image.

Figure 47:
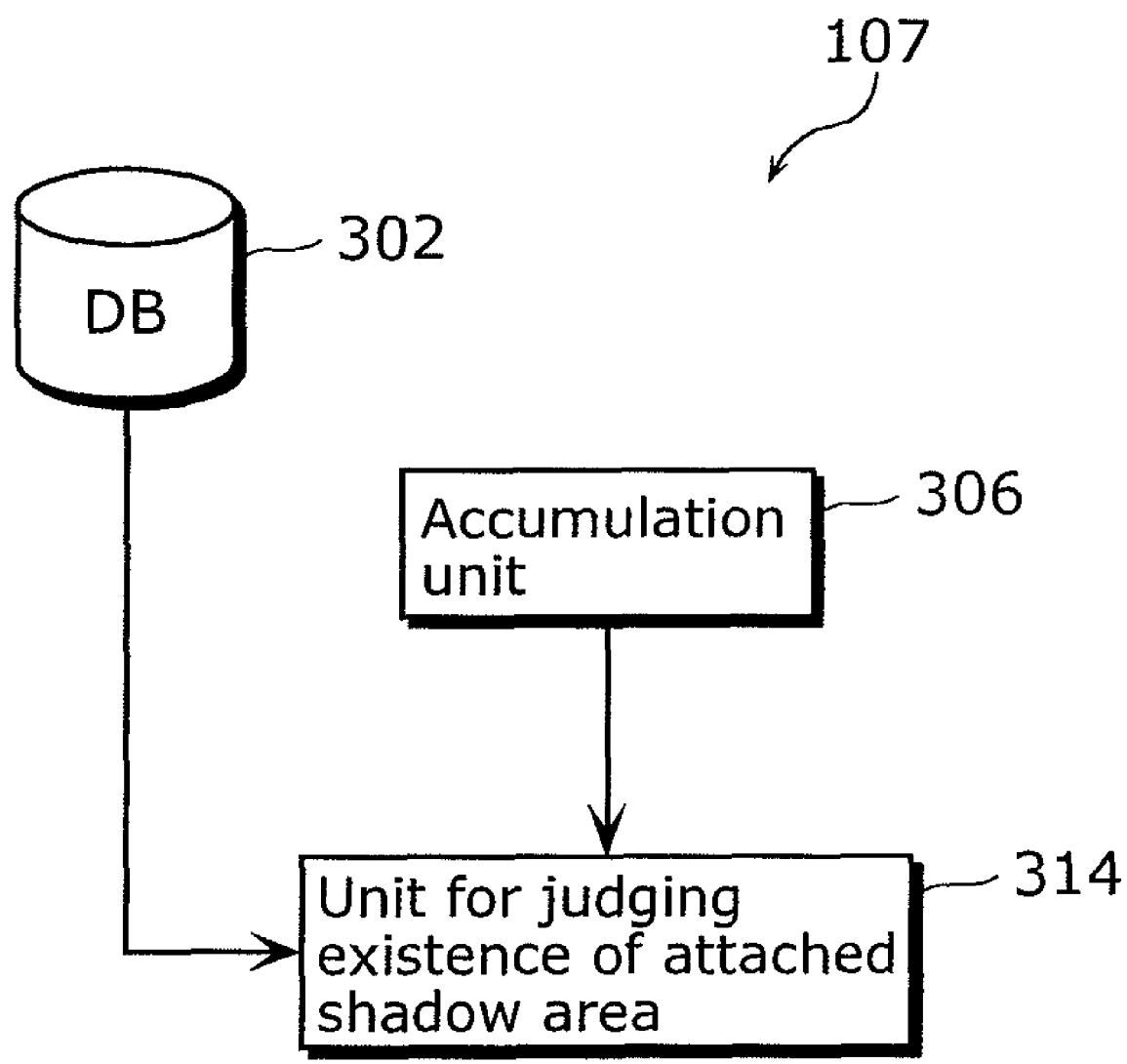
FIG. 47 is a functional block diagram showing a detailed structure of an imaging condition judging unit in Embodiment 4 of the present invention.

FIG. 47 is a functional block diagram showing the detailed structure of the reliability judging unit 107. The reliability judging unit 107 includes the DB 302, the accumulation unit 306, and the unit for judging existence of an attached shadow area 314.

The accumulation unit 306 accumulates the result of area division performed by the area dividing unit 103.

The unit for judging existence of an attached shadow area 314 is a processing unit for referring to the result of the area division accumulated in the accumulation unit 306, and judges whether or not an attached area having a sufficient size (equal to or more than a predetermined threshold value) has been divided.

The following are details of the processes (S107 and S110) performed by the reliability judging unit 107 shown in FIG. 46.

The unit for judging existence of an attached shadow area 314 judges whether or not an attached shadow area having a sufficient size has been divided by referring to the result of the area division accumulated in the accumulation unit 306 (S107). In the case where the result shows that no attached shadow area having a sufficient size exists in an image, more specifically, in 100 pixels or more in a VGA image (No in S107), the reliability judging unit 107 judges that the image scene does not satisfy the Condition 1, and the results of the optical area division of the shadow area and the normal vector information are discarded (S110). At this time, it is desirable that an image capturing person is notified of the fact by means that the display unit 208 displays, on a display, a message indicating that "No normal vector information generating processes of shadow areas can be implemented", or the speaker 209 generates an audio signal. In the opposite case where an attached shadow area exists in the image (Yes in S107), the reliability judging unit 107 judges that the image scene satisfies the Condition 1, and outputs the generated normal vector information. Here, it is good to empirically determine the threshold value for the size of the attached shadow area, and such threshold value may be held in the DB 302.

As described above, according to the optical area dividing device in this Embodiment, it is possible to classify the low reflectance areas of a snapshot-like image into attached shadow areas and cast shadow areas in a general environment, without requiring a large-scale system enabling movement of a light source. Furthermore, if it is difficult to perform such classification, the optical area dividing device can perform highly-reliable area dividing process by not obtaining an inaccurate result but notifying the image capturing person of the fact that it is impossible to perform the intended process.

Up to this point, the image processing device according to the present invention has been described using Embodiments 1 to 4, and their Variations, but the present invention is not limited to these Embodiments and Variations.

The present invention includes another embodiment where the structural elements in any of these Embodiments and Variations are arbitrarily combined and implemented, and an embodiment obtainable by making modifications which may be arrived at a person skilled in the art to any of these Embodiments and Variations.

In addition, in the case where the reliability judging unit 107 judges that the image scene does not satisfy the Condition 1, it is good to perform normal vector information generating processes instead of not performing the processes, and it is good that the display unit 208 displays, on the display, a message indicating that "Area dividing processes are unstable." or the like, or the speaker 209 notifies the image capturing person of the fact by generating an audio signal.

In addition, when the reliability judging unit 107 judges that the image scene does not satisfy the Condition 1, all optical area division result and normal vector information may be discarded not only the normal vector information of the shadow areas.

In some parts of the above-described Embodiments and their Variations, a normal vector information generating unit is also shown together with the optical area dividing device. However, the image processing device according to the present invention may include or may not include such normal vector information generating unit. The normal vector information generating unit is a mere example of a processing unit which uses the result of area division by the area dividing unit. Possible processing examples in which such area division results are used include a process of generating various shape information for generating shape models of an object, and a process of generating a beautiful three-dimensional image by correcting shadow areas.

In addition, in Embodiment 4, the reliability of the optical area division result is evaluated based on the result of optical area division performed by the area dividing unit 103, but approaches for evaluating such reliability are not limited to this. For example, the reliability of the optical area division result may be evaluated based on the shape information of the object.

Figure 48:
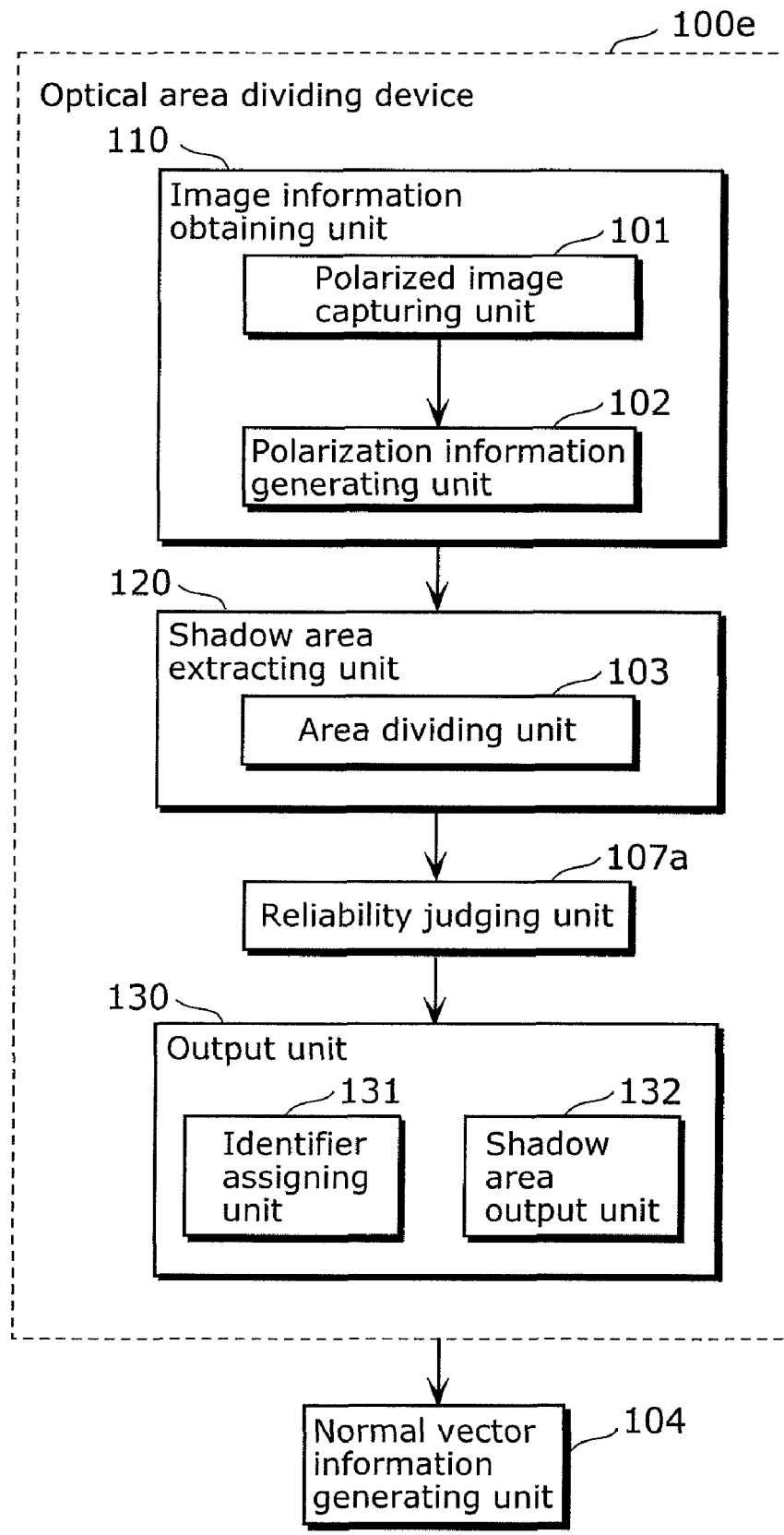
FIG. 48 is a functional block diagram showing the structure of the optical area dividing apparatus according to a Variation, of the present invention, in which the reliability of the optical area division result is evaluated based on the shape information of an object.

FIG. 48 is a functional block diagram showing the structure of the optical area dividing device 100e according to a Variation, of the present invention, in which the reliability of the optical area division result is evaluated based on the shape information of an object. This optical area dividing device 100e is a device for performing optical area division on the surface of the object by imaging the object, characterized by not outputting unreliable division result of low reflectance areas, and includes a reliability judging unit 107a in addition to the structure of the optical area dividing device 100 shown in FIG. 1.

Figure 49:
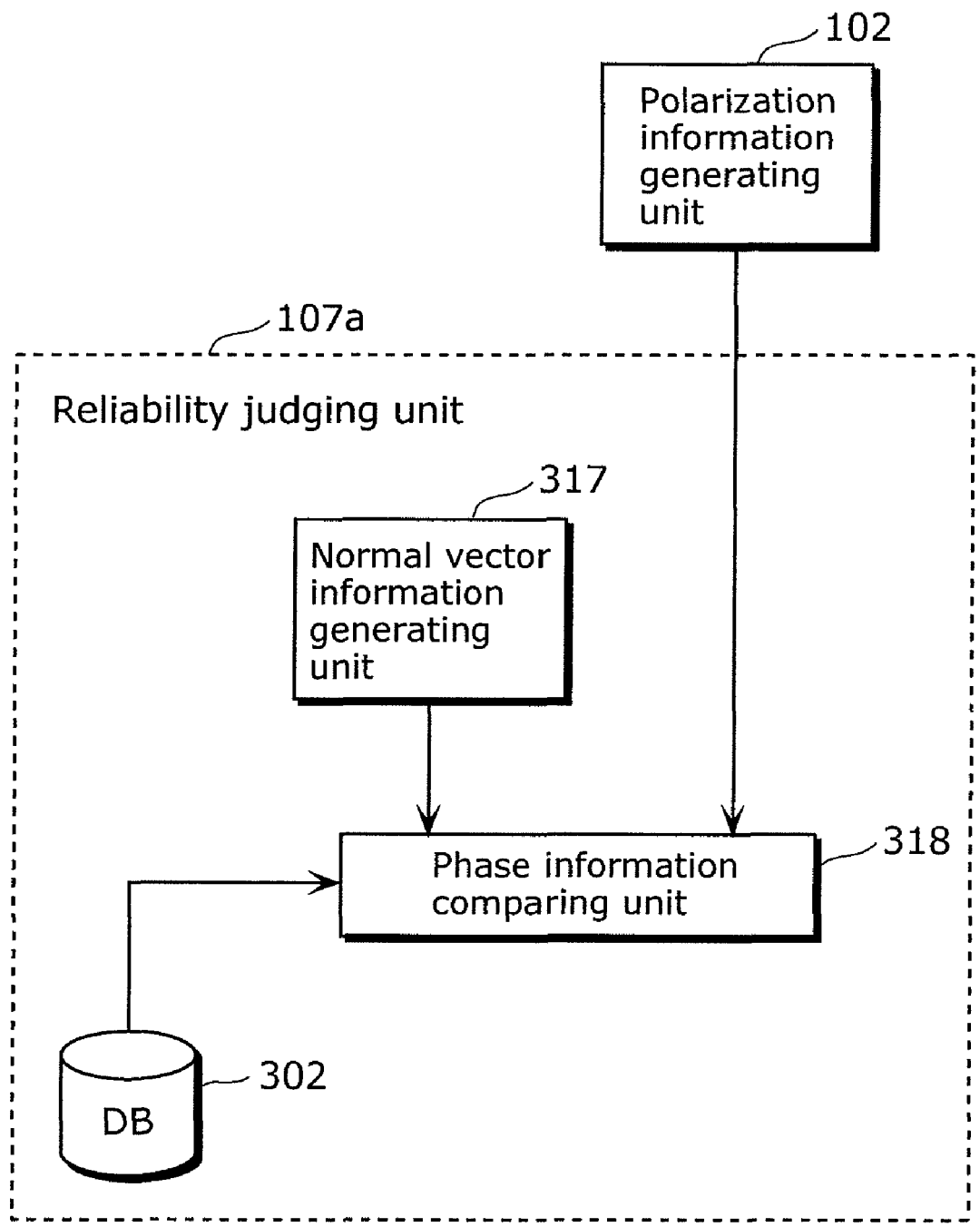
FIG. 49 is a functional block diagram showing a detailed structure of the reliability judging unit mounting the optical area dividing device shown in FIG. 48.

The reliability judging unit 107a is a processing unit for generating shape information of the object, evaluating the reliability of the result of the optical area division performed by the area dividing unit 103 based on the generated shape information, and discarding the result of the optical area division in the case where the result is unreliable. As shown in FIG. 49, the reliability judging unit 107a includes a normal vector information generating unit 317 and a phase information comparing unit 318.

The DB 302 is a storage unit for storing a threshold value which is used for comparison made by the phase information comparing unit 318.

The normal vector information generating unit 317 is a processing unit for generating a normal vector (Nx Ny, Nz) corresponding to each pixel in a polarized image using the shape information generated by the shape information generating unit 211, and calculating, based on the generated normal vector, a one-dimensional freedom degree $\phi_N$ of the normal vector projected on the surface of the patterned polarizer.

The phase information comparing unit 318 is a processing unit for comparing, for each of the existing shadow areas, the polarization phase angle $\phi$ generated by the polarization information generating unit 102 with the one-dimensional freedom degree $\phi_N$ of the normal vector calculated by the normal vector information generating unit 317, and judging whether or not these values are sufficiently close to each other depending on whether or not the difference is less than the threshold value stored in the DB 302.

Figure 50:
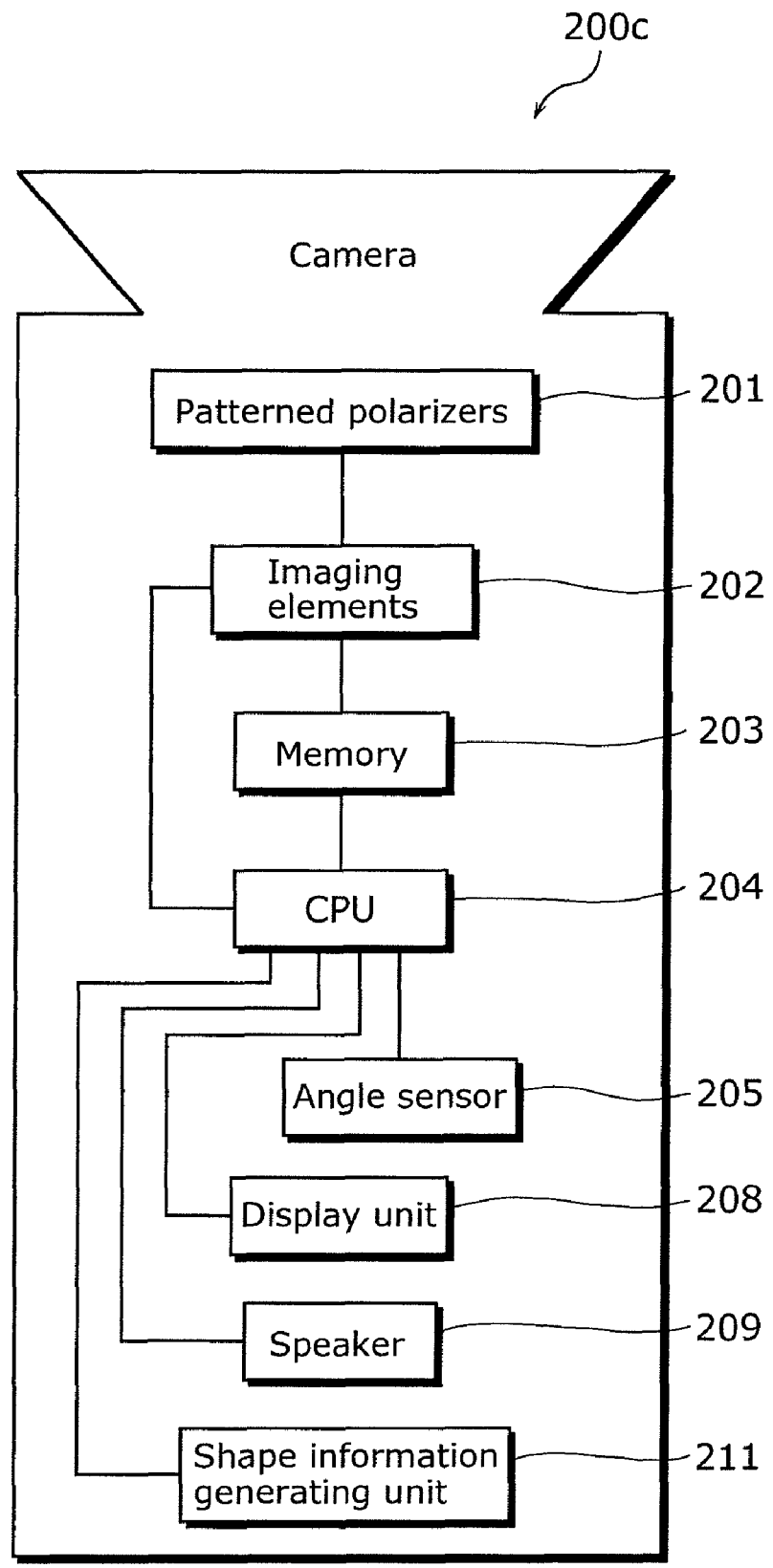
FIG. 50 is a diagram showing the hardware structure of the camera mounting the optical area dividing device shown in FIG. 48.

FIG. 50 shows the hardware structure of the camera 200c mounting the optical area dividing device 100e like this. This camera 200c is an imaging device having a function for optically dividing the areas of an image captured, and includes a pattern polarizer 201, imaging elements 202, a memory 203, a CPU 204, an angle sensor 205, a display unit 208, a speaker 209, and a shape information generating unit 211. This structure includes a shape information generating unit 211 in addition to the camera 200a shown in FIG. 39.

The shape information generating unit 211 is intended to generate shape information of an object, and is a range finder, a stereo camera, or the like. It is to be noted that the normal vector information generating unit 317 shown in FIG. 49 is implemented as a shape information generating unit 211, a CPU 204, a memory 203, and the like shown in FIG. 50, and the phase information comparing unit 318 is implemented as the CPU 204, the memory 203, and the like shown in FIG. 50.

Figure 51:
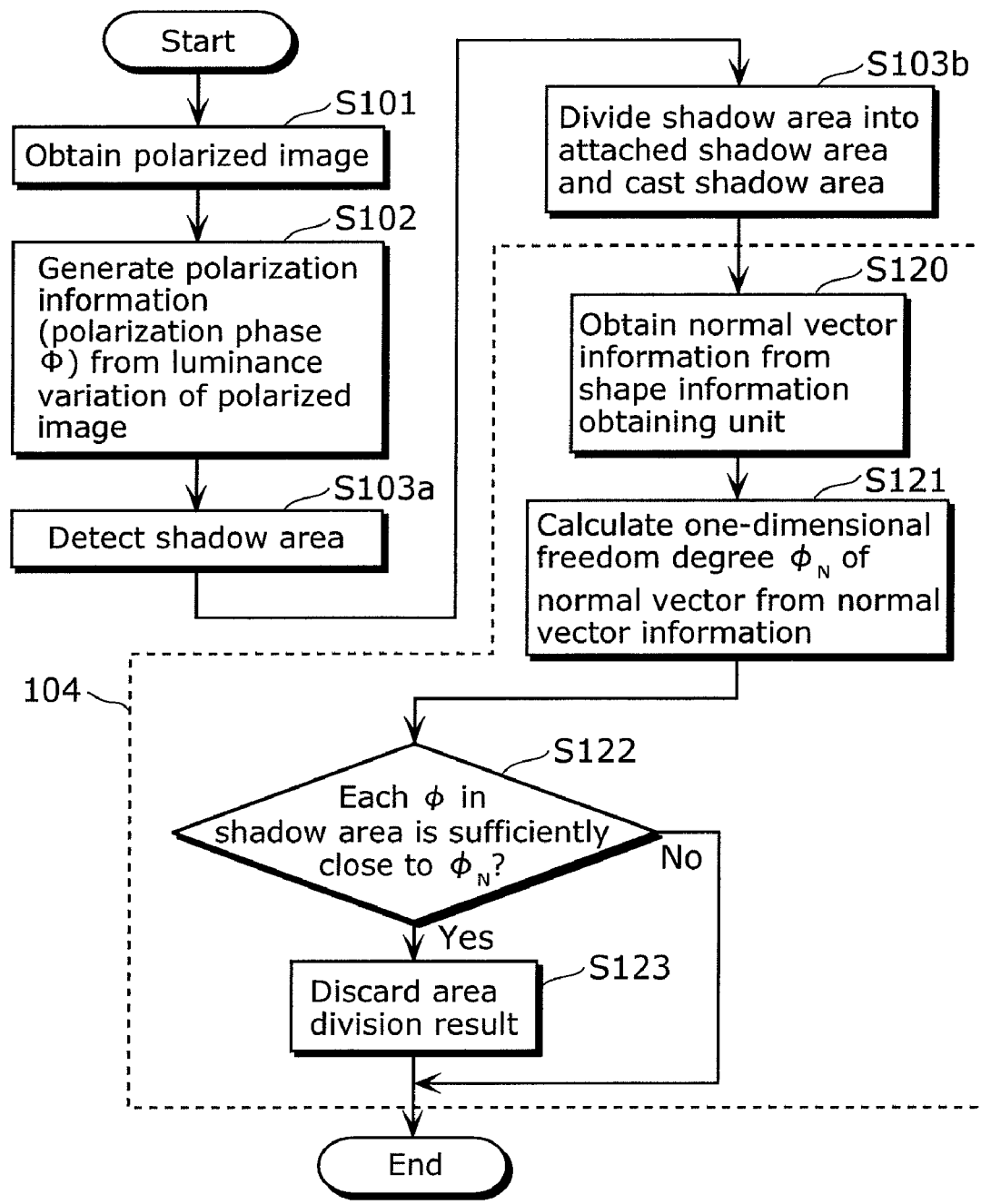
FIG. 51 is a flowchart of optical area division processes performed by the optical area dividing device shown in FIG. 48.

FIG. 51 is a flowchart of optical area division processes performed by the optical area dividing device 100e like this. It is to be noted that this flowchart is obtained by adding steps S120 to S123 to the flowchart shown in FIG. 27. It is to be noted that step S103 in FIG. 27 is divided into S103a and S103b here. Steps S120 to S123 are described below.

Figure 52:
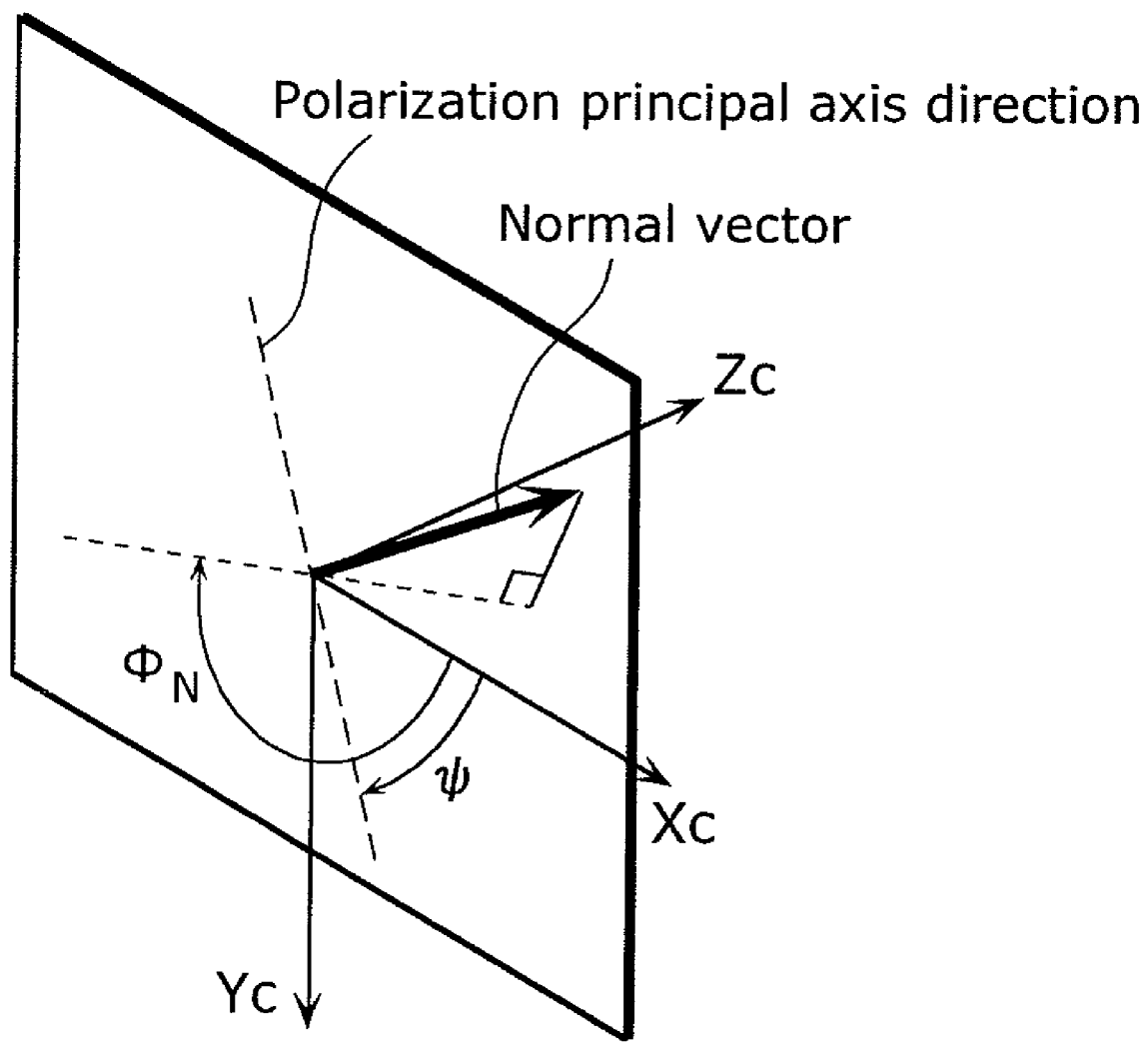
FIG. 52 is a diagram illustrating a normal vector in a camera coordinate system.
Figure 53:
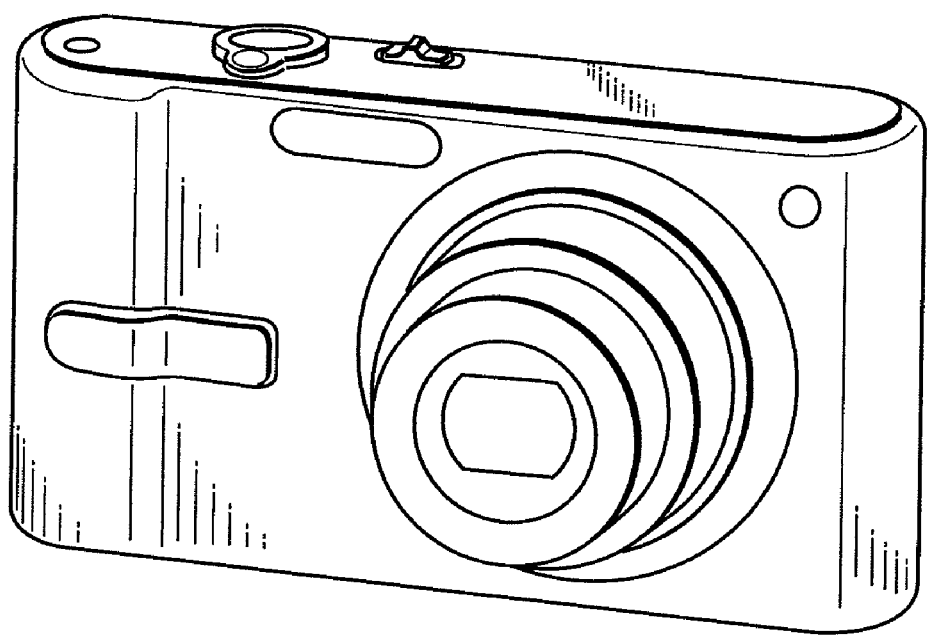
FIGS. 53(a) and (b) are diagrams showing examples of application products containing an image processing device according to the present invention.
Figure 53:
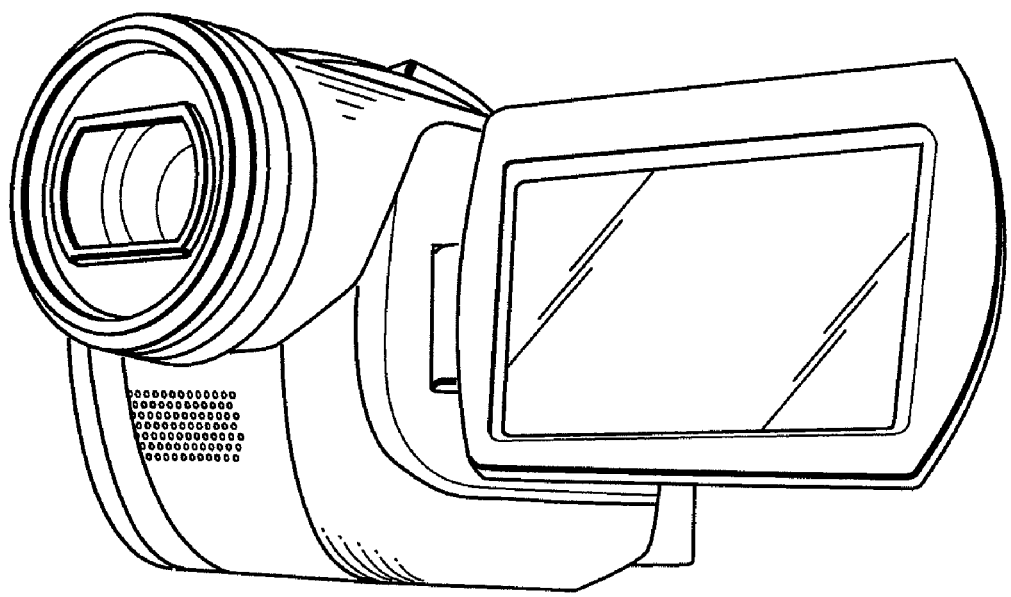

The normal vector information generating unit 317 of the reliability judging unit 107a generates a normal vector (Nx, Ny, Nz) corresponding to each pixel in a polarized image as normal vector information, based on the shape information generated by the shape information generating unit 211 (S120). The normal vector generated here is represented as a camera coordinate system (Xc-Yc-Zc) where the focus position in the optical axis direction is the origin, and the optical axis direction of the imaging element 202 is the Zc direction. In addition, the principal axis angle ψ and the polarization phase φ of the patterned polarizer 201 corresponds to the Xc axis in a camera coordinate system when ψ=φ=0 degree, and corresponds to the Yc axis in a camera coordinate system when ψ=φ=90 degrees. FIG. 52 is a schematic diagram of this coordinate system. Further, the normal vector information generating unit 317 estimates a one-dimensional freedom degree ON of the normal vector projected on the surface of the patterned polarizer by calculating it based on the normal vector generated in this way according to the following Expression 10 (S121).

[Math 10]

$$\Phi_N = \operatorname{Tan}^{-1}\left(\frac{Ny}{Nx}\right) \quad \text{(Expression 10)}$$

Here, the one-dimensional freedom degree $\phi_N$ of the normal vector calculated in this way equals to the polarization phase φ when diffuse reflection components are dominant. In other words, as for each of the existing pixels in the shadow areas, in the case where the polarization phase φ is sufficiently close to the one-dimensional freedom degree $\phi_N$ of the normal vector calculated based on the shape information from the shape information generating unit 211, it can be judged that diffuse reflection components are dominant in all the pixels in the shadow areas and thus there is no influence of specular reflection multiple reflected light. Thus, the phase information comparing unit 318 compares the polarization phase φ generated by the polarization information generating unit 102 with the one-dimensional freedom degree $\phi_N$ Of the normal vector calculated by the normal vector information generating unit 317, and judges whether or not these values are sufficiently close to each other depending on whether or not the difference is less than the threshold value stored in the DB 302 (S122). In the case where these vales are sufficiently close to each other (Yes in S122), the reliability judging unit 107a judges that the image scene does not satisfy the Condition 1, and discards the optical area division result about the shadow areas (S123). In the opposite case where there is an attached shadow area in the image, the reliability judging unit 107a judges that the image scene satisfies the Condition 1 (No in S122), and outputs the result of the optical area division about the shadow areas. As described earlier, since it is known that the polarization phase differs by 90 degrees depending on whether specular reflection components are dominant in an object or diffuse reflection components are dominant in the object, 45 degrees may be set as the threshold value for comparison of phase information. As a matter of course, such threshold value for comparison of phase information may be determined empirically. The threshold value like this may be held in the DB 302.

It is to be note that, the normal vector information generating unit 317 included in the optical area dividing device 100e is not limited to the normal vector information generating unit 317 which generates normal vector information based on the shape information generated by the shape information generating unit 211, and may be the normal vector information generating unit 317 which generates normal vector information from polarization information. In other words, this optical area dividing device 100e may include the normal vector information generating unit 104 in Embodiment 1 instead of the normal vector information generating unit 317.

In addition, the present invention can be implemented not only as image processing devices but also as application products such as digital still cameras and digital movie cameras each mounting the image processing device according to the present invention.

In addition, the shadow area detecting unit 301 shown in, for example, FIG. 14 first makes judgments on shadow areas based on luminance values to detect cast shadow areas (for example, S201 in FIG. 15), but the present invention is not limited by this procedure, and such cast shadow areas may be detected based on only the polarization information generated by the polarization information generating unit 102. This process is effective for an object such as an oil painting obviously including a cast shadow area but not including an attached shadow area. This is because, in the case where an object, such as black paint, having a sufficiently low reflectance exists, it is impossible to distinguish the shadow areas and the black paint based on only the above-mentioned luminance value. With reference to the drawings, a detailed description is given of the optical area dividing device like this according to the Variation of this Embodiment.

Descriptions of the block structures are omitted because the functional block diagrams showing the structure of the optical area dividing device according to this Variation are the same as that of FIG. 26.

Figure 54:
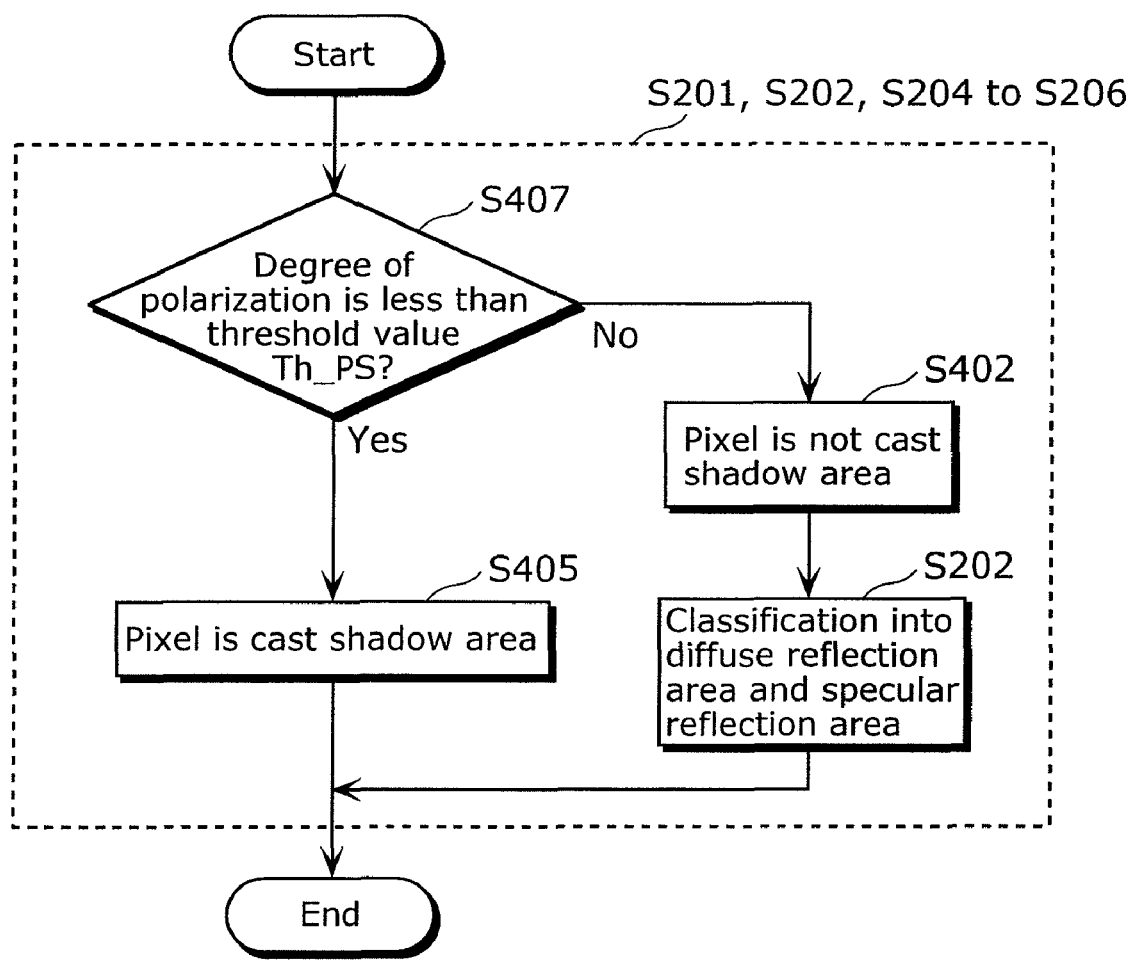
FIG. 54 is a flowchart showing shadow detecting processes performed by the optical area dividing device according to a Variation of the present invention.

FIG. 54 is a flowchart of shadow detecting processes performed by the optical area dividing devices according to this Variation. In other words, FIG. 54 is a flowchart of another approach of the shadow area detecting processes (S201, S202, S204 to S206) shown in FIG. 15. As shown in FIG. 54, the degree-of-polarization comparing unit 303 checks whether the degree of polarization of a pixel is less or greater than the threshold value TH_PS (S407). When the degree of polarization of the pixel is greater than the threshold value TH_PS (No in S407), the shadow area detecting unit 301 judges that the pixel is not a cast shadow area (S402), judges whether diffuse reflection is dominant or specular reflection is dominant in the pixel (S202), and ends the processing. In contrast, when the degree of polarization of the pixel is less than the threshold value TH_PS (Yes in S407), the shadow area detecting unit 301 judges that the pixel is a cast shadow area (S405), and ends the processing.

Figure 55:
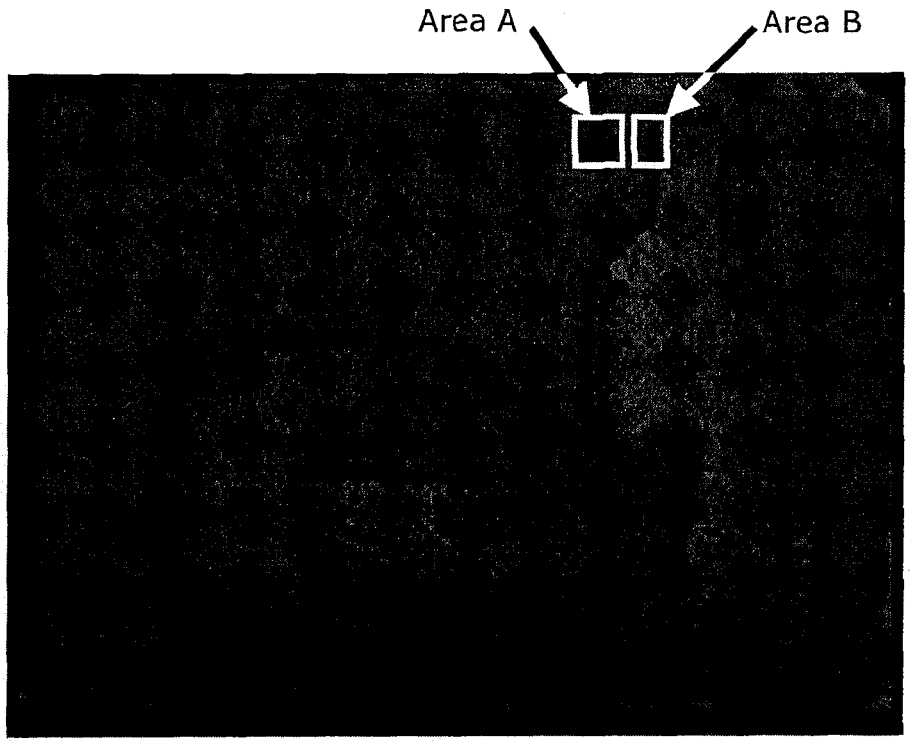
FIG. 55(a) is an image of oil painting as an object.
FIG. 55(b) is a diagram showing the degree of polarization ρ (polarization information) corresponding to the image shown in FIG. 55(a)
Figure 55:
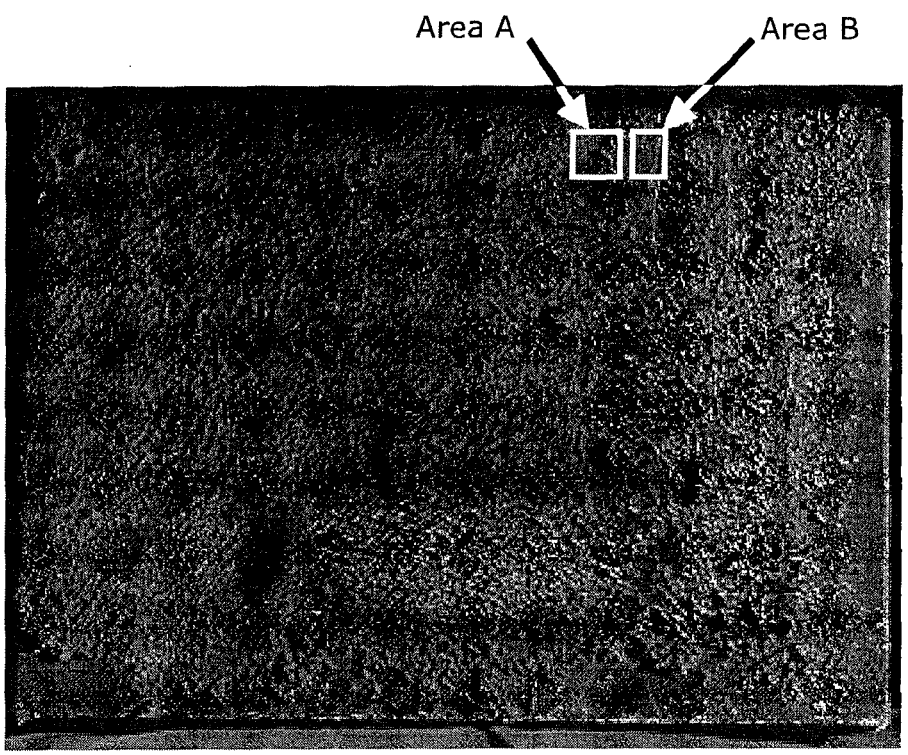
Figure 56:
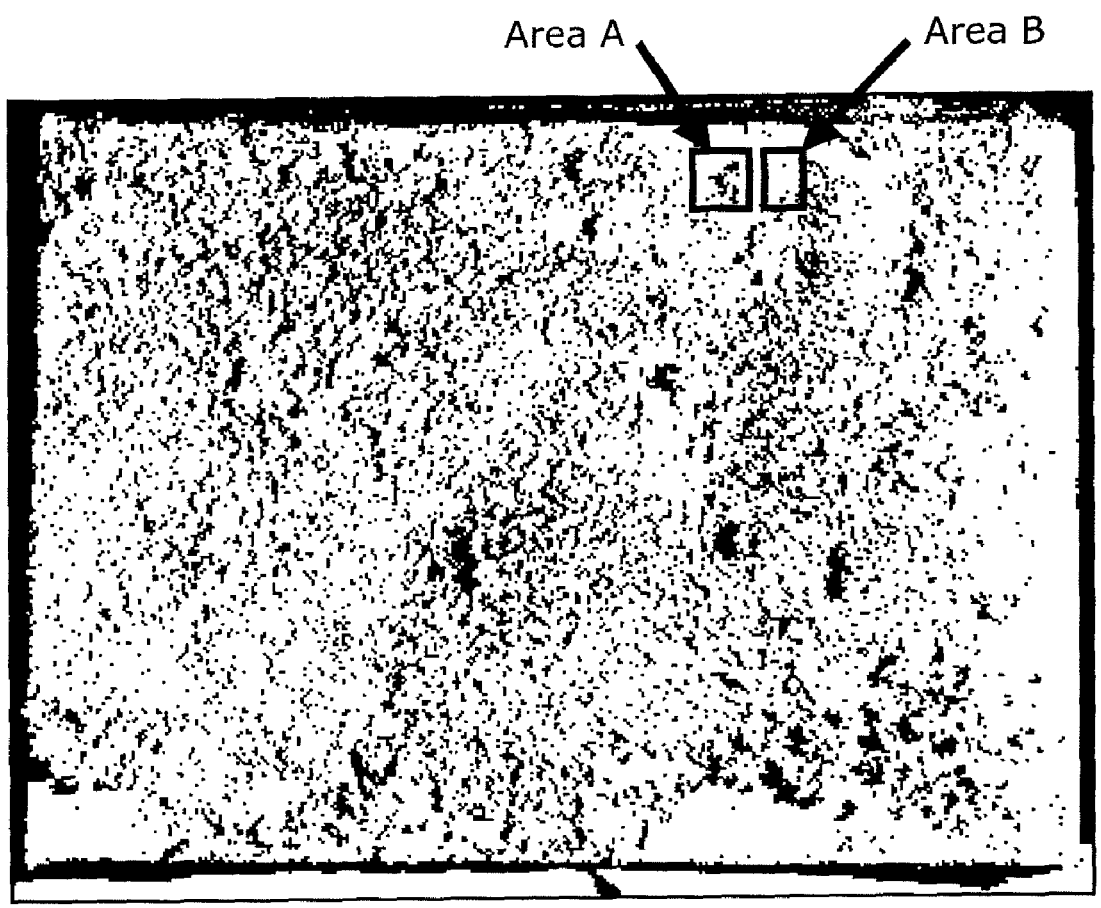
FIG. 56 is a diagram showing a cast shadow area extracted by the optical area dividing device.

FIG. 55 is a diagram representing, as an image, the degree of polarization ρ in the case where an object of oil painting is imaged. In this diagram, FIG. 55(*a*) shows an image of oil painting which is an object, and FIG. 55(*b*) shows the degree of polarization ρ (which is the polarization information generated by the polarization information generating unit 102) corresponding to the image shown in FIG. 55(*a*). In addition, FIG. 56 shows a cast shadow area which the optical area dividing device according to this Variation has extracted using the degree of polarization ρ shown in FIG. 55(*b*) corresponding to the image shown in FIG. 55(*a*). The black area in this diagram is the extracted cast shadow area. It is to be noted that the cast shadow areas extracted in this way may be finally outputted as cast shadow areas, and that areas newly defined may be finally outputted as cast shadow areas by performing contraction and expansion processes on large areas used in the image processing for each of the cast shadow areas extracted in this way.

The following is an advantage of the image processing performed by the optical area dividing device according to this Variation. In each of FIG. 55 and FIG. 56, the area A shows a cast shadow area, and the area B shows an area of black paint. As know from the image shown in FIG. 55(*a*), the luminance information of the area A and the area B are substantially the same, and thus it is difficult to divide the area A and the area B. However, the use of the polarization information of FIG. 55(*b*) has enabled the accurate area extraction showing that the area A is a cast shadow area and the area B is not a cast shadow area, as shown in FIG. 56.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

An information processing device according to the present invention is useful as an information processing device which performs processing on a shadow in an image of an object, for example, as a device which generates three-dimensional shape information of the object, as a device which highly refines the image using the information, and more specifically, as a digital still camera, a digital movie camera, a surveillance camera or the like.

What is claimed is:

1. An image processing device which performs processing on a shadow in an image of an object, said image processing device comprising:

an image information obtaining unit configured to obtain information about the image of the object, the information including luminance information which is information about luminance of light from the object and polarization information which is information about polarization of the light from the object;

a shadow area extracting unit configured to separately extract an attached shadow area and a cast shadow area from the image of the object based on the luminance information and the polarization information obtained by said image information obtaining unit, the attached shadow area appearing on the surface of the object depending on an angle of incidence light, and the cast shadow area appearing on a surface of a material body other than the object when the light is blocked by the object; and an output unit configured to output information separately identifying the attached shadow area and the cast shadow area extracted by said shadow area extracting unit.

2. The image processing device according to claim 1, wherein the image of the object includes a plurality of unit images, said image information obtaining unit is configured to obtain, for each of the unit images, the luminance information and the polarization information, said shadow area extracting unit is configured to extract, for each of the unit images, the attached shadow area and the cast shadow area, and said output unit is configured to assign identifiers to the respective unit images included in the attached shadow area and the cast shadow area extracted by said shadow area extracting unit, and output the assigned identifiers.

3. The image processing device according to claim 1,
wherein said output unit is configured to output portions respectively corresponding to the attached shadow area and the cast shadow area in the image of the object, as information identifying the attached shadow area and the cast shadow area.

4. The image processing device according to claim 1,
wherein said image information obtaining unit includes:
a polarization image capturing unit configured to obtain a polarized image of the object having the luminance information by receiving the light transmitted through a plurality of polarizers each having a different angle of a polarization principal axis, and
a polarization information generating unit configured to generate, from the obtained polarized image, the polarization information of each of unit images which makes up the polarized image using a correspondence relationship between the angle of the polarization principal axis of each of the plurality of polarizers and luminance of the light transmitted through the plurality of polarizers, and
said shadow area extracting unit is configured to extract the attached shadow area and the cast shadow area by: comparing, for each unit image, luminance of the unit image and a predetermined threshold value based on luminance information of the polarized image; judging that the unit image belongs to a low luminance area including an attached shadow area and a cast shadow area when the luminance is less than the threshold value; and judging, for the unit image belonging to the low luminance area, whether the unit image is the attached shadow area or the cast shadow area, based on the polarization information generated by said polarization information generating unit.

5. The image processing device according to claim 4,
wherein said polarized image capturing unit includes a plurality of imaging units for obtaining the polarized image,
each of the plurality of imaging units includes:
a plurality of polarizers each having a different angle of a polarization principal axis; and
a plurality of unit pixels each receiving light transmitted through a corresponding one of the plurality of polarizers; and
said polarization information generating unit is configured to generate polarization information using, as the unit images, the image obtained by said imaging units.

6. The image processing device according to claim 4,
wherein said shadow area extracting unit is configured to judge whether or not the polarization information of the unit image belonging to the low luminance area indicates polarization characteristics of specular reflection, and extract the unit image as the attached shadow area in the case where said shadow area extracting unit judges that the polarization information shows polarization characteristics of specular reflection.

7. The image processing device according to claim 4,
wherein said polarization information generating unit is configured to generate, as the polarization information, a degree of polarization which is a parameter indicating a degree of polarization of light, and
said shadow area extracting unit is configured to compare the degree of polarization in the unit image belonging to the low luminance area and a predetermined threshold value, extract the unit image as the cast shadow area when the degree of polarization is less than the threshold value, and extract the unit image as the attached shadow area when the degree of polarization is equal to or greater than the threshold value.

8. The image processing device according to claim 4,
wherein said polarization information generating unit is configured to generate, as the polarization information, an estimated polarization error which is a difference between the luminance obtained by said polarization image capturing unit and luminance determined from a sinusoidal approximating a correspondence relationship between the angle of the polarization principal axis and the obtained luminance, and
said shadow area extracting unit is further configured to compare the estimated polarization error in the unit image belonging to the low luminance area and the predetermined threshold value, extract, as the cast shadow area, the unit image when the estimated polarization error is greater than the threshold value, and extract, as the attached shadow area, the unit image when the estimated polarization error is equal to or less than the threshold value.

9. The image processing device according to claim 4,
wherein said polarization image capturing unit is configured to obtain a first polarized image obtained in the case where light from a flash is projected on the object and a second polarized image obtained in the case where no light from a flash is projected on the object, and
said shadow area extracting unit is configured to calculate, for each unit image belonging to the low luminance area, a difference between the first polarized image and the second polarized image, compare the calculated difference and the predetermined threshold value, and extract the unit image as the attached shadow area or the cast shadow area when the difference is greater than the threshold value.

10. The image processing device according to claim 4,
wherein said shadow area extracting unit is configured to judge whether or not the polarization information of the unit image belonging to the low luminance area indicates polarization characteristics of specular reflection, and extract the unit image as "the attached shadow area or the low reflectance area" in the case where said shadow area extracting unit judges that the polarization information shows polarization characteristics of specular reflection.

11. The image processing device according to claim 10,
wherein said polarization information generating unit is configured to generate, as the polarization information, a degree of polarization which is a parameter indicating a degree of polarization of light, and
said shadow area extracting unit is further configured to compare the degree of polarization in the unit image belonging to the low luminance area and the predetermined threshold value, extract the unit image as the cast shadow area when the degree of polarization is less than the threshold value, and extract the unit image as "the attached shadow area or the low reflectance area" when the degree of polarization is equal to or greater than the threshold value.

12. The image processing device according to claim 10,
wherein said polarization information generating unit is configured to generate, as the polarization information, an estimated polarization error which is a difference between the luminance obtained by said polarization image capturing unit and luminance determined from a sinusoidal approximating a correspondence relationship between the angle of the polarization principal axis and the obtained luminance, and said shadow area extracting unit is further configured to compare the estimated polarization error in the unit image belonging to the low luminance area and a predetermined threshold value, extract the unit image as the cast shadow area when the estimated polarization error is greater than the threshold value, and extract the unit image as "the attached shadow area or the low reflectance area" when the estimated polarization error is equal to or less than the threshold value.

13. The image processing device according to claim 4, further comprising an imaging condition judging unit configured to judge whether or not an image scene to be imaged by said polarization image capturing unit satisfies a predetermined imaging condition which allows said shadow area extracting unit to perform accurate area extraction, wherein said shadow area extracting unit is configured to cancel area extraction as a low luminance area in the case where said imaging condition judging unit judges that the imaging condition is not satisfied.

14. The image processing device according to claim 13, wherein the predetermined imaging condition is a condition that "a material body including a large plane exists near the object in an image scene, and a light source exists in a direction opposite to the object when the light source is seen from the large plane".

15. The image processing device according to claim 13, wherein said imaging condition judging unit has an angle sensor for detecting an imaging direction of said polarized image capturing unit, and is configured to judge that the image scene does not satisfy the imaging condition in the case where said angle sensor detects that said polarized image capturing unit faces upward from a horizontal plane.

16. The image processing device according to claim 13, wherein said imaging condition judging unit includes a sonar for measuring a distance to a nearby target by generating a sound wave and receiving a reflected wave of the sound wave, and is configured to judge whether or not there is a material body near the information processing device using the sonar, and judges that the image scene does not satisfy the imaging condition in the case where said imaging condition judging unit judges that there is no material body.

17. The image processing device according to claim 4, further comprising a reliability judging unit configured to judge whether area extraction is reliable or not by evaluating a result of the area extraction performed by said shadow area extracting unit, and discard the result of the area extraction performed by said shadow area extracting unit in the case where said reliability judging unit judges that the area extraction is not reliable.

18. The image processing device according to claim 17, wherein said reliability judging unit is configured to judge whether or not an attached shadow area exists in a low luminance area as the result of the area extraction performed by said shadow area extracting unit, and judge that the area extraction is not reliable in the case where no attached shadow area exists in the low luminance area.

19. An image processing method for performing processing on a shadow in an image of an object, said image processing method comprising:

obtaining information about an image of the object, the information including luminance information which is information about luminance of light from the object and polarization information which is information about polarization of the light from the object;

separately extracting an attached shadow area and a cast shadow area from the image of the object based on the luminance information and the polarization information obtained in said obtaining, the attached shadow area appearing on the surface of the object depending on an angle of incidence light, and the cast shadow area appearing on a surface of a material body other than the object when the light is blocked by the object; and outputting information separately identifying the attached shadow area and the cast shadow area extracted in said extracting.

20. A non-transitory computer-readable medium having a program stored thereon, the program being for an information processing device which performs processing on a shadow in an image of an object, said program causing a computer to execute the information processing method according to claim 19.

* * * * *